United States Patent
Dupre et al.

(10) Patent No.: US 11,371,862 B2
(45) Date of Patent: Jun. 28, 2022

(54) MAGNETIC SENSOR DEVICE, SYSTEM AND METHOD

(71) Applicant: Melexis Technologies SA, Bevaix (CH)

(72) Inventors: Nicolas Dupre, Neuchatel (CH); Lionel Tombez, Bevaix (CH); Gael Close, Morges (CH); Yves Bidaux, Yverdon-les-Bains (CH); David Goyvaerts, Alken (BE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 22 days.

(21) Appl. No.: 16/996,167

(22) Filed: Aug. 18, 2020

(65) Prior Publication Data

US 2021/0055131 A1 Feb. 25, 2021

(30) Foreign Application Priority Data

Aug. 22, 2019 (EP) .................................... 19193068

(51) Int. Cl.
*G01D 5/14* (2006.01)
*G01B 7/30* (2006.01)

(52) U.S. Cl.
CPC ............... *G01D 5/145* (2013.01); *G01B 7/30* (2013.01)

(58) Field of Classification Search
CPC .................................. G01D 5/145; G01B 7/30
See application file for complete search history.

(56) References Cited

U.S. PATENT DOCUMENTS

| 10,739,368 | B2* | 8/2020 | Hammerschmidt | G01P 3/44 |
| 11,143,527 | B2* | 10/2021 | Bilbao De Mendizabal | |
| | | | | G01D 5/245 |
| 2012/0007593 | A1 | 1/2012 | Yamazaki et al. | |
| 2014/0176125 | A1 | 6/2014 | Friedrich et al. | |
| 2015/0226581 | A1* | 8/2015 | Schott | G01D 5/145 |
| | | | | 324/207.2 |
| 2018/0335294 | A1 | 11/2018 | Ausserlechner | |
| 2018/0372475 | A1 | 12/2018 | Yoshiya | |

OTHER PUBLICATIONS

Search Report from Corresponding EP Application No. EP19193068. 4, dated Feb. 18, 2020.

* cited by examiner

*Primary Examiner* — Reena Aurora
(74) *Attorney, Agent, or Firm* — Workman Nydegger

(57) ABSTRACT

Angular position sensor system comprising: a cylindrical magnet rotatable about a rotation axis; and an angular position sensor device comprising: a substrate comprising a plurality of magnetic sensitive elements configured for measuring a first magnetic field component in a first direction and a second magnetic field component in a second direction perpendicular to the first direction; and a processing circuit configured for calculating the angular position; the sensor device being oriented such that the first direction is oriented in a circumferential direction, and the second direction is either parallel or orthogonal to the rotation axis; the sensor device being located at a predefined position where a magnitude of a third magnetic field component orthogonal to the first and second magnetic field component is negligible over the 360° angular range.

17 Claims, 30 Drawing Sheets

The sensor device is preferably located at a position where |By|/|Bx|<20%, or <15%, or <10%

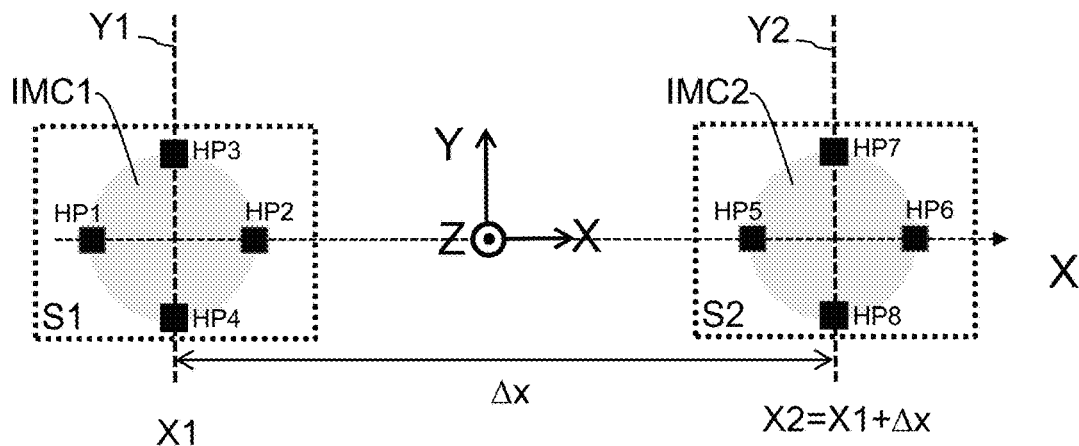

a) Use of a single sensor to determine position as function of Bx and Bz:
(preferably at location where |By|/|Bx|<20%, or <15%, or <10%, or <5%;
 and/or where |By|/|Bz|<20%, or <15%, or <10%, or <5%; or By≈0);
Bx1 = (HP2−HP1)
Bz1 = (HP3+HP4)
α = arctan(Bz1/Bx1), or
α = arctan(K*Bz1/Bx1), where K is a predefined constant b) Use of both sensors to determine position as function of dBx/dx and dBz/dx:
(preferably at location where |By|/|Bx|<20%, or <15%, or <10%, or <5%;
 and/or where |By|/|Bz|<20%, or <15%, or <10%, or <5%; or By≈0);
Bx1 = (HP2−HP1)           Bx2=(HP6−HP5)
Bz1 = (HP3+HP4)           Bz2=(HP7+HP8)
ΔBx/Δx = Bx2−Bx1
ΔBz/Δx = Bz2−Bz1
α = arctan(ΔBz/Δx / ΔBx/Δx ), or
α = arctan(K * ΔBz/Δx / ΔBx/Δx ), where K is a predefined constant c) Use of a single sensor to determine position as function of Bx and By:
(preferably at location where |Bz|/|Bx|<20%, or <15%, or <10%, or <5%;
 and/or where |Bz|/|By|<20%, or <15%, or <10%, or <5%; or Bz≈0);
Bx1=(HP2−HP1)
By1=(HP3−HP4)
α = arctan(By1/Bx1), or
α = arctan(K*By1/Bx1), where K is a predefined constant d) Use of both sensors to determine position as function of dBx/dx and dBy/dx:
(preferably at location where |Bz|/|Bx|<20%, or <15%, or <10%, or <5%;
 and/or where |Bz|/|By|<20%, or <15%, or <10%, or <5%; or Bz≈0);
Bx1=(HP2−HP1)            Bx2=(HP6−HP5)
By1=(HP3−HP4)            By2=(HP7−HP8)
ΔBx/Δx = Bx2−Bx1
ΔBy/Δx = By2−By1
α = arctan(ΔBy/Δx / ΔBx/Δx ), or
α = arctan(K * ΔBy/Δx / ΔBx/Δx ), where K is a predefined constant

FIG. 3

The sensor device is preferably located at a position where $|By|/|Bx|<20\%$, or $<15\%$, or $<10\%$

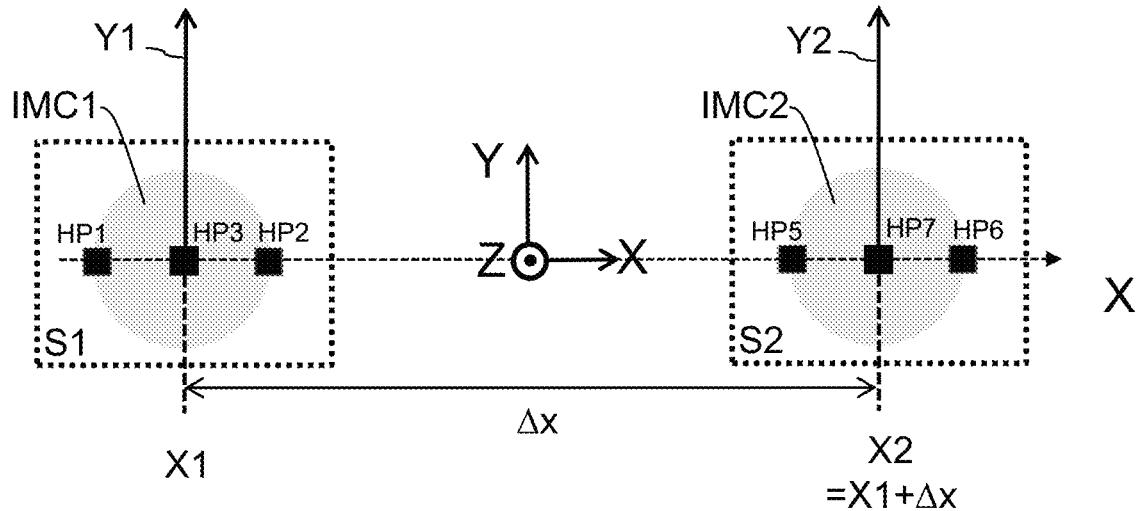

FIG. 8

Bx1 = (HP2-HP1)
Bz1 = K*HP3
(K is a predefined constant)

Bx2 = (HP6-HP5)
Bz2 = K*HP7
(K is a predefined constant)

The sensor device is preferably located at a position
where |By|/|Bx|<20% and |By|/|Bz|<20%, or <15%, or <10%

$\Delta Bx/\Delta x$ = Bx2-Bx1 = (HP6-HP5)-(HP2-HP1)
$\Delta Bz/\Delta x$ = Bz2-Bz1 = K*(HP7-HP3)

$\alpha$ = arctan($\Delta Bz/\Delta x$ / $\Delta Bx/\Delta x$ ), or
$\alpha$ = arctan(M * $\Delta Bz/\Delta x$ / $\Delta Bx/\Delta x$ ), where M is a predefined constant FIG. 10(a)
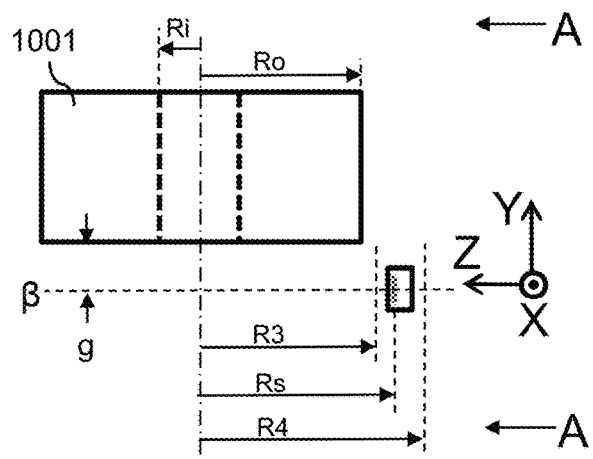
FIG. 10(b)
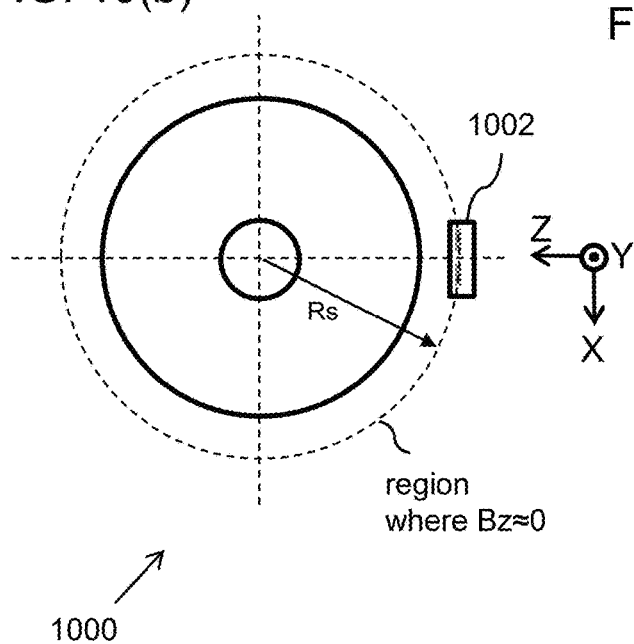
FIG. 10(c)
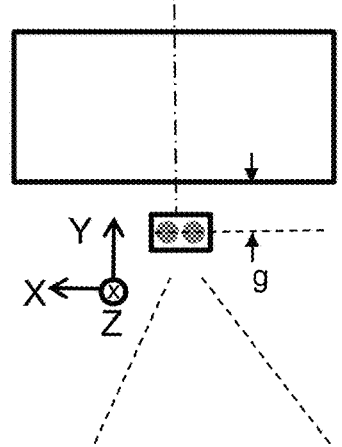
FIG. 10(d)
or
FIG. 10(e)
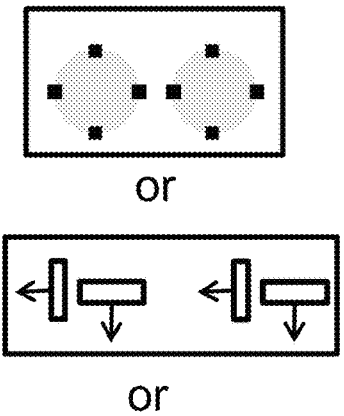

FIG. 14(a)
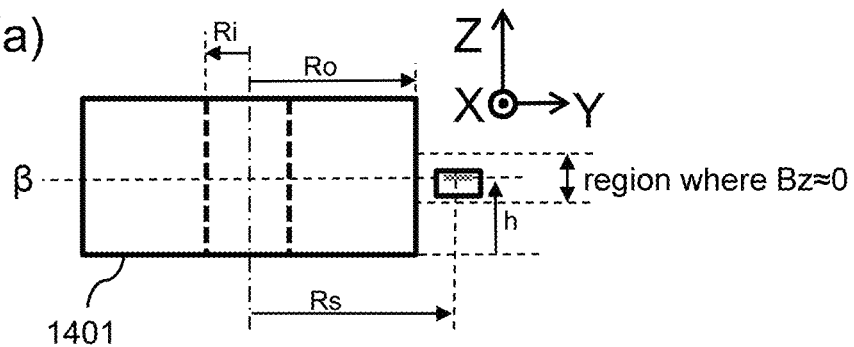
FIG. 14(b)
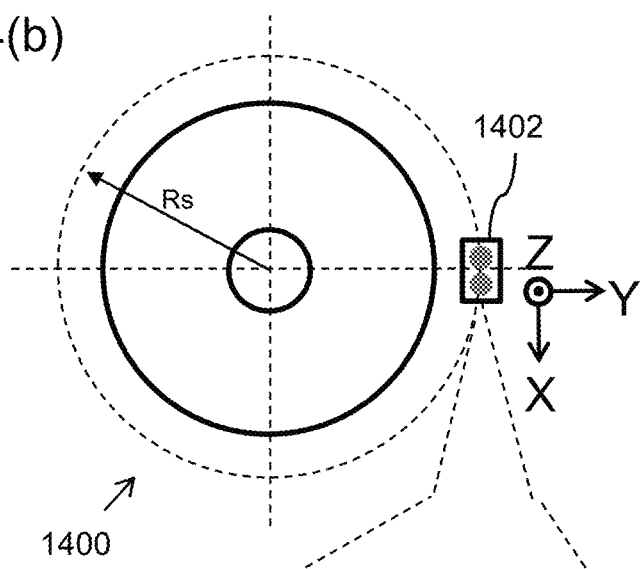
FIG. 14(c)
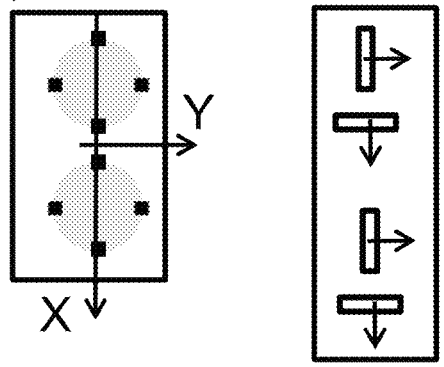
FIG. 14(d)

Example1:
OD=15 mm
ID=5 mm
Height=2.5 mm

▓ large
▒ medium
□ 0

|By| as seen by sensor device =
|Bradial| with respect to the magnet,
in plane at 2 mm

W10%

FIG. 18(a)
Example2:
OD=30 mm
ID=20 mm
H=10 mm
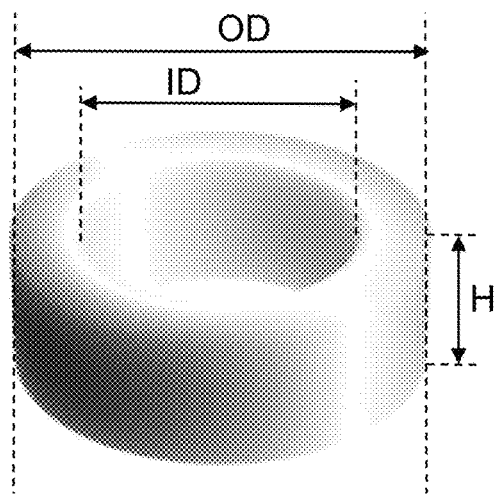
FIG. 18(b)
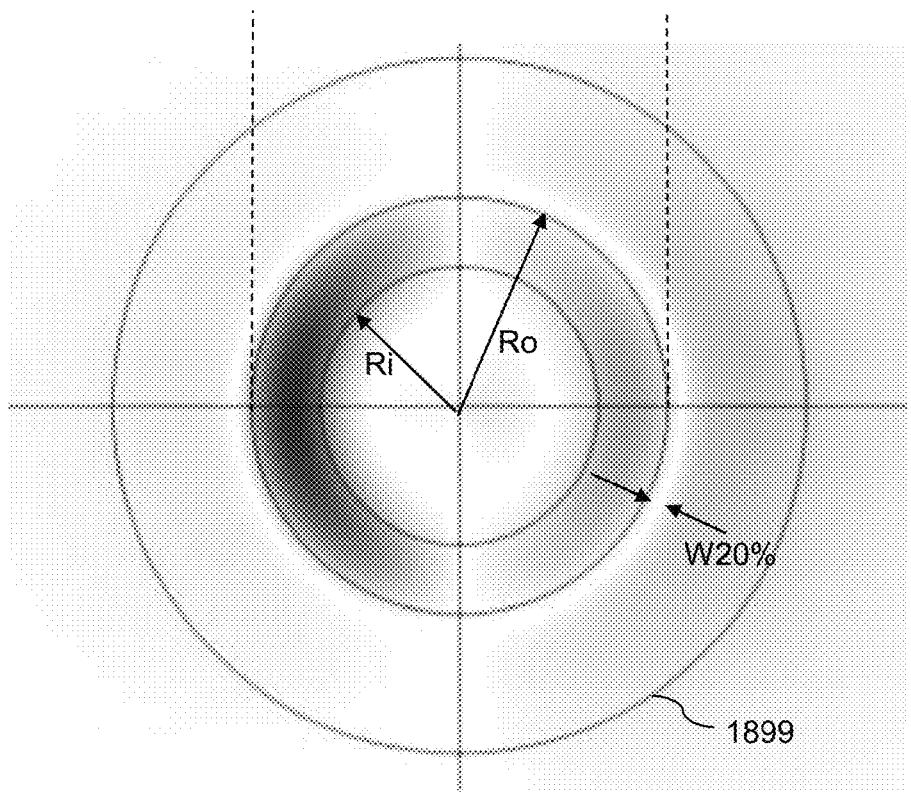
large
medium
0
|By| as seen by sensor device = |Bradial| with respect to the magnet, in plane at 2 mm Example:
OD=15 mm
ID=5 mm
H=2.5 mm

|By| as seen by sensor device = |Bradial| with respect to magnet, in plane at 2 mm ■ large
▫ medium
□ 0

FIG. 20(a)
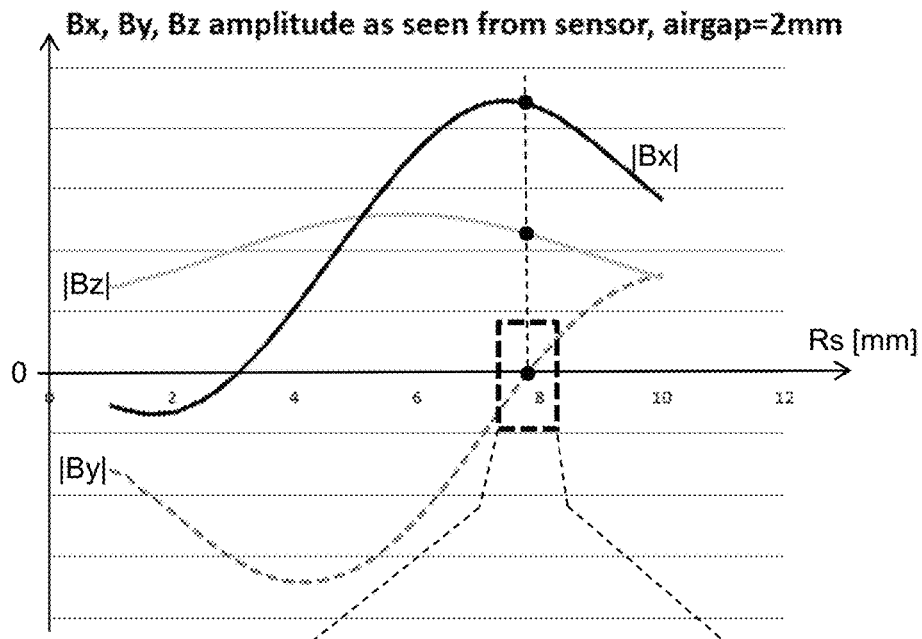
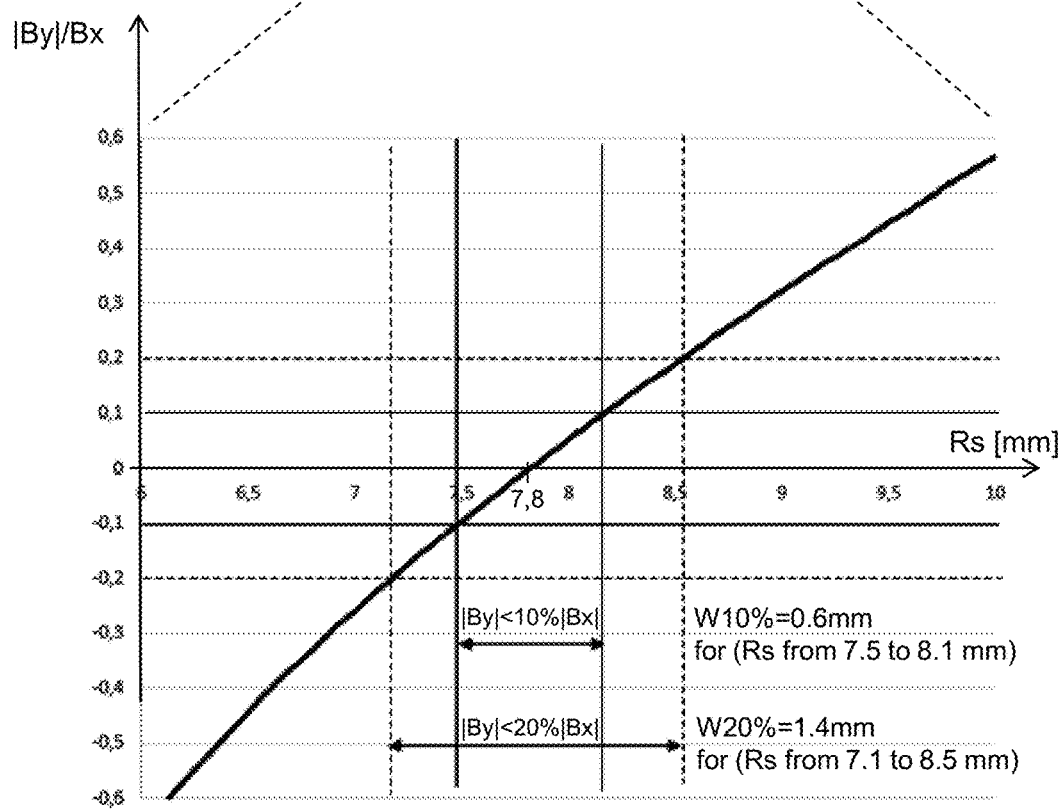
FIG. 20(b)

FIG. 21(a)
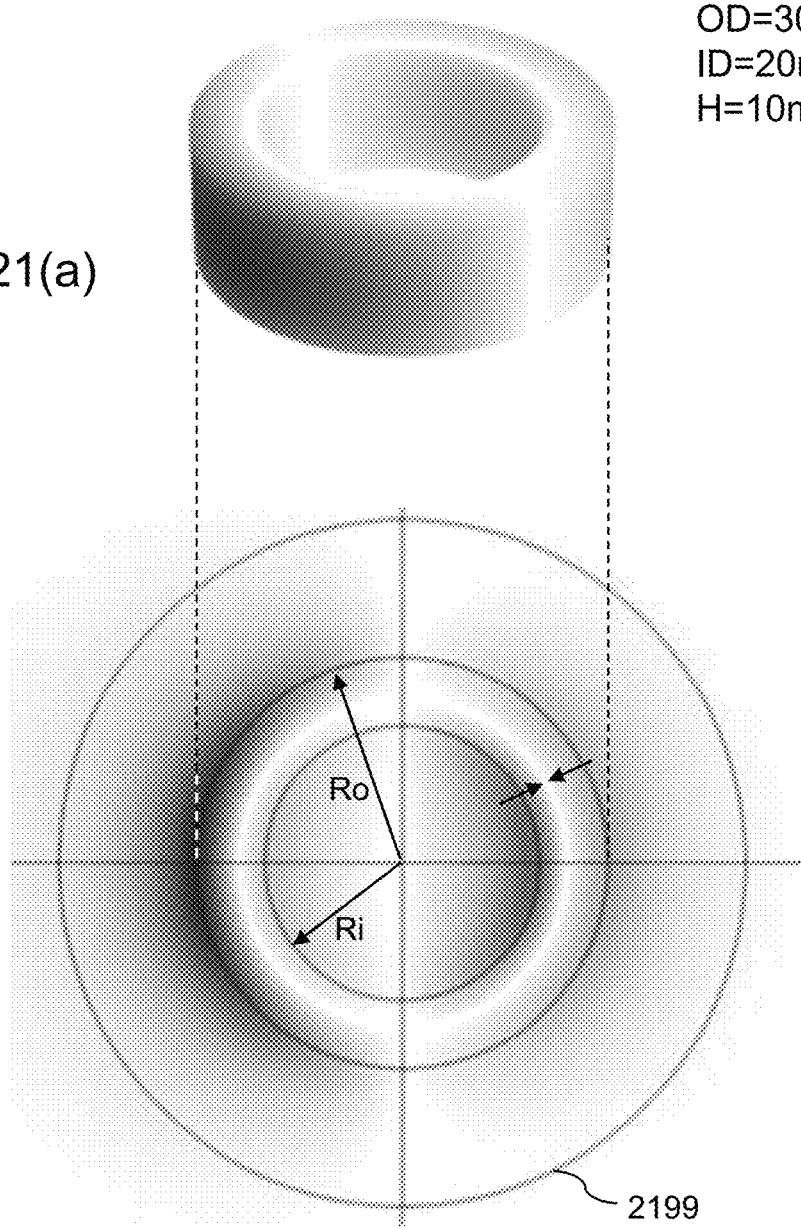
Example:
OD=30mm
ID=20mm
H=10mm
|Bz| as seen by sensor device =
|Baxial| with respect to the magnet
in plane at 2 mm
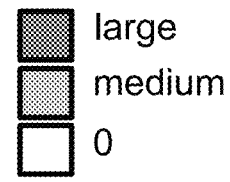
large
medium
0
FIG. 21(b)

FIG. 22(a)
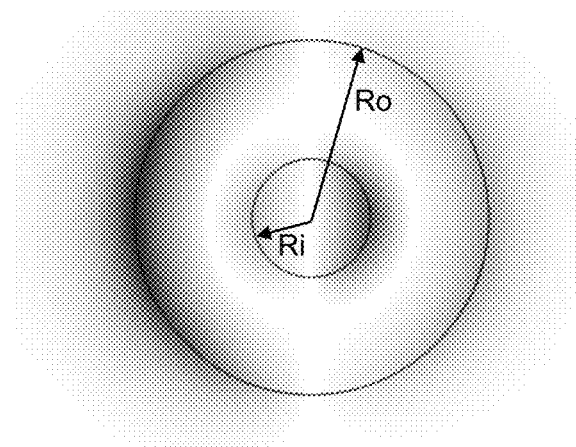
Example:
OD=15 mm
ID=5 mm
H=2.5 mm
FIG. 22(b)
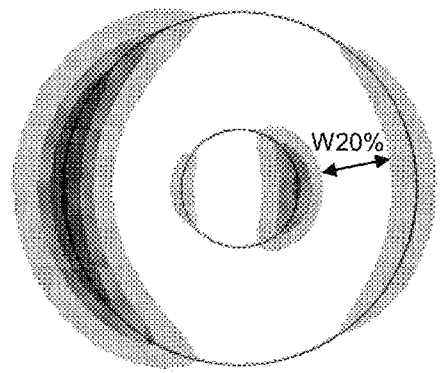
|Bz| as seen by sensor device
|Baxial| with respect to magnet
in plane at 2 mm
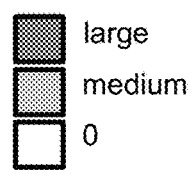
large
medium
0
FIG. 22(c)
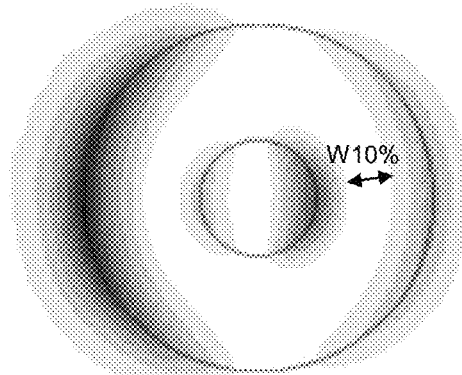
FIG. 22(d)
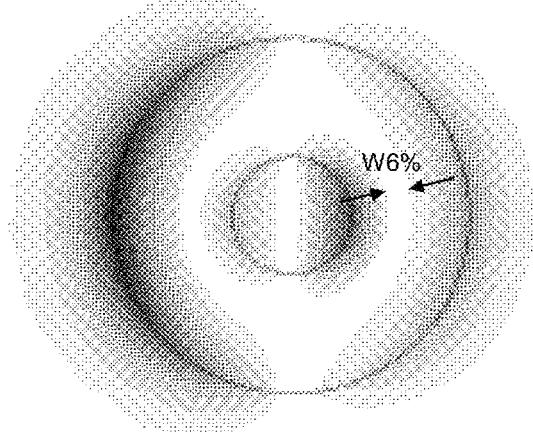

Example:
OD=10mm
ID=5mm
H=5mm magnetization of the magnet $2\alpha = \arctan(Bx1/Bz1)$, or
$2\alpha = \operatorname{atan2}(Bx1, Bz1)$ $2\alpha = \operatorname{atan2}(\Delta Bx, \Delta Bz)$, or
$2\alpha = \operatorname{atan2}(dBx/dx, dBz/dx)$ Example:
OD=12 mm
ID=8 mm
H=4 mm
g=3 mm

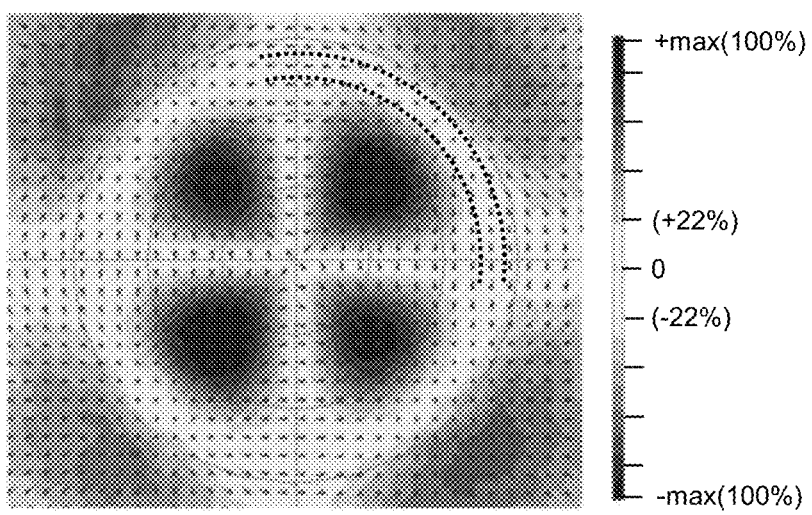
FIG. 27(a) |Br| of magnet = |By| of sensor device
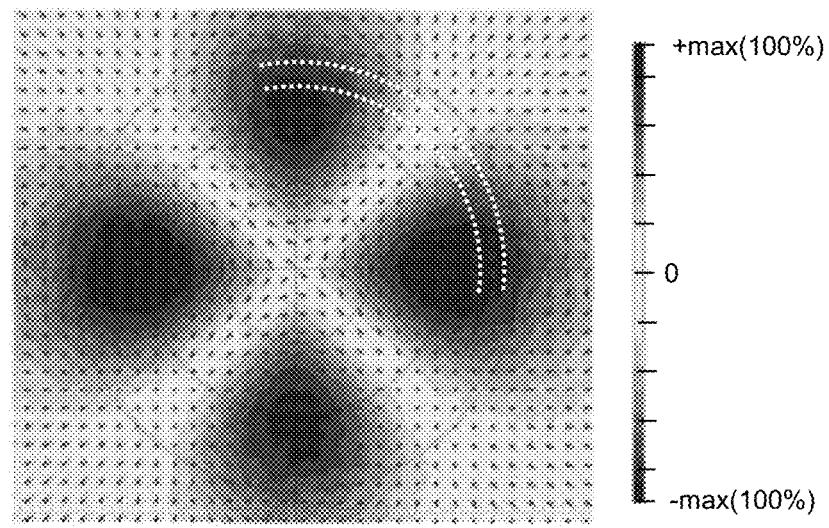
FIG. 27(b) |Bt| of magnet = |Bx| of sensor device
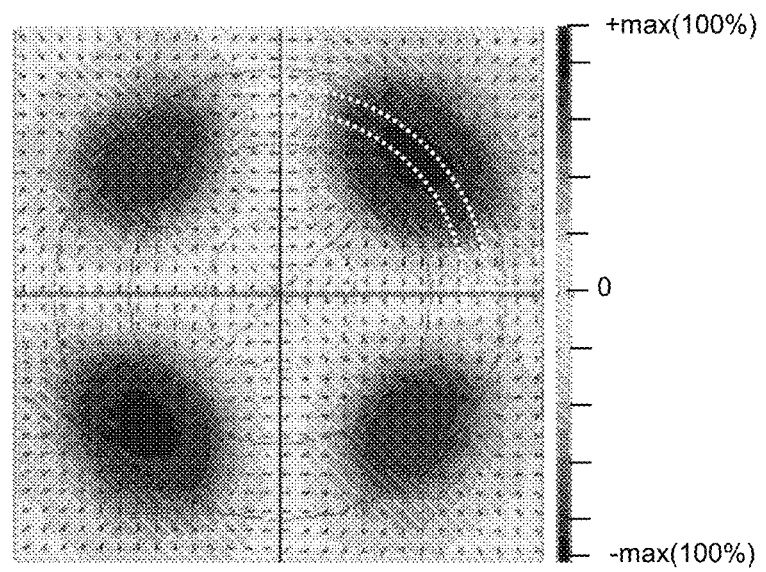
FIG. 27(c) |Bax| of magnet = |Bz| of sensor device

MAGNETIC SENSOR DEVICE, SYSTEM AND METHOD

FIELD OF THE INVENTION

The present invention relates in general to the field of magnetic sensor systems and devices and methods, and more in particular to angular position sensor systems, angular position sensor devices, and methods of determining an angular position.

BACKGROUND OF THE INVENTION

Magnetic sensor systems, in particular angular position sensor systems are known in the art. They offer the advantage of being able to measure a angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made.

US2018/0372475A1 discloses a device for rotation angle detection, which document is incorporated herein by reference in its entirety.

There is always room for improvements or alternatives.

SUMMARY OF THE INVENTION

It is an object of embodiments of the present invention to provide a magnetic position sensor system capable of determining an angular position of a sensor device relative to a magnet.

It is an object of embodiments of the present invention to provide a magnetic position sensor system wherein the position can be determined with improved accuracy.

It is an object of embodiments of the present invention to provide a magnetic position sensor system having (1) an improved robustness against cross-talk (e.g. cross-talk between different magnetic field components Bx, By, Bz), and/or having (2) an improved robustness against an external disturbance field, and/or having (3) an improved robustness against long-term drift (e.g. caused by mechanical stress variations over the sensor device), and preferably all three of these.

It is an object of embodiments of the present invention to provide a magnetic position sensor system having an improved robustness against (1) cross-talk and (2) against an external disturbance field.

It is an object of embodiments of the present invention to provide a magnetic position sensor system having an improved robustness against (1) cross-talk and (2) against long term drift.

It is an object of embodiments of the present invention to provide a magnetic position sensor system having an improved robustness against (1) an external disturbance field and (2) long term drift.

These objectives are accomplished by embodiments of the present invention.

According to a first aspect, the present invention provides an angular position sensor system comprising: a permanent magnet for generating a magnetic field, the magnet being a cylindrical magnet, (e.g. a ring magnet or a disk magnet), the magnet being rotatable about a rotation axis over an angular position to be determined; and an angular position sensor device having a substrate comprising a plurality of magnetic sensitive elements; wherein the magnetic sensitive elements are configured for measuring at least a first magnetic field component (e.g. Bx1) oriented in a first direction (e.g. X) and a second magnetic field component (e.g. By1; Bz1) oriented in a second direction (e.g. Y; Z) perpendicular to the first direction; and the sensor device further comprising a processing circuit configured for calculating the angular position of the magnet based at least on the measured first and second magnetic field component; and the sensor device is oriented such that the first direction (e.g. X) is oriented in a circumferential direction with respect to said rotation axis, and such that the second direction (e.g. Y, Z) is either parallel to the rotation axis or is orthogonal to the rotation axis; and the sensor device is located at a predefined position relative to the magnet where a magnitude of a third magnetic field component (e.g. Bz1) orthogonal to the first and second magnetic field component (e.g. By1) has an magnitude smaller than 20% of the magnitude of the first magnetic field component (e.g. Bx1) and/or has an magnitude smaller than 20% of the magnitude of the second magnetic field component (e.g. By1), over a predefined angular range.

The skilled person, having the benefit and the insights of the present disclosure, in particular, after being told that there exists an "annular zone" where two orthogonal magnetic field components behave substantially like a sine and cosine signal, and that the third orthogonal magnetic field component has a magnitude which is much smaller, can easily determine the position of that annular zone, e.g. by performing computer simulations, for a cylindrical magnet with given dimensions and for a "given configuration", e.g. at a given distance from the magnet "near the corner", "near the equator" or "under/above the magnet". As far as is known to the inventors, the existence of such a zone is not known in the art.

Although it is believed that the invention works for magnets with arbitrary dimensions, in preferred embodiments, the angular position sensor system comprises small magnets, e.g. having an outer diameter in the range from 10 to 50 mm and a height in the range from 2 to 10 mm, and the sensor device will be located at an axial distance from the magnet in the range from 0.5 to about 5.0 mm, and/or at a radial distance from the magnet up to 10 mm.

Preferably the sensor device is located at a location where the ratio of the magnitude of the third component (e.g. |Bz|) over the magnitude of the first and/or second magnetic field component (e.g. |Bx| and/or |By|)<15%, or <10%, or <5%, or ideally is substantially equal to zero.

In an embodiment, the predefined angular range (where the magnitude of the third magnetic field component is smaller than 20% or 15% or 10% or 5% of the magnitude of the first and/or second magnetic field component) is a range of at least 180°, or at least 210°, or at least 240°, or at least 270°, or at least 300°, or at least 330°, or is the entire 360° range.

The position sensor device is preferably arranged in close vicinity of the magnet, for example at a distance smaller than 10 mm, e.g. smaller than 5 mm, or smaller than 2.5 mm, but preferably at least 0.5 mm.

The position sensor device is preferably arranged at a radial distance Rs from the rotation axis larger than 0, for example at least 2 mm, or at least 3 mm, or at least 5 mm, or at least 10 mm, hence clearly an "off-axis" position. Or stated in other words, the sensor device is preferably offset from the rotation axis by at least 2 mm.

In an embodiment, the magnet is a ring magnet. The ring magnet may be axially magnetized or diametrically magnetized.

In an embodiment, the magnet is a disk magnet. The disk magnet may be axially magnetized or diametrically magnetized.

In an embodiment, the magnet is a two-pole magnet, e.g. a diametrically magnetized two-pole ring magnet, or a diametrically magnetized two-pole disk magnet, or an axially magnetized two-pole ring magnet, or an axially magnetized two-pole disk magnet.

In an embodiment, the magnet is a four-pole magnet, e.g. an axially magnetized four-pole ring magnet, or an axially magnetized four pole disk magnet.

In an embodiment, the magnet is a multi-pole magnet having at least four poles, e.g. an axially magnetized multi-pole ring magnet, or an axially magnetized multi-pole disk magnet having four poles, or having six poles, or having eight poles, or having ten poles, or having twelve poles.

In an embodiment, the magnet has an outer radius Ro, and the predefined position of the sensor device is defined by a distance "g" below a bottom surface or above a top surface of the magnet in the range from 1.0 to 5.0 mm or in the range from 1 to 4 mm, or in the range from 1 to 3 mm; and by a radial distance "Rs" in the range from Ro−7 mm to Ro+7 mm, or in the range from Ro−5 mm to Ro+5 mm, or in the range from Ro−3 mm to Ro+3 mm, or in the range from Ro−7 mm to Ro−1 mm, or in the range from Ro−5 mm to Ro−1 mm, or in the range from Ro−3 mm to Ro−1 mm, or in the range from Ro+1 mm to Ro+7 mm, or in the range from Ro+1 mm to Ro+5 mm, or in the range from Ro+1 mm to Ro+3 mm.

The distance (gap) between said plane and the bottom or top surface of the magnet can for example be equal to about 1.0 mm, or about 1.2 mm, or about 1.4 mm, or about 1.6 mm, or about 1.8 mm, or about 2.0 mm, or about 2.2 mm, or about 2.4 mm, or about 2.6 mm, or about 2.8 mm, or about 3.0 mm, or about 3.2 mm, or about 3.4 mm, or about 3.6 mm, or about 3.8 mm, or about 4.0 mm.

In an embodiment, the distance "g" is a predefined gap distance, and the value of Rs is determined by simulation for that gap distance.

In an embodiment, the magnet is a ring magnet having an inner radius "Ri" and an outer radius "Ro"; and the predefined position is defined by a distance "g" below a bottom surface or above a top surface of the magnet in the range from 1.0 to 5.0 mm, or from 1.0 to 4.0 mm, or from 1.0 to 3.0 mm, and by a radial distance "Rs" in the range from $Ri+\Delta R*35\%$ to $Ri+\Delta R*65\%$, where $\Delta R=(Ro-Ri)$.

In an embodiment, the radial distance is a value in the range from $Ri+\Delta R*40\%$ to $Ri+\Delta R*90\%$.

In an embodiment, the radial distance is a value in the range from $Ri+\Delta R*35\%$ to $Ri+\Delta R*48\%$.

In an embodiment, the radial distance is a value in the range from $Ri+\Delta R*52\%$ to $Ri+\Delta R*65\%$.

In an embodiment, the distance "g" is a predefined gap distance, and the value of Rs is determined by simulation for that gap distance.

In an embodiment, the magnet has an outer radius "Ro" and an axial height "H", and the predefined position is located in a plane substantially halfway between a bottom surface and a top surface of the magnet, and by a radial distance "Rs" in the range from Ro+1.0 mm to Ro+10 mm.

In an embodiment, the sensor device is oriented such that the second axis (e.g. Y) is orthogonal to the rotation axis. Preferably the Y-axis intersects the rotation axis orthogonally.

In an embodiment, the sensor device is oriented such that the second axis (e.g. Y) is parallel to the rotation axis of the magnet.

In an embodiment, the sensor device comprises at least one sensor comprising an integrated magnetic concentrator structure (IMC) and only four horizontal Hall elements arranged at a circumference of said IMC, and angularly spaced apart by 90°. Preferably two of these Hall elements are located on said X-axis, and two of these Hall elements are located on said Y-axis, perpendicular to said X-axis.

Or more specifically, in an embodiment, the substrate comprises a first sensor (S1) located at a first location (X1) on a predefined axis (X), and a second sensor (S2) located at a second location (X2) on said predefined axis (X) spaced apart ($\Delta x$) from the first location (X1); the first sensor (S1) comprising a first IMC-structure (IMC1) and four horizontal Hall elements including a first and a second and a third and a fourth horizontal Hall element (HP1, HP2, HP3, HP4), the first and the second horizontal Hall element (HP1, HP2) being located on said predefined axis (X) at an edge of said first IMC structure (IMC1) and defining a first line segment on said axis (X), the third and optionally the fourth horizontal Hall element (HP3, HP4) being located on a first perpendicular bisector (Y1) of said first line segment at an edge of the first IMC structure (IMC1); the second sensor (S2) comprising a second IMC-structure (IMC2) and four horizontal Hall elements including a fifth and a sixth and a seventh and an eighth horizontal Hall element (HP5, HP6, HP7, HP8), the fifth and the sixth horizontal Hall element (HP5, HP6) being located on said axis (X) at an edge of said second IMC structure (IMC2) and defining a second line segment on said axis (X), the seventh and the eighth horizontal Hall element (HP7, HP8) being located on a second perpendicular bisector (Y2) of said second line segment (Y2) at an edge of the second IMC structure (IMC2); and wherein the position sensor device further comprises a processing circuit (620) configured for: determining an in-plane magnetic field component (Bx1) at the first location (X1) solely based on signals obtained from the first and the second horizontal Hall element (HP1, HP2); determining an in-plane magnetic field component (By1) and/or an out-of-plane magnetic field component (Bz1) at the first location (X1) solely based on signals obtained from the third and the fourth horizontal Hall element (HP3, HP4); determining an in-plane magnetic field component (Bx2) at the second location (X2) solely based on signals obtained from the fifth and the sixth horizontal Hall element (HP5, HP6); determining an in-plane magnetic field component (By2) and/or an out-of-plane magnetic field component (Bz2) at the second location (X2) solely based on signals obtained from the seventh and the eighth horizontal Hall element (HP7, HP8); and wherein the processing circuit is further configured for determining the angular position (α) of the sensor device relative to the magnetic field source, based on the first and the second in-plane magnetic field components (Bx1, Bx2) and on the in-plane magnetic field components (By1, By2) or on the first and the second out-of-plane magnetic field components (Bz1, Bz2).

Thus, stated in simple terms, this arrangement uses two sensors with four Hall elements each as opposed to two sensors with only two Hall elements each, e.g. as shown in FIG. 1.

It is an advantage of this arrangement that it allows individual trimming of the Hall elements of each sensor in order to obtain more accurate results for both Bx and Bz (or Bx and By) independently, which was not possible with the structure of FIG. 1, where in each sensor two Hall elements were used for measuring both Bx and Bz, hence trimming to optimize for Bx would negatively influence the measurement of Bz, and vice versa.

It is a major advantage that the measurements of the in-plane magnetic field components (Bx1, Bx2) and the out-of-plane magnetic field components (Bz1, Bz2) or the in-plane magnetic field components (By1, By2) are derived from signals obtained from distinct Hall elements. In this way electrical decoupling is achieved, resulting in higher accuracy, in particular, with a reduced cross-talk as compared to the prior art (e.g. FIG. 1).

It is a further advantage of this structure that it allows to measure the in-plane magnetic field component (Bx) with a passive amplification factor (typically in the order of about 5), thanks to the IMC structures, which improves the Signal-To-Noise ratio (SNR), and hence further improves accuracy.

It is a major advantage that the first and second Hall element on the one hand, and the third and optional fourth Hall element on the other hand are located at an edge of or under an IMC structure or an IMC component. And the same applies for the Hall elements of the second sensor. In this way the Hall elements of each sensor are mechanically coupled, and thus experience substantially the same temperature and mechanical stress. Hence, the signals obtained from these Hall elements drift in the same manner due to temperature variations and/or mechanical stress and/or other environmental or ageing effects, resulting in a position sensor with a reduced long-term-drift.

This sensor device is ideally suited for measuring a magnetic field in such a way that the Bx and Bz (or By) component measured by the sensor device vary dependent on the position, for example according to a sine and a cosine function, and that the third component (By or Bz) seen by the sensor device is substantially zero (e.g. smaller than 20% or smaller than 10% or smaller than 5% of the magnitude of the Bx component). Indeed, any potential cross-talk from the Bx-component of the magnetic field into the Bz-component measured by the device is substantially eliminated by using the specific structure with three or four Horizontal Hall elements located at an edge of or under the IMC, and any potential cross-talk of the By-component into the Bz-component is absent, because there is no (significant) By-component. Thus the cross-talk from in-plane field components (Bx or By or combinations thereof) into the Bz-value are negligible.

Finally, it is an advantage of using two sensors rather than only one, because it allows to determine spatial gradient signals of Bx and Bz (or By), denoted as dBx/dx and dBz/dx (or dBy/dx). It is an advantage of calculating a position based on gradient signals rather than based on the original magnetic field values, because gradient signals are substantially insensitive to an external disturbance field, which further contributes to a higher precision.

The third and fourth Hall element may be located on a perpendicular bisector (Y1) of a first line segment defined by the first and second Hall element. Likewise, the seventh and eighth Hall element may be located on a perpendicular bisector (Y2) of a second line segment defined by the fifth and sixth Hall element.

The processing unit may be configured for determining the first in-plane magnetic field component (Bx1) based on a difference between the signals obtained from the first and second horizontal Hall element (HP1, HP2), and/or for determining the in-plane magnetic field component By1 based on a difference between signals obtained from the third and fourth horizontal Hall element (HP3, HP4), and/or for determining the out-of-plane magnetic field component (Bz1) based on a sum of the signals obtained from the third and fourth horizontal Hall element (HP3, HP4), and similarly for the second sensor. Or stated in other words, the sensor device may determine Bx1 based on signals obtained from HP1 and HP2, and determine Bx2 on the basis of HP3 and HP4, and determine Bz1 on the basis of HP5 and HP6, and determine Bz2 on the basis of HP7 and HP8. Hence the signals HP1 and HP2 are not used to determine Bz1. Thus, a common-mode signal from HP1 and HP2 does not have an influence on the value of Bz1, in contrast to prior art solutions. Likewise, the signals from HP5 and HP6 are not used to determine Bz2. The subtraction and summation of the signals may be performed in the analog domain or in the digital domain.

In an embodiment, the sensor device is configured for determining, at a first sensor location, a first magnetic field component (Bx1) oriented parallel to the substrate, based on a first difference of signals obtained from a first pair (HP1, HP2) of two of said only four horizontal Hall elements; and wherein the sensor device is configured for determining, at the first sensor location, a second magnetic field component (By1) oriented parallel to the substrate, based on a second difference of signals obtained from a second pair (HP3, HP4) of two other of said only four horizontal Hall elements.

Optionally, the horizontal Hall elements of the first pair are individually trimmed for determining said first magnetic field component (Bx1); and the horizontal Hall elements of the second pair are individually trimmed for determining said second magnetic field component (By1).

In an embodiment, the sensor device is configured for determining, at a first sensor location (e.g. X1), a first magnetic field component (Bx1) oriented parallel to the substrate, based on a first difference of signals obtained from a first pair (HP1, HP2) of two of said only four horizontal Hall elements; and the sensor device is configured for determining, at the first sensor location (e.g. X1), a second magnetic field component (Bz1) oriented orthogonal to the substrate, based on a sum of signals obtained from a second pair (HP3, HP4) of two other of said only four horizontal Hall elements.

Optionally, the horizontal Hall elements of the first pair are individually trimmed for determining said first magnetic field component (Bx1); and the horizontal Hall elements of the second pair are individually trimmed for determining said second magnetic field component (Bz1).

In an embodiment, the sensor device comprises at least one sensor comprising an integrated magnetic concentrator structure (IMC) and a first and a second horizontal Hall element located on opposite sides of the IMC, and a third horizontal Hall element located under the IMC between the first and second horizontal Hall element.

Or more specifically, in an embodiment, the sensor device may comprise a first sensor (S1) and a second sensor (S2), wherein the first sensor (S1) comprises only three horizontal Hall elements (HP1, HP2, HP3), the first and second horizontal Hall element being located on opposite sides of the first IMC structure (IMC1), the third horizontal Hall element (HP3) being located under the first IMC structure; (e.g. in the middle between the first and second Hall element) and wherein the second sensor (S2) comprises only three horizontal Hall elements (HP5, HP6, HP7), the fifth and sixth horizontal Hall element being located on opposite sides of the second IMC structure (IMC2), the seventh horizontal Hall element (HP7) being located under the second IMC structure; (e.g. in the middle between the fifth and sixth horizontal Hall element); and wherein the processing circuit (620) is further configured for: determining a first difference (diff1) between the signals obtained from the first and second horizontal Hall element (HP1, HP2) indicative of the first in-plane magnetic field component (Bx1); and for determining a second difference (diff2) between the signals obtained from the fifth and sixth horizontal Hall element (HP5, HP6) indicative of the second in-plane magnetic field component (Bx2); and for obtaining a third signal from the third Hall element (HP3) indicative of the first out-of-plane magnetic field component (Bz1); and for obtaining a seventh signal from the seventh Hall element (HP7) indicative of the second out-of-plane magnetic field component (Bz2); and wherein the processing circuit is configured for determining said position based on said first and second difference (diff1, diff2), and on said third and seventh signal. Or simply stated, in this embodiment (e.g. illustrated in FIG. 8), the sensor device determines Bx1 based on signals obtained from HP1 and HP2, determines Bx2 on the basis of HP5 and HP6, determines Bz1 on the basis of HP3, and determines Bz2 on the basis of HP7. Hence the signals HP1 and HP2 are not used to determine Bz1. Likewise, the signals from HP5 and HP6 are not used to determine Bz2. The subtraction and summation of the signals may be performed in the analog domain or in the digital domain.

In an embodiment (with only a single sensor), the IMC structure is a single disk-shaped IMC.

In an embodiment (with two sensors spaced apart by ΔX), the first IMC-structure (IMC1) contains a single IMC component, and the second IMC-structure (IMC2) contains a single IMC component.

It is an advantage of using a single IMC component or object (per sensor) because it more evenly spreads the influence of local defects and/or local mechanical stress concentrations and/or temperature variations to the three or four Horizontal Hall elements. This is beneficial for robustness against long-term drift and environmental changes, because all Hall elements (per sensor) are exposed to substantially the same influence.

In an embodiment (with two sensors spaced apart by ΔX), each of the first and second integrated magnetic concentrator has a substantially circular or substantially elliptical shape.

A circular integrated magnetic concentrator is also referred to as "an IMC disk".

It is an advantage of such an IMC that it is easy to produce and reduces the risk of mechanical stress concentrations (as opposed to shapes with sharp edges). A substantially circular or substantially elliptical shape also has a positive influence on the smooth bending of the magnetic field lines from any direction, which may facilitate appropriate placement of the sensor device relative to the magnetic structure.

In an embodiment (with a single sensor) the IMC structure consist of four individual IMC elements (see e.g. left sensor of FIG. 4).

In an embodiment (with two sensors spaced apart by ΔX) each of the IMC structures consists of four individual IMC elements (see e.g. FIG. 4). In this embodiment, each Hall element is associated with its own IMC component. Each of these individual integrated magnetic concentrator components may have a substantially circular or elliptical or raindrop or tear drop shape. The same advantages as mentioned above are also applicable here.

In an embodiment, each of the Hall elements is individually trimmed. In this way, the effect of process variations can also be reduced or eliminated.

In an embodiment, the sensor device comprises at least one sensor comprising a first vertical Hall element oriented for measuring a first magnetic field component (e.g. Bx1) in said first direction (e.g. X), and a second vertical Hall element oriented for measuring a second magnetic field component (e.g. By1) in said second direction (e.g. Y).

In an embodiment, the position sensor device comprises two sensors (e.g. S1, S2) spaced apart in said first direction (e.g. X) for measuring a first magnetic field gradient (e.g. dBx/dx) and a second magnetic field gradient (e.g. dBy/dx; dBz/dx); and the processing circuit is configured for calculating the angular position of the magnet based on this first and second gradient.

In an embodiment, the magnetic sensor device comprises a first sensor (S1) comprising said plurality of magnetic sensitive elements configured for measuring said first magnetic field component (Bx1) oriented in said first direction (X), and said second magnetic field component (By1; Bz1) oriented in said second direction (Y; Z) perpendicular to the first direction (X) at a first sensor location (X1); and the magnetic sensor device further comprises a second sensor (S2) comprising a plurality of magnetic sensitive elements configured for measuring a third magnetic field component (Bx2) oriented in said first direction (X), and a fourth magnetic field component (By2; Bz2) oriented in said second direction (Y; Z) at a second sensor location (X2) spaced from the first sensor location; and the processing circuit is further configured for determining a first magnetic field gradient (dBx/dx) based on the first and third magnetic field component (Bx1, Bx2), and for determining a second magnetic field gradient (dBy/dx; dBz/dx) based on the second and fourth magnetic field component; and the processing circuit is configured for calculating the angular position (α) of the magnet based on this first (dBx/dx) and second (dBy/dx; dBz/dx) magnetic field gradient.

In an embodiment, the processing unit is configured for calculating two in-plane field gradients dBx/dx and dBy/dx, and for determining said angular position based on these gradients, for example as a function of a ratio of these gradients, e.g. a goniometric function. It is a further advantage that the ratio is also highly robust against demagnetization effects or certain positioning errors because the nominator and denominator vary in substantially the same manner.

In an embodiment, the processing unit is configured for calculating an in-plane field gradient dBx/dx and an out-of-plane field gradient dBz/dx, and for determining said angular position based on these gradients, for example as a function of a ratio of these gradients, e.g. a goniometric function. It is a further advantage that the ratio is also highly robust against demagnetization effects or certain positioning errors because the nominator and denominator vary in substantially the same manner.

The in-plane magnetic field gradient is typically calculated as the difference between the in-plane magnetic field components, and the out-of-plane magnetic field gradient is typically calculated as the difference between the out-of-plane magnetic field components.

In addition to the advantages above, it is a further advantage that the gradient signals have a reduced sensitivity to an external disturbance field. By determining the relative position based on these gradients, the determined position is more robust against an external disturbance field.

In an embodiment, the angular position is determined in accordance with the formulas of FIG. 3 case (a) or case (b) or case (c) or case (d).

In an embodiment, the processing unit is configured for determining said position using a look-up table, using the ratio as an index.

In an embodiment, the processing unit is configured for determining said position using mathematical formulas, e.g. goniometric formulas, for example an arctangent function.

In an embodiment, the magnet has an outer diameter "Do" in the range from 10 to 50 mm; and has a height "H" in the range from 2 to 10 mm.

In an embodiment, the ratio of the outer diameter Do and the height H is a value in the range from 0.1 to 2.0, or from 0.2 to 2.0, or from 0.2 to 1.5, or from 0.2 to 1.0, or from 0.5 to 2.0, or from 0.5 to 1.5.

In an embodiment, the sensor device is located at a distance from the rotation axis of at least 5 mm.

In an embodiment, the magnet is a two-pole magnet.

In an embodiment, the magnet is a four-pole magnet.

In an embodiment, the magnet is a multi-pole magnet having at least six poles.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3 is a schematic block diagram of a sensor structure comprising two sensors spaced apart along an X-axis, each having an IMC-structure and four horizontal Hall elements, as can be used in embodiments of the present invention.

FIG. 8 is a schematic block diagram of another exemplary sensor structure comprising two sensors spaced apart along an X-axis, each having an IMC-structure and only three horizontal Hall elements, as can be used in embodiments of the present invention.

FIG. 9(a) to FIG. 16(b) show examples of angular position sensor systems according to embodiments of the present invention. Three configurations are shown, referred to herein as: (i) "near the edge", (ii) "above or below the magnet", and (iii) "near the equator".

In FIGS. 9(a) to 9(f) the sensor device is located near an outer edge of the magnet, and is oriented and configured for measuring dBx/dx and dBz/dx, and is located where |By|/||Bx| seen by the sensor <20%.

In FIGS. 10(a) to 10(e) the sensor device is located near an outer edge of the magnet, and is oriented and configured for measuring dBx/dx and dBy/dx, and is located where |Bz|/|Bx| seen by the sensor <20%.

In FIGS. 14(a) to 14(d) the sensor device is located outside the outer diameter of the magnet, in a plane substantially halfway between the upper and lower surface of the magnet, and is oriented and configured for measuring dBx/dx and dBy/dx, and is located where |Bz|/|Bx| seen by the sensor <20%.

In FIGS. 16(a) to 16(d) the sensor device is located outside the outer diameter of the magnet, in a plane substantially halfway between the upper and lower surface of the magnet, and is oriented and configured for measuring Bx and By, and is located where |Bz|/|Bx| seen by the sensor <20%.

FIG. 17(a) to FIG. 24(b) show simulations of the radially inward or outward directed magnetic field component for various exemplary magnets, at various positions relative to the magnet.

FIG. 17(a) to FIG. 17(e) show simulations of the magnitude of the radially inward or outward directed magnetic field component of a first exemplary ring magnet (with OD=15 mm, ID=5 mm, H=2.5 mm) in a plane at 2 mm distance below the bottom surface of the magnet, which corresponds to the By-component sensible by the sensor device of FIGS. 9(a) to 9(f) or FIGS. 11(a) to 11(f), or the Bz component sensible by the sensor device of FIGS. 10(a) to 10(e).

FIG. 18(a) to FIG. 18(e) show simulations of the magnitude of the radially inward or outward directed magnetic field component of a second exemplary ring magnet (with OD=30 mm, ID=20 mm, H=10 mm) in a plane at 2 mm distance below the bottom surface of the magnet, as a variant of FIG. 17(a) to FIG. 17(e).

FIG. 20(a) shows a plot of the magnitude of the magnetic field components Bx, By, Bz of the magnetic field of FIGS. 19(a) to 19(d) on a circle with radius Rs, in a plane 2 mm below the bottom surface of the magnet, as a function of the radius Rs.

FIG. 20(b) shows a plot of the ratio of the By-magnitude over the Bx-magnitude for a portion of FIG. 20(a), in enlarged view.

FIG. 21(a) to FIG. 21(e) show simulations of the magnitude of the axially directed magnetic field component of an exemplary magnet (with OD=30 mm, ID=20 mm, H=10 mm) in a plane at 2 mm distance below the bottom surface of the magnet, which corresponds to the Bz-component sensible by the sensor device of FIGS. 12(a) to 12(e) or FIGS. 13(a) to 13(d).

FIG. 22(a) to FIG. 22(d) show simulations of the magnitude of the axially directed magnetic field component of an exemplary magnet (with OD=15 mm, ID=5 mm, H=2.5 mm) in a plane at 2 mm distance below the bottom surface of the magnet, as a variant of FIG. 21(a) to FIG. 21(e).

FIG. 24(b) shows a plot of the ratio of the By-magnitude over the Bx-magnitude for a portion of FIG. 24(a), in enlarged view.

FIG. 27(a) to FIG. 27(c) show the same plots as FIG. 26(a) to FIG. 26(c) with 10 dithering-levels.

Figure 1:
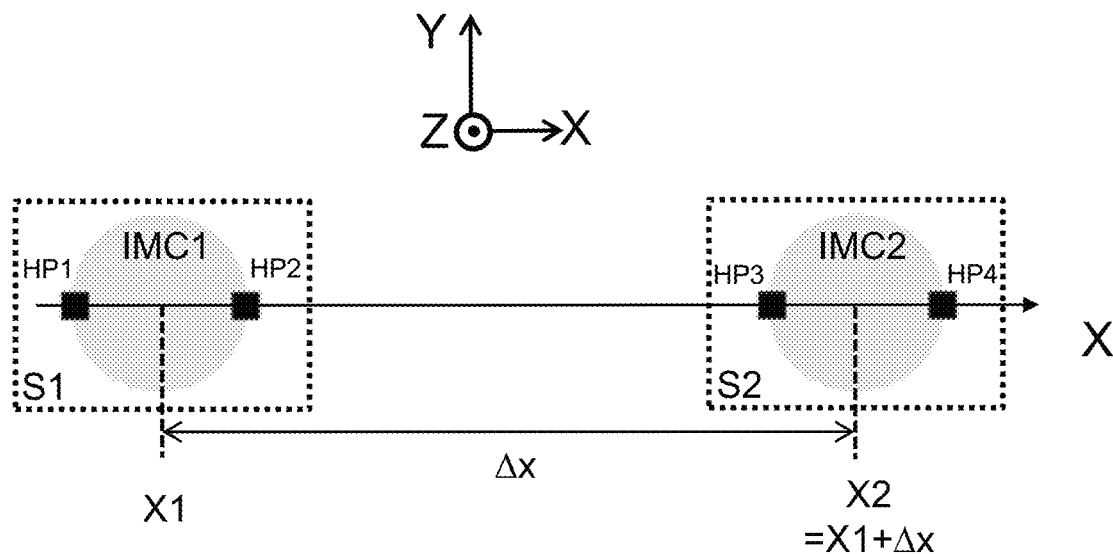
FIG. 1 is a schematic block-diagram of a sensor structure as can be used in a position sensor device. The structure comprises a first sensor at a first location X1, and a second sensor at a second location X2 along an X-axis, each sensor comprising an integrated magnetic concentrator (IMC) and a pair of two horizontal Hall elements arranged on opposite sides of the IMC. An in-plane magnetic field gradient (dBx/dx) and an out-of-plane magnetic field gradient (dBz/dx) can be measured by this device, and a linear or angular position of the sensor device relative to a magnet can be derived therefrom.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required. The sensor device may be configured for measuring at least two in-plane magnetic field components (referred to herein a Bx and By) or for measuring at least one in-plane magnetic field component (e.g. Bx) and at least one out-of-plane magnetic field component (e.g. Bz).

In this document, the term "sensor element" or "magnetic sensor element" or "magnetic sensor" can refer to a component or a group of components or a sub-circuit or a structure capable of measuring a magnetic quantity, such as for example a magneto-resistive element, a GMR element, an XMR element, a horizontal Hall plate, a vertical Hall plate, a Wheatstone-bridge containing at least one (but preferably four) magneto-resistive elements, etc. or combinations hereof.

In certain embodiments of the present invention, the term "magnetic sensor" may refer to an arrangement comprising one or more integrated magnetic concentrators (IMC) and one or more horizontal Hall elements, for example a disk shaped IMC and two or four horizontal Hall elements arranged near the periphery of the IMC.

In this document, the expression "in-plane components of a magnetic field vector" and "projection of the magnetic field vector in the sensor plane" mean the same. If the sensor device is implemented in a semiconductor substrate, this also means "magnetic field components parallel to the semiconductor plane".

In this document, the expression "out-of-plane components of a vector" and "Z component of the vector" and "projection of the vector on an axis perpendicular to the sensor plane" mean the same.

Embodiments of the present invention are typically described using an orthogonal coordinate system which is fixed to the sensor device, and having three axes X,Y,Z, where the X and Y axis are located in the substrate, and the Z-axis is perpendicular to the substrate. Furthermore, the X-axis is preferably oriented "parallel to the direction of relative movement" in case of a linear position sensor", or "tangential to the movement trajectory" in case of a curved movement trajectory, or in a "circumferential direction", i.e. tangential to an imaginary circle having a centre located on the rotation axis in case of an angular position sensor system comprising a rotatable magnet. In case of an angular position sensor system, one of the other axes (Y or Z) is preferably oriented parallel to the rotation axis of the magnet. For example, in FIG. 11(a) to FIGS. 15(a) to 15(e) and FIGS. 25(a) to 25(g) the Z-axis is parallel to the rotation axis of the magnet, while in FIGS. 16(a) to 16(d) and FIG. 17(a) to FIG. 17(e) the Y-axis is parallel to the rotation axis.

In this document, the expression "spatial derivative" or "derivative" or "spatial gradient" or "gradient" are used as synonyms. In the context of the present invention, the gradient is typically determined as a difference between two values measured at two locations spaced apart in the X-direction. In theory the gradient is typically calculated as the difference between two values divided by the distance "dx" between the sensor locations, but in practice the division by "dx" is often omitted, because the measured signals need to be scaled anyway.

In this document, the term "magnitude of a magnetic field component By" means "the maximum of the absolute value of the By-signal over a full 360° rotation", and likewise for Bx and Bz.

It is noted that in this application, the reference "HP1", "HP2", . . . "HPn" can refer to the first, second, . . . , n-th Hall element itself, or to the signal provided by that element. The intended meaning shall be clear from the context.

The present invention is related in general to angular magnetic position sensor systems, comprising a sensor device and a magnetic source, e.g. a permanent magnet.

More specifically, the present invention is related to magnetic sensor systems comprising a magnetic sensor device movable relative to a permanent magnet, the system having an improved accuracy in terms of one or two or all of the following:
improved robustness against "cross-talk",
improved robustness against an external disturbance field,
improved robustness against long term drift (especially related to mechanical stress).

Figure 2:
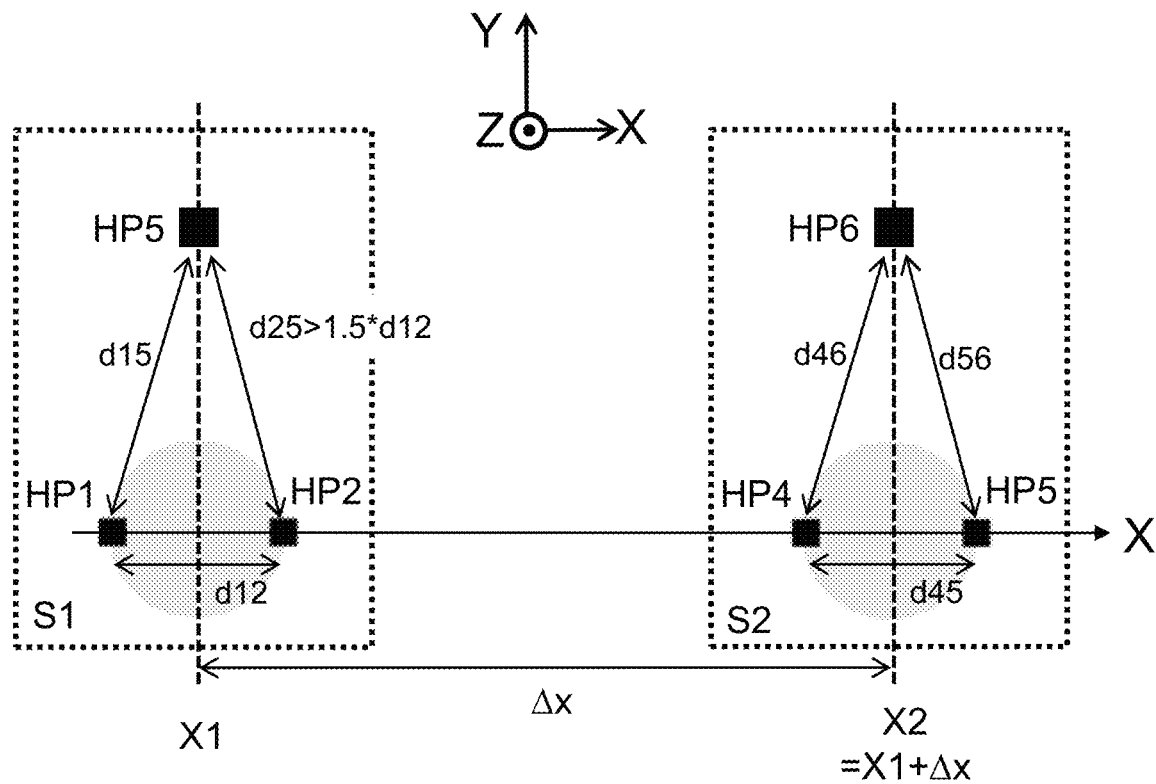
FIG. 2 is a schematic block-diagram of a sensor structure which is a variant of FIG. 1.

The technical problem(s) underlying the present invention, and the technical solution(s) provided herein, and the differences with existing solutions, may be best explained by means of FIG. 1 and FIG. 2.

FIG. 1 shows a sensor structure comprising a first sensor S1 located at a first location X1 on an X-axis, and a second sensor S2 located at a second location X2 on said X-axis, spaced from X1. Each of the first and second sensor S1, S2 comprises a disk shaped integrated magnetic concentrator (IMC) and two horizontal Hall elements arranged on the X-axis, on opposite sides of the IMC.

The sensor structure shown in FIG. 1 is also described in patent application EP19207358.3 filed by the same applicant on 6 Nov. 2019, claiming priority from EP18205705.9 filed on 12 Nov. 2018, both documents being incorporated herein by reference in their entirety. In case of conflicts, however, the information in the present document prevails. In that document, the sensors S1, S2 are used to determine an in-plane magnetic field gradient (dBx/dx) and an out-of-plane magnetic field gradient (dBz/dx), in order to determine an angular position of a sensor device comprising these sensors relative to a magnetic structure.

In order to understand the present invention, it suffices to know that the signals from the two Hall elements of each sensor (also referred to as "Hall Plates") can be used to determine both an in-plane magnetic field component Bx (parallel to the sensor substrate) and an out-of-plane magnetic field component Bz (perpendicular to the sensor substrate). More in particular, the in-plane magnetic field component Bx can be calculated by a subtraction of two signals, and the out-of-plane magnetic field component Bz can be calculated by a summation of two signals. This can be expressed mathematically as follows:

$$Bx1=(HP2-HP1) \quad [1]$$

$$Bz1=(HP1+HP2) \quad [2]$$

While being a compact and elegant solution, this structure may suffer from "cross-talk" or "common-mode" issues. Indeed, from the formulas [1] and [2] it can be understood that, if there is any mismatch, e.g. due to a geometrical layout mismatch, and/or due to a mismatch of the biasing circuit and/or read-out circuit of these Hall plates, and/or due to an offset error of an operational amplifier typically used in the readout circuitry, or a mismatch in magnetic gain or sensitivity, one or both of Bx1 and Bz1 may be inaccurate. For example, a magnetic field oriented in the Z-direction (perpendicular to the substrate) may incorrectly cause a non-zero value of Bx1 if the sensitivity of HP1 and HP2 are not matched. This phenomenon is referred to as "leakage from the Bz-field into the measured Bx-component", or "cross-talk from the Z-component into the X-component". Likewise, in case of a mismatch, a magnetic field oriented parallel to the sensor plane may incorrectly cause a non-zero value for Bz.

Of course, such mismatches are limited as much as possible using known techniques, e.g. by using identical layout symbols, and/or by laser trimming, and/or by using the so called "spinning current" readout technique, but there are limits to what is practically and economically feasible in a production environment. Hence, a certain degree of mismatch will always remain. Even more difficult to control is mismatch which drifts over time, for example related to mechanical stress variations, e.g. exerted by the moulding compound of a plastic packaging.

Desiring to further improve the accuracy of the sensor system, the inventors came to the idea to try to reduce the cross-talk by "decoupling" the measurement of the Bx component and the measurement of the Bz component, and they came to the structure proposed in FIG. 2, where a dedicated horizontal Hall element HP5 was added to the first sensor S1 to measure the Bz component at the first location X1, and a dedicated horizontal Hall element HP6 was added to measure the Bz component at the second location X2. The Hall element HP5 is spaced from HP1 and HP2 at least by 1.5 times the distance between HP1 and HP2 in order to decouple HP5 from HP1 and HP2, and likewise the Hall element HP6 is spaced from HP4 and HP5 at least by 1.5 times the distance between HP4 and HP5 in order to decouple HP6 from HP4 and HP5. It was expected that by using dedicated sensor elements and by locating them relatively far from the respective IMC-structures, the accuracy would be improved due to the decoupling.

This structure was built and evaluated, but surprisingly showed that the accuracy of the signals Bx and Bz was not improved. Analysis showed that the structure of FIG. 2 suffers from "drift problems", probably related to temperature mismatch and/or mechanical stress mismatch between the various Hall elements.

Based on these insights, and contrary to their original idea (of FIG. 2) which was based on "maximally decoupling" the measurement of Bx and Bz, the inventors came to the insight that it may be better to electrically and magnetically decouple the measurement of Bx and Bz, but mechanically couple the measurement of Bx and Bz, in order to improve the (short term and long term) accuracy. As far as is known to the inventors, this particular combination of coupling and decoupling spelled out so clearly, is not known in the art.

The inventors furthermore came to the idea of reducing cross-talk by locating the sensor device at a specific location relative to the magnet, namely at a location where one of the magnetic field components is much smaller than the other magnetic field components, e.g. at least a factor of 5 smaller in magnitude (i.e. max 20%), or at least a factor of 10 smaller (i.e. max 10%), or having a magnitude which is smaller than 5% of the other magnitude, or ideally is substantially equal to zero. And in preferred embodiments, also this insight is used. The rest of this document describes various proposed solutions, and contains four main parts:

In FIG. 3 to FIG. 8 several sensor structures are proposed, (with IMC and horizontal Hall elements, but these are not the only sensor structures that can be used in embodiments of the present invention, as will become clear further), In FIG. 10(a) to FIG. 16(d) several sensor arrangements are proposed, showing several preferred positions of the sensor device relative to the magnetic structure (also referred to herein as "sweet spots"), In FIG. 17(a) to FIG. 24(b) simulation results and graphs are shown, to visualize the "sweet spots" for several exemplary two-pole magnets.

In FIGS. 25(a) to 25(g) a sensor system with a four-pole magnet is described, and in FIG. 26(a) to FIG. 29 simulation results are shown to visualize the "sweet spots" for an exemplary four-pole magnet.

In the embodiments illustrated in FIG. 14(a) to FIG. 16(d), the sensor device is located substantially in a symmetry-plane of the magnet. In the other embodiments, the sensor device is not located in a symmetry-plane of the magnet but is located outside of a symmetry plane of the magnet.

The present invention provides an angular position sensor system comprising a permanent magnet for generating a magnetic field, and a magnetic sensor device for measuring said field. The magnet is movable relative to the sensor device or vice versa. The permanent magnet is a cylindrical magnet, e.g. a ring magnet or a disk magnet, and is rotatable about a rotation axis over an angle α that needs to be determined by the sensor device. The angular position sensor device has a substrate comprising a plurality of magnetic sensitive elements configured for measuring at least a first magnetic field component (Bx1) oriented in a first direction (X) and a second magnetic field component (By1 or Bz1) oriented in a second direction (Y or Z) perpendicular to the first direction (X). The sensor device further comprises a processing circuit configured for calculating the angular position (α) of the magnet based at least on the measured first and second magnetic field component (Bx1 and By1; or Bx1 and Bz1; or Bx1, Bx2, By1 and By2; or Bx1, Bx2, Bz1 and Bz2). The sensor device is oriented such that the first direction (X) is oriented in a circumferential direction with respect to said rotation axis, and such that the second direction (Y or Z) is either parallel to the rotation axis, or is orthogonal to (e.g. orthogonally intersecting) the rotation axis. The sensor device is located at a predefined position relative to the magnet where a magnitude of a third magnetic field component (Bz1 or By1) orthogonal to the first and second magnetic field component has an magnitude smaller than 20% of the magnitude of the first magnetic field component (Bx1) over a predefined angular range, preferably smaller than 15%, or smaller than 10%, or smaller than 5%, or ideally has a magnitude substantially equal to zero.

The expression "circumferential with respect to the rotation axis" means "tangential to an imaginary circle located in an imaginary plane perpendicular to the rotation axis, and having a centre located on the rotation axis".

In some embodiments, the ring or disk magnet is diametrically magnetized.

In some embodiments, the ring or disk magnet is axially magnetized.

In preferred embodiments, the predefined angular range is at least 180°, or at least 270°, or is 360°.

It is an advantage of such position sensor system that it can measure the magnetic field components more accurately, more specifically, in a manner which is less sensitive to cross-talk between the magnetic field components.

In preferred embodiments, the sensor device assumes a position in one of the following three "sweet spots" relative to the magnet:

(1) at a location (referred to herein as "above or below the magnet") in a plane β perpendicular to the rotation axis, at a predefined distance from 0.5 to 5.0 mm, or from 1.0 mm to 4.0 mm, or from 1.0 to 3.0 mm, or from 1.5 to 2.5 mm, e.g. at a distance equal to about 2 mm from the planar bottom surface or top surface of the magnet, and at a radial distance Rs from 40% to 60% or from 40% to 48% of the outer radius (in case of a disk magnet), or at a radial distance Rs between, e.g. substantially halfway between the inner radius Ri and the outer radius Ro of a ring magnet, as shown for example in FIGS. 12(a) to 12(e), FIGS. 13(a) to 13(d), or FIG. 29. The sensor device can be oriented such that the substrate thereof is perpendicular to the rotation axis, or parallel to the rotation axis;

(2) at a location (referred to herein as "near the equator") in a plane perpendicular to the rotation axis, passing through the centre of the magnet, at a radial distance Rs of about 102% to 150%, or from about 103% to 140%, or from about 105% to 125% of the outer radius of the ring magnet or disk magnet, as shown for example in FIGS. 14(a) to 14(d), FIGS. 15(a) to 15(e). The sensor device can be oriented such that the substrate is perpendicular to the rotation axis (e.g. FIGS. 14(a) to 14(d), FIGS. 16(a) to 16(d)) or parallel to the rotation axis (e.g. FIGS. 15(a) to 15(e));

(3) at a location (referred to herein as "near the corner") in a plane perpendicular to the rotation axis, at a predefined distance from 0.5 to 5.0 mm, or from 1.0 mm to 4.0 mm, or from 1.0 to 3.0 mm, or from 1.5 to 2.5 mm, e.g. at a distance equal to about 2 mm from the planar bottom surface or top surface of the magnet, and at a radial distance from 90% to 110% of the outer radius of the ring or disk magnet, or from 90% to 98%, or from 102% to 110% of the outer radius of the ring or disk magnet, as shown for example in FIG. 5, FIGS. 9(a) to 9(f), FIGS. 10(a) to 10(e), FIGS. 11(a) to 11(f). The sensor device can be oriented such that the substrate is perpendicular to the rotation axis (e.g. FIG. 5, FIGS. 9(a) to 9(f), FIGS. 11(a) to 11(f)) or parallel to the rotation axis (e.g. FIGS. 10(a) to 10(e)).

In preferred embodiments, the sensor device may be furthermore configured for measuring the first (e.g. Bx) and second magnetic field component (e.g. By or Bz) also at a second location X2 spaced apart from the first location X1 along the X-axis, and the processing circuit may be further adapted for determining a first magnetic field gradient (e.g. dBx/dx) and a second magnetic field gradient (e.g. dBy/dx or dBz/dx), and for determining the angular position of the magnet based on these gradients. Examples are shown inter alia in FIG. 5, FIGS. 9(a) to 9(f), FIGS. 10(a) to 10(e), FIGS. 12(a) to 12(e), FIGS. 14(a) to 14(d), FIGS. 15(a) to 15(e), FIGS. 25(a) to 25(g). Such embodiments provide the additional advantage of being highly robust against an external disturbance field.

Figure 4:
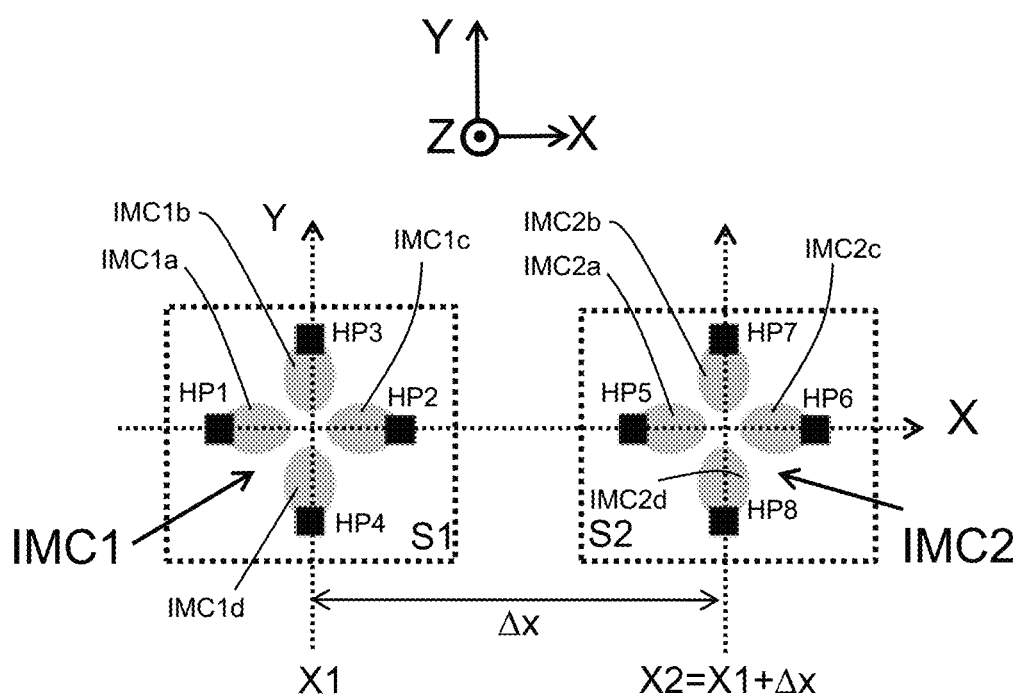
FIG. 4 is a schematic block diagram of another sensor structure comprising two sensors spaced apart along an X-axis, each having an IMC-structure and four horizontal Hall elements, as can be used in embodiments of the present invention.

In preferred embodiments, the sensor device may furthermore use a sensor structure comprising one or more sensors, each sensor comprising an IMC structure comprising one or more IMC elements and a plurality of horizontal Hall elements, for example four Horizontal Hall elements per sensor location (e.g. as shown in FIG. 3 or FIG. 4) or only three Horizontal Hall elements per sensor location (e.g. as shown in FIG. 8). Such embodiments provide the additional advantage of being highly robust against mechanical stress and/or long-term drift, because the temperature of and mechanical stress sensed by these Hall elements, is substantially the same.

These are the main principles underlying the present invention.

Referring now to the Figures.

FIG. 1 and FIG. 2 are already described above. In brief, FIG. 1 shows a structure for measuring a magnetic field component Bx oriented in the X-direction (parallel to the plane of the substrate comprised in the sensor device) and a magnetic field component Bz oriented in the Z-direction (perpendicular to the plane of the substrate) at two locations X1, X2 spaced apart along an X-axis. This structure functionally works, but may suffer from cross-talk in case of mismatch.

FIG. 2 shows a sensor structure with a first and a second sensor S1, S2 spaced apart along an X-axis. The first sensor S1 comprises an IMC and three horizontal Hall elements HP1, HP2, HP5, the first and second element HP1, HP2 are arranged at the periphery of the IMC, the third element HP5 being located relatively far from the IMC in order to decouple the Bz-measurement (using only HP5) from the Bx-measurement (using only HP1 and HP2). Likewise, the second sensor S2 comprises a second IMC with two horizontal Hall elements HP4, HP5 and a horizontal Hall element HP6 located relatively far from the IMC in order to decouple the Bz-measurement (using only HP6) from the Bx-measurement (using only HP4 and HP5). This structure functionally works, but is sensitive to mechanical stress variations and long-term drift problems.

FIG. 3 is a schematic block diagram of a first exemplary sensor structure proposed by the present invention.

This structure can be used for measuring both an in-plane magnetic field component Bx (parallel to the sensor plane) and an out-of-plane magnetic field component Bz (perpendicular to the sensor plane) at two different locations X1, X2, thus allows to determine an in-plane gradient (dBx/dx) and an out-of-plane gradient (dBz/dx), moreover with reduced cross-talk, and with reduced drift problems.

The sensor structure (or "sensor arrangement") of FIG. 3 comprises two sensors S1, S2, each having an IMC-structure and four horizontal Hall elements arranged at the periphery of the IMC structure, angularly spaced by 90°. This sensor structure can be used to measure a first, second in-plane magnetic field component Bx1, Bx2 at a first, second location X1, X2, and to measure an out-of-plane magnetic field component Bz1, Bz2 at said first, second location X1, X2. An in-plane magnetic field gradient dBx/dx can be calculated from the values Bx1, Bx2, and an out-of-plane magnetic field gradient dBz/dx can be calculated from the values Bz1, Bz2.

FIG. 3 case (b) shows a set of formulas which can be used to determine an angular position of the sensor device relative to the magnet (or vice versa), based on an arctangent function of a ratio of the first and second magnetic field gradient, but that is not absolutely required, and for example a processor with a look-up table (and optionally also linear interpolation) for converting said ratio into an angular position can also be used.

In order to reduce potential cross-talk between the magnetic field components, the measurement of Bx1 is based only on signals obtained from HP1 and HP2, and the measurement of Bz1 is based only on signals obtained from HP3 and HP4, and the measurement of Bx2 is based only on signals obtained from HP5 and HP6, and the measurement of Bz2 is based only on signals obtained from HP7 and HP8, and this structure is preferably located at a position where the magnitude of the By-component, denoted as |By| is smaller than 20% of the magnitude |Bx| and/or smaller than 20% of the magnitude |Bz|. In this way, potential leakage from Bz into Bx is reduced at least by a factor of 5. If the sensor device is located at a position where |By| is smaller than 10% of |Bx| and/or |Bz| the cross-talk is reduced at least by a factor 10, etc. It will be described further that such locations indeed exist, and where they are approximately located.

But the sensor structure of FIG. 3 can also be used to measure two in-plane magnetic field gradients dBx/dx and dBy/dx, (as can e.g. be used in the angular sensor system of FIGS. 12(a) to 12(e) and FIGS. 14(a) to 14(d)) using the set of formulas listed in FIG. 3 case (d). In this case, the sensor device is preferably located at a position where the magnitude of the Bz component (as seen by the sensor device) is small compared to that of Bx and/or By (as seen by the sensor device).

The sensor S1 of FIG. 3 contains a single integrated magnetic concentrator (IMC) and four horizontal Hall elements HP1, HP2, HP3, HP4 (also referred to as "horizontal Hall plates"). The IMC has a circular disk shape, but other shapes may also be used, for example an elliptical shape. The Hall elements are arranged in close vicinity of the IMC, and are angularly spaced by 90° at or near the periphery of the IMC. The second sensor S2 has a similar structure with four horizontal Hall elements HP5, HP6, HP7, HP8 arranged in close vicinity of a second IMC concentrator disk IMC2.

The first sensor S1 is located at a first location X1 on the substrate, and the second sensor S2 is located at a second location X2 on the substrate, spaced apart over a predefined distance Δx from X1, thus X2=X1+Δx in a direction X. As described above, the sensor device is preferably oriented such that the X-axis of the sensor device is oriented in a circumferential direction with respect to the rotation axis of the magnet (not shown in FIG. 3).

Two Hall elements HP1, HP2 of the first sensor S1 are located on the X-axis, and two Hall elements HP5, HP6 of the second sensor S2 are located on the X-axis. The other two elements HP3, HP4 of the first sensor S1 are located on an axis Y1 which is perpendicular to the X-axis, and the other two elements HP7, HP8 of the second sensor S2 are located on an axis Y2 which is also perpendicular to the X-axis. More particularly, the sensor elements HP1, HP2 define a first line segment on the X-axis, and the sensor elements HP3, HP4 are located on a perpendicular bisector Y1 of the first line segment. Likewise, the sensor elements HP5, HP6 define a second line segment on the X-axis, and the sensor elements HP7, HP8 are located on a perpendicular bisector Y2 of that second line segment.

The value of the in-plane magnetic field component Bx1 is determined solely as a function of the signals HP1 and HP2 (independent from HP3, HP4), and the value of the out-of-plane magnetic field component Bz1 is determined solely as a function of the signals HP3, HP4 (independent from HP1, HP2). Thus, the signals Bx1 and Bz1 are "electrically decoupled".

Furthermore, thanks to the perpendicular arrangement of the first pair of Hall elements containing HP1, HP2 on the one hand, and the second pair of Hall elements containing HP3, HP4 on the other hand, the measurements of Bx1 and Bz1 are also "magnetically decoupled".

Furthermore, thanks to the arrangement of the Hall elements HP1 to HP4 near the periphery of the first IMC structure, the four Hall elements will have substantially the same temperature, and they will experience substantially the same mechanical stress, thus they are "thermally and mechanically coupled". This combination of "electrical and magnetic decoupling" and at the same time "thermal and mechanical coupling" of the two pairs of horizontal Hall elements, improves accuracy by reducing cross-talk and by reducing mechanical stress variations, especially when the position is determined as a function of a ratio of signals, because influence from temperature and mechanical stress will occur both in the nominator and the denominator of such ratio, hence substantially cancel out.

As shown by the formulas of FIG. 3 case (b), a gradient of the in-plane magnetic field component can be calculated as: dBx/dx=Bx2−Bx1, and a gradient of the out-of-plane magnetic field component can be calculated as: dBz/dx=Bz2−Bz1. It is an advantage of using gradients, because it automatically reduces or cancels out the influence of a (constant) external disturbance field.

The angular position of the sensor device can then be calculated based on a ratio of these gradients, for example using a look-up table, or using a goniometric function, for example using an arctangent function of the ratio, optionally after multiplication with a predefined constant K, in case the magnitude of |dBx/dx| is not the same as the magnitude of |dBz/dx|. It is an advantage of using a look-up table that any non-linear transformation of the angle can be automatically included in the look-up table.

Figure 11A:
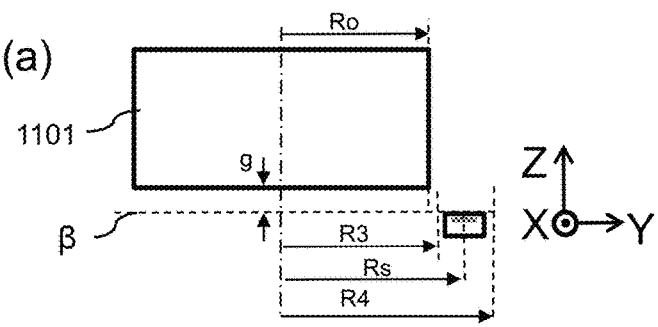
In FIGS. 11(a) to 11(f) the sensor device is located near an outer edge of the magnet, and is oriented and configured for measuring Bx and Bz, and is located where |By|/|Bx| seen by the sensor <20%.
Figure 11B:
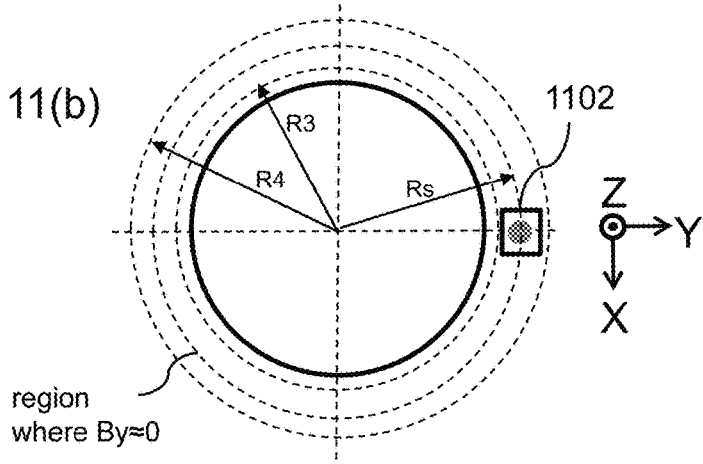
Figure 11C:
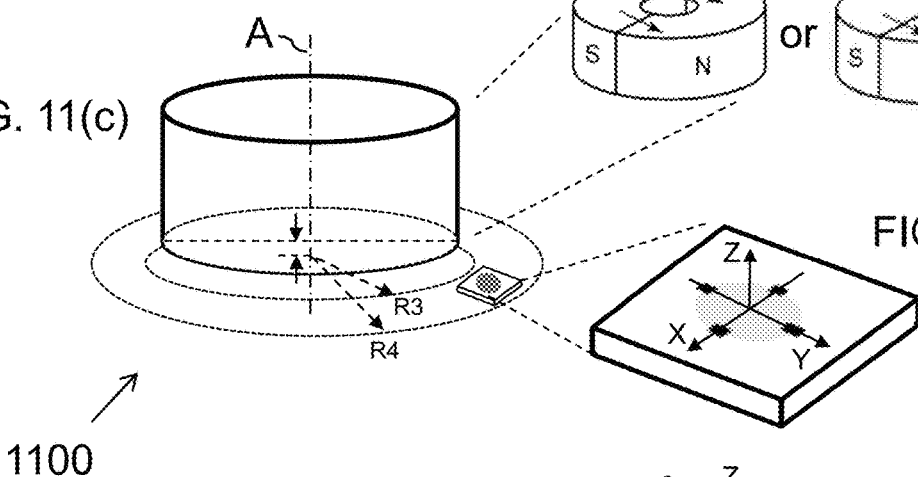
Figure 11D:
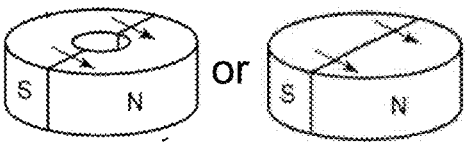
Figure 11E:
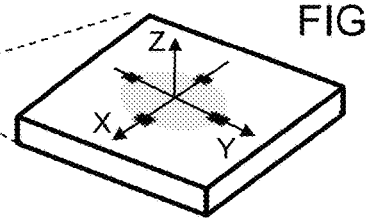
Figure 25A:
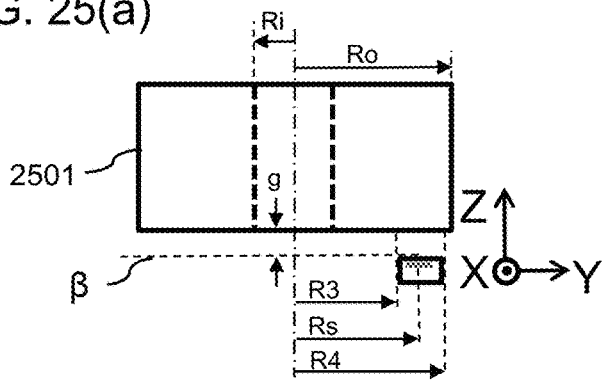
FIGS. 25(a) to 25(g) show a variant of the angular position sensor system of FIGS. 12(a) to 12(e) or FIGS. 13(a) to 13(d), using an axially magnetized four-pole magnet.
Figure 25G:
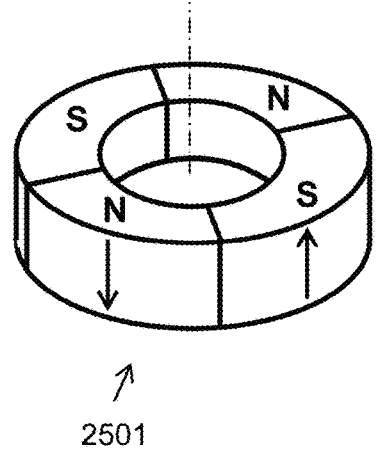
Figure 25B:
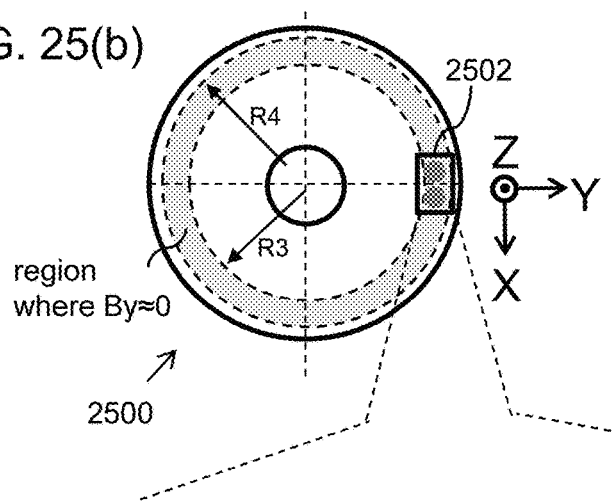
Figure 25C:
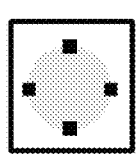

FIG. 3 case (a) provides a set of formulas which can be used to determine the angular position, when using a sensor structure similar to that of FIG. 3 for measuring Bx and Bz, but only having a single sensor, as can be used e.g. in the sensor system of FIG. 11(e) or FIG. 25(c).

FIG. 3 case (d) provides a set of formulas which can be used to determine the angular position, when using the sensor structure of FIG. 3 for measuring dBx/dx and dBy/dx, as can be used e.g. in the sensor system of FIGS. 12(a) to 12(e) and FIGS. 14(a) to 14(d).

FIG. 3 case (c) provides a set of formulas which can be used to determine the angular position, when using a sensor structure similar to that of FIG. 3 for measuring Bx and By, but only having a single sensor, as can be used e.g. in the sensor system of FIGS. 13(a) to 13(d) and FIGS. 16(a) to 16(d).

FIG. 4 is a schematic block diagram of a second exemplary sensor structure comprising two sensors S1, S2, each having an IMC-structure and four horizontal Hall elements, as can be used in embodiments of the present invention.

This sensor structure is a variant of the sensor structure of FIG. 3, the main difference being that the IMC structures of the first and second sensor each comprise four individual integrated magnetic concentrator components IMC1a-d and IMC2a-d, one for each horizontal Hall element, instead of a single disk shaped IMC. These individual IMC components preferably have a smooth shape, e.g. a circular shape, or an elliptical shape, or teardrop shape, or a raindrop shape, or the like.

The same advantageous effects as described above, in terms of reduced cross-talk and reduced long-term drift (e.g. related to temperature differences and/or mechanical stress differences) are also applicable here, because each of these Hall elements will also experience substantially the same temperature and the same mechanical stress, since they are overlaid by a similar IMC component. The sensor structure of FIG. 3 and of FIG. 4 are highly symmetric: they both have four symmetry axes (X, Y and the diagonals at 45°), and they look exactly the same after rotation over 90°. The same formulas as in FIG. 3 case (a) to (d) are applicable.

While not explicitly shown further, the sensor structure of FIG. 4 (or a single sensor thereof) can be used in all embodiments where the sensor structure of FIG. 3 (or a single sensor thereof) can be used.

Figure 5:
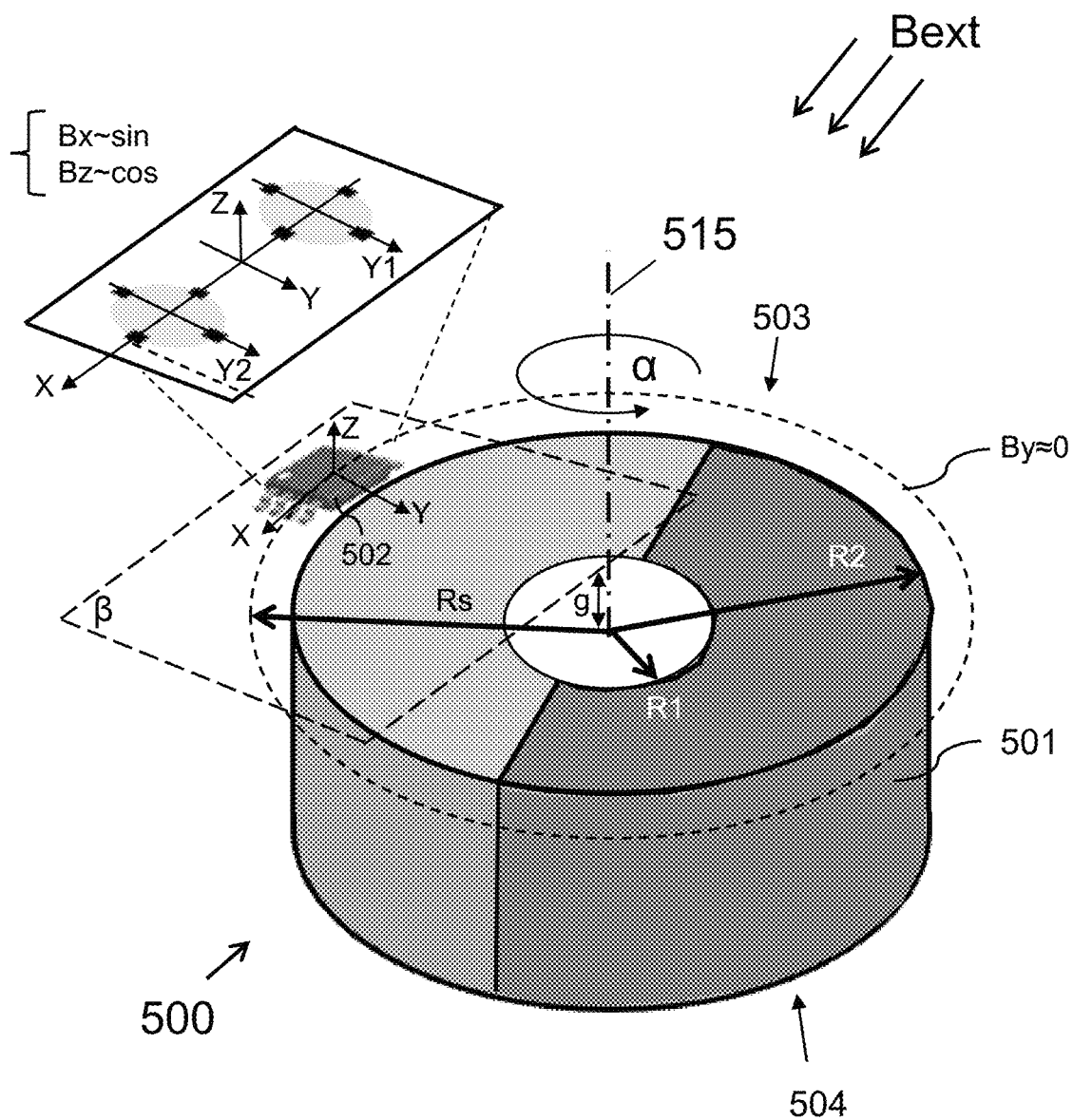
FIG. 5 shows an angular position sensor system according to an embodiment of the present invention, the system comprising a ring magnet and a sensor device movable relative to the magnet (or vice versa), the sensor device having a sensor structure as shown in FIG. 3.

FIG. 5 shows a position sensor system 500, comprising a two-pole magnet 501, more specifically a diametrically magnetized ring magnet, and a sensor device 502 in the form of an integrated semiconductor device. The ring magnet 501 is movable relative to the sensor device 502, or vice versa. More specifically, the ring magnet 501 is rotatable about a rotation axis 515 (e.g. when mounted to a rotor, or to a shaft), while the sensor device typically has a fixed position (e.g. mounted to a stator, or to a frame holding said shaft). The sensor device 502 comprises a sensor structure with one or two sensors, e.g. as shown in FIG. 3 or FIG. 4, and comprises electronics which will be described further in FIG. 6.

In the embodiment of FIG. 5, the sensor device 502 is located in a plane β parallel to an upper surface of the magnet 501, e.g. at a distance from about 1.0 mm to about 3.0 mm, e.g. equal to about 2.0 mm from said top surface 503, but the invention will also work if the sensor device is positioned at said distance from the bottom surface 504 of the ring magnet. The sensor device 502 is oriented with its internal X-axis tangential to the direction of relative movement, i.e. tangential to an imaginary circle shown in dotted line, and with its internal Y-axes perpendicular to said tangential line. Preferably the Y-axis is located halfway between the axis Y1 of the first sensor S1 and Y2 of the second sensor S2, and intersects the rotation axis 515 perpendicularly. Thus, the sensor device 502 is oriented such that its substrate containing the horizontal Hall elements and the X-axis and the Y-axis, is perpendicular to the rotation axis 515, and the Z-axis (which is perpendicular to the substrate) is parallel to the rotation axis 515.

At the sensor position shown, in close vicinity of the circular outer edge of the top surface or bottom surface of the magnet, the Bx and Bz-component vary substantially like a sine and cosine function of the angular position α, possibly with a different amplitude. Hence, the formulas of FIG. 3 case (a), based on Bx and Bz, or the formulas of FIG. 3 case (b), based on dBx/dx and dBz/dx can be used to determine the angular position α.

In order to reduce or further reduce potential cross-talk, the sensor device 502 is preferably located at a location relative to the magnet, e.g. at a radial distance Rs, where the magnitude of the By-component is smaller than 20% or smaller than 15% or smaller than 10% or smaller than 5% of the magnitude of the Bx-component, and/or where the magnitude of the By component is smaller than 20% or smaller than 15% or smaller than 10% or smaller than 5% of the magnitude of the Bz-component. More preferably the sensor device 502 is located where one or both of |By|/|Bx| and |By|/|Bz| is smaller than 15%, or even smaller than 10%, or even smaller than 5%, or where the value of |By| is substantially equal to zero, for any angular position α of the magnet of the measurement range.

It was surprisingly found that such positions indeed exists (see e.g. FIG. 17(a) to FIG. 17(e) and FIG. 18(a) to FIG. 18(e) for a two-pole magnet, and FIG. 25(a) to FIG. 29 for a multi-pole magnet), and it is almost unbelievable that the positions where this condition is satisfied includes a small annular zone over the full 360° around the rotation axis of the magnet, meaning that, when the sensor device is located in this position, the magnitude of the By-component is at least a factor 5, (or even 10 or more) smaller than the magnitude of Bx and/or Bz, for any arbitrary angular position of the magnet.

Referring back to FIG. 5.

In an embodiment, or in a mode of operation, the values of Bx1 and Bz1 obtained from the first sensor S1 are used to calculate a first angle α1, for example according to the formula α1=arctan(K*Bx1/Bz1), and the values of Bx2 and Bz2 obtained from the second sensor S2 are used to calculate a second angle α2, for example according to the formula α2=arctan(K*Bx2/Bz2), where K is a predefined constant which is typically different from 1.0 in case the magnitude of Bx and Bz is not the same. The value of α2 is slightly offset from the value α1 because the sensor S2 is at a slightly different position than S1, but this offset can be compensated, since it is fixed. Such a sensor device provides redundancy but is sensitive to an external disturbance field. If the value of α1 and α2 deviate more than a predefined threshold, it would be detected that an error has occurred (error detection), and a warning signal or an error signal may be output. Otherwise, the value of α1, or α2, or the average of α1 and α2 (optionally compensated with said offset) may be provided as the angular position that was to be measured.

In another embodiment or in a further embodiment, e.g. in another mode of operation, the values Bx1, Bx2, Bz1, Bz2 are further processed, to obtain a value for an in-plane field gradient dBx/dx and an out-of-plane field gradient dBz/dx, and to calculate a ratio of these gradients, and to determine the angular position of the sensor device based on this ratio, e.g. using the goniometric formulas of FIG. 3 case (b), or using a lookup table, optionally with interpolation. The values of such a table can be determined in known manners (e.g. by design, by simulation, or by calibration, or by combinations of these), and can be stored in a non-volatile memory 621 (e.g. flash or eprom or eeprom), etc. It is an advantage of calculating the angular position using a ratio of magnetic field gradients, because it makes the result highly insensitive to ageing effects (e.g. demagnetization effects) and highly insensitive to an external magnetic disturbance field.

In a variant of FIG. 5 (not shown), the sensor device would be rotated over 90° about its X-axis such that its Y-axis is parallel to the rotation axis 515 of the magnet, while the Z-axis is parallel to the magnet surface, and optionally the sensor device may be located at a slightly larger distance from the upper or lower magnet surface. In this configuration, the Bx and By component would behave substantially like a sine and cosine function. According to an aspect of the present invention, the sensor device would preferably be located at a radial distance Rs at which the magnitude of the Bz-component (sensible by the sensor device) would be smaller than 20% of the magnitude of the Bx and/or of the By component. In this case the formulas of FIG. 3 case (c) or (d) could be used to determine the angular position α of the magnet. This embodiment has the advantage that the Bx and the By-component are both passively amplified by the IMC with substantially the same factor, which is not the case for Bz in the embodiment of FIG. 5, but has the disadvantage that the sensor device typically needs to be positioned somewhat further from the magnet, because of its dimensions.

Figure 6:
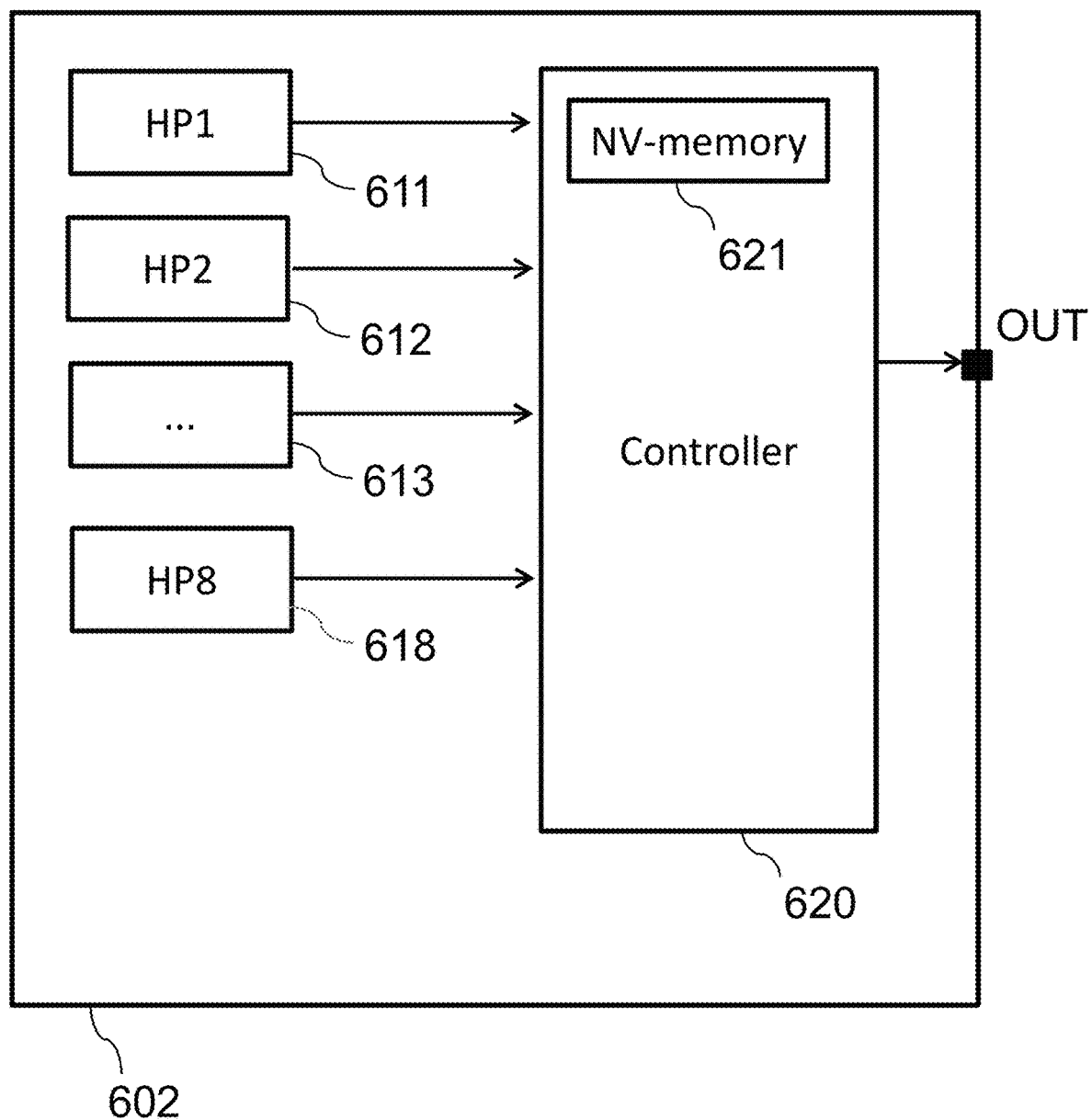
FIG. 6 is a schematic block diagram of an exemplary position sensor device according to an embodiment of the present invention, showing more details about the processing circuit thereof.

FIG. 6 is a schematic block diagram of an exemplary position sensor device 602 as can be used in embodiments of the present invention. Position sensor devices are known in the art, but a brief description is provided for completeness.

The position sensor device 602 of FIG. 6 comprises a plurality of Horizontal Hall elements (in the example: HP1 to HP8), arranged in a particular manner on a semiconductor substrate, not shown in FIG. 6, but for example as shown in FIG. 3 or FIG. 4.

The position sensor device 602 further comprises a processing circuit, for example a programmable processing unit 620 adapted for determining, e.g. calculating a value Bx1, Bz1, Bx2 and Bz2 based on the signals obtained from the horizontal Hall elements, e.g. by summation or subtraction, and for calculating an in-plane magnetic field gradient dBx/dx and an out-of-plane magnetic field gradient dBz/dx at two different locations, for example using one or more of the formulas shown in FIG. 3 case (b).

The processing unit 620 is preferably further adapted for determining an angular position based on a ratio of these gradient signals, for example using a look-up table and interpolation, or by making use of a goniometric function (e.g. an arctangent function) or in any other suitable way.

The angle value may be output by the controller, optionally along with an error indication signal which may be used for functional safety. The error indication signal may be indicative of whether the values of Bx1, Bx2, Bz1, Bz2 sufficiently match, e.g. by testing whether the difference between Bx1 and Bx2 is sufficiently small, and/or based on whether the difference between Bz1 and Bz2 is sufficiently small, or in other suitable ways.

While not explicitly shown, the sensor device 602 typically also further comprises biasing circuitry, readout circuitry, one or more amplifiers, analog-to-digital convertors (ADC), etc. Such circuits are well known in the art and are not the main focus of the present invention.

However, the present invention is not limited to sensor devices having eight horizontal Hall elements arranged for measuring an in-plane magnetic field gradient dBx/dx and an out-of-plane field magnetic field gradient dBz/dx, and in a variant, the processing unit 620 is adapted for determining, e.g. calculating a value Bx1, By1, Bx2 and By2 based on the signals obtained from the horizontal Hall elements, e.g. by summation or subtraction or directly, and for calculating an in-plane field gradient dBx/dx in a first direction X, and an in-plane gradient dBy/dx in a second direction Y perpendicular to X, for example using one or more of the formulas shown in FIG. 3 case (d).

Figure 11F:
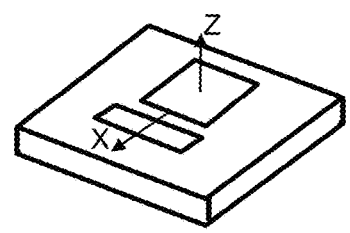
Figure 13D:
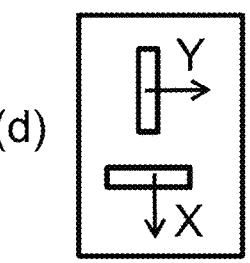
Figure 15A:
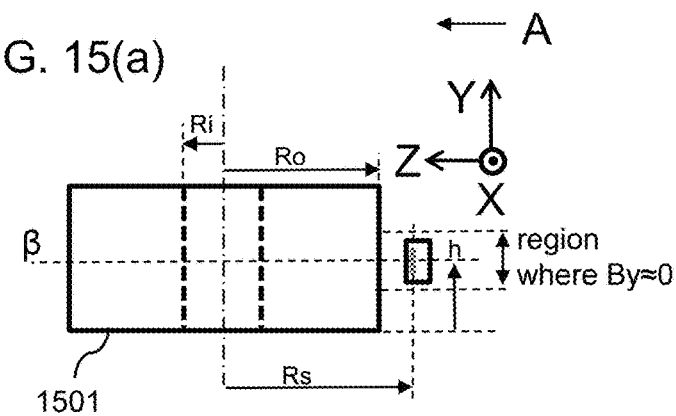
In FIGS. 15(a) to 15(e) the sensor device is located outside the outer diameter of the magnet, in a plane substantially halfway between the upper and lower surface of the magnet, and is oriented and configured for measuring dBx/dx and dBz/dx, and is located where |By|/|Bx| seen by the sensor <20%.
Figure 15B:
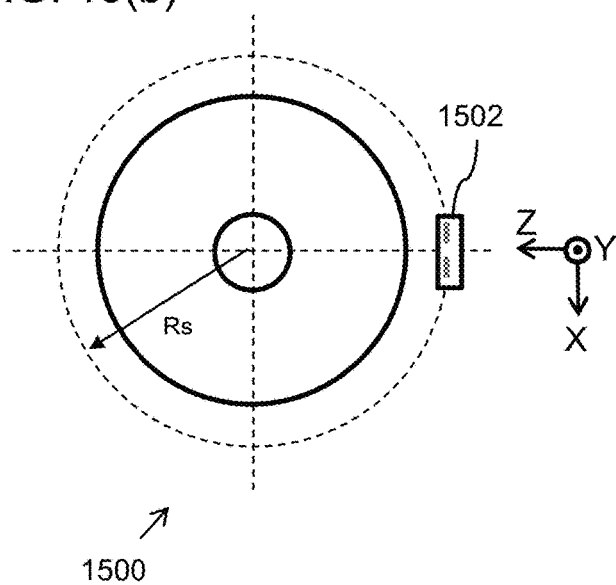
Figure 15C:
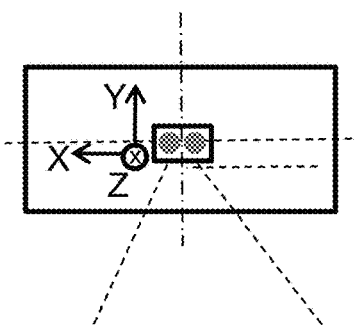
Figure 15D:
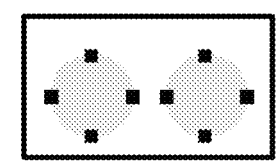
Figure 15E:
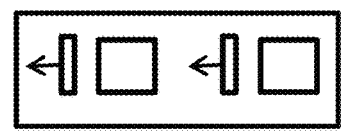
Figure 16A:
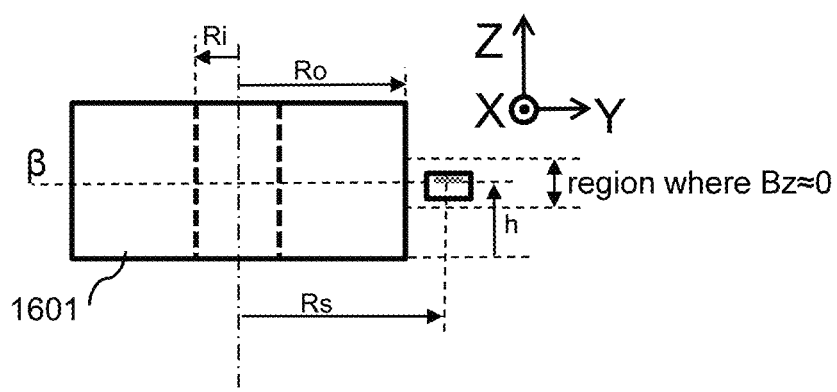
Figure 16B:
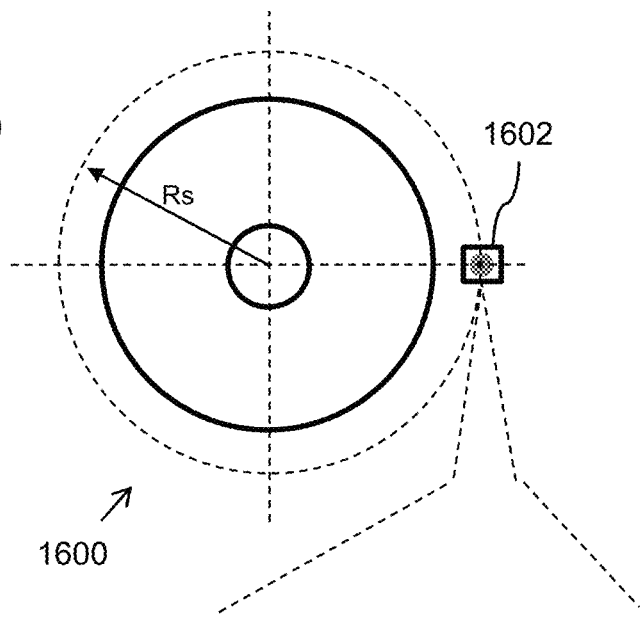
Figure 16C:
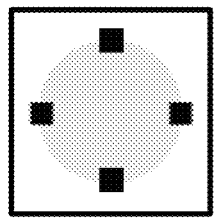
Figure 16D:
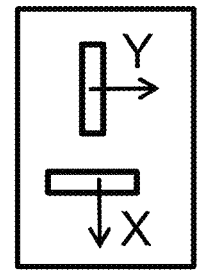
Figure 25D:
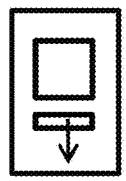

However, the present invention is not limited to sensor devices having eight horizontal Hall elements, and sensor structures with a different number and/or different type of magnetic sensor elements may also be used. For example, in a variant of the sensor device of FIG. 6, the position sensor device may comprise a plurality of magnetic sensitive elements selected from the group consisting of: horizontal Hall elements, vertical Hall elements, magneto-resistive elements, e.g. XMR or GMR elements, etc., for example:

FIG. 9(f), FIG. 15(e), FIGS. 25(d) and 25(f) show examples of a sensor arrangement having two sensors, spaced apart along an X-axis, each comprising one horizontal Hall element and one vertical Hall element without IMC;

FIG. 11(e), FIG. 13(c), FIG. 16(c), FIG. 25(c) shows examples of a sensor arrangement having a single sensor comprising IMC and four horizontal Hall elements;

FIG. 11(f), FIG. 15(e), FIG. 25(d) show examples of a sensor arrangement having a single sensor comprising a horizontal Hall element and a vertical Hall element without IMC;

FIG. 13(d), FIG. 16(d) show examples of a sensor arrangement having a single sensor comprising two vertical Hall elements without IMC;

FIG. 10(e), FIG. 12(d), FIG. 12(e), FIG. 14(d) show examples of a sensor arrangement having two sensors, spaced apart along an X-axis, each comprising two vertical Hall elements without IMC;

but other sensor structures may also be used.

Figure 7:
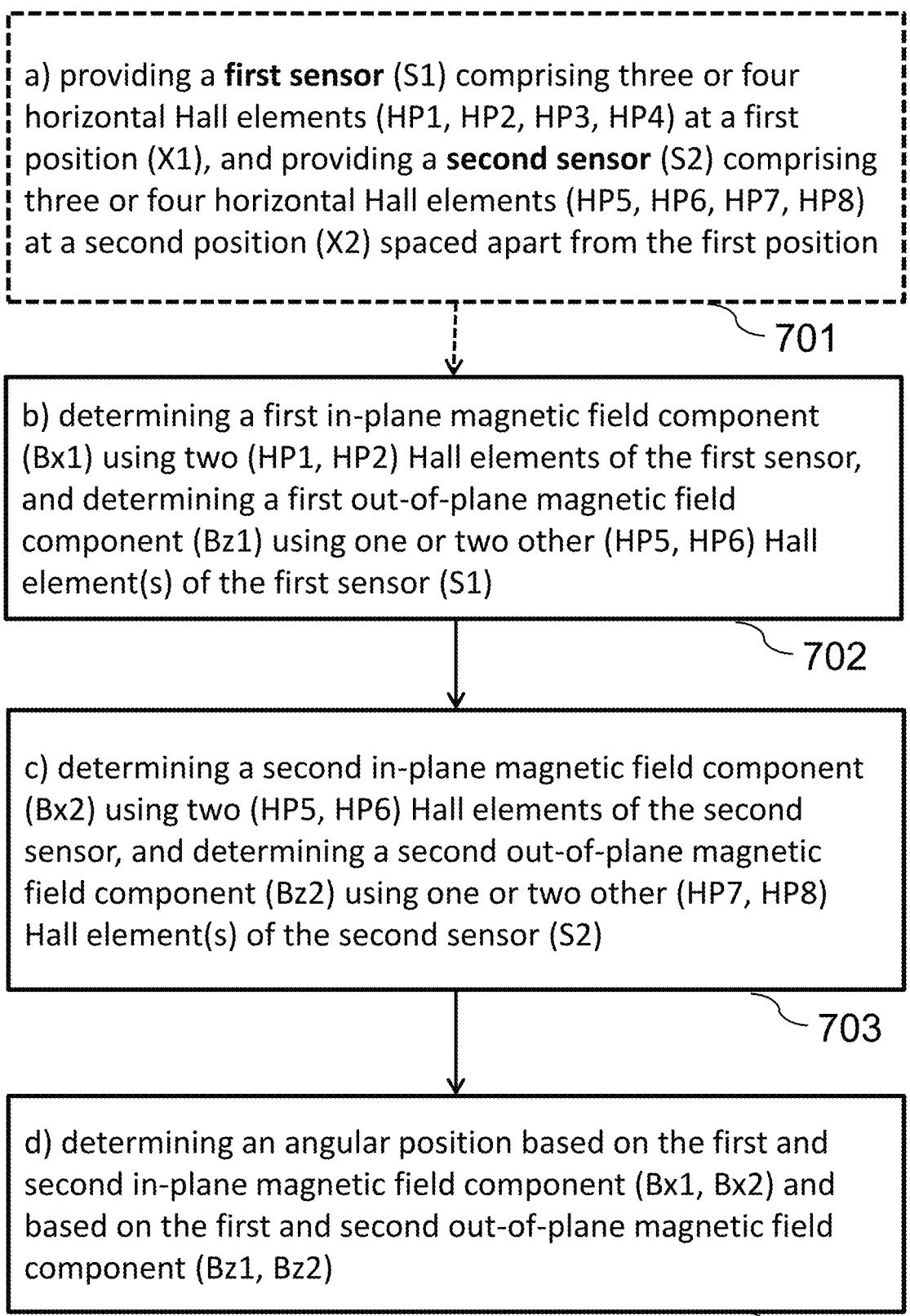
FIG. 7 is a flow-chart of a method for determining a position of a sensor device (e.g. having a structure as shown in FIG. 3 or FIG. 4 or FIG. 8) relative to a magnet, as can be used in the system of FIG. 5.

FIG. 7 illustrates a method of determining an angular position using a sensor device comprising two sensors S1, S2 as described in FIG. 3 or FIG. 4 or as will be described in FIG. 8, each having an IMC structure (the IMC structure comprising one or more IMC components), and having three or four horizontal Hall elements.

The method 700 comprises the steps of:

optional step a) of providing 701 a first sensor S1 comprising three or four horizontal Hall elements at a first position X1, and providing a second sensor S2 comprising three or four horizontal Hall elements at a second position X2 spaced apart from the first location X1 in a first direction X;

b) determining 702 a first in-plane magnetic field component (e.g. Bx1) using two (e.g. HP1, HP2) horizontal Hall elements of the first sensor S1, and determining a first out-of-plane magnetic field component (e.g. Bz1) using one (e.g. HP3 of FIG. 8) or two other Hall elements (e.g. HP3, HP4 of FIG. 3 or FIG. 4) of the first sensor S1;

c) determining 703 a second in-plane magnetic field component (e.g. Bx2) using two horizontal Hall elements (e.g. HP5, HP6) of the second sensor S2, and determining a second out-of-plane magnetic field component (e.g. Bz2) using one (e.g. HP7 of FIG. 8) or two other horizontal Hall elements (e.g. HP7, HP8 of FIG. 3 or FIG. 4) of the second sensor S2;

d) determining 704 an angular position based on the first and second in-plane magnetic field component (e.g. Bx1, Bx2) and based on the first and second out-of-plane magnetic field component (e.g. Bz1, Bz2).

The method may further comprise the step of: arranging the sensor device comprising said first and second sensor S1, S2 relative to a magnetic source, in such a way that an internal X-axis defined by the position X1, X2 of the first and second sensor S1, S2, is tangential to an imaginary circle located in a plane perpendicular to the rotation axis of the magnet and having a centre on the rotation axis, and such that an Y-axis of the sensor device, located halfway between the first and second sensor position X1, X2 and being parallel to the substrate, intersects the rotation axis 515 and is perpendicular to said rotation axis 515. This implies that a Z-axis, perpendicular to the substrate of the sensor device, is parallel to the rotation axis 515.

According to an important aspect of the present invention, the sensor device is furthermore preferably located at a location (relative to the magnet) where the By-component(s) of the magnetic field as seen by the sensor device, (which is oriented in a radial direction of the magnet) has a magnitude smaller than 20%, or smaller than 15%, or smaller than 10%, or smaller than 5% of the magnitude of the Bx-component(s) which is oriented in a circumferential direction of the magnet, preferably for each angle of the full 360° range of the magnet, and/or is smaller than 20% or 15% or 10% or 5% of the magnitude of the Bz component at said location, which is oriented in an axial direction of the magnet.

This method 700 corresponds to the formulas of FIG. 3 case (b), but the present invention is not limited thereto, and similar methods for the other sets of formulas of FIG. 3, or similar formulas for other sensor structures as described herein (see for example FIG. 8), or even other sensor structures not explicitly described in detail herein, can readily be formulated, mutatis mutandis.

For example, a method applicable to FIGS. 14(a) to 14(d), where the sensor device is arranged "near the equator", and where the sensor device is oriented with its semiconductor substrate perpendicular to the rotation axis, will measure two in-plane components Bx and By, and will preferably be located at a location where |Bz| is small relative to |Bx| and/or |By|, which can also be phrased as, at a location where the axial field of the magnet is small compared to the circumferential and/or radial field for any angular position of the magnet.

The method can also be reformulated for embodiments having only a single sensor location, for example as in FIGS. 11(a) to 11(f) or FIGS. 13(a) to 13(d) or FIGS. 16(a) to 16(d) or FIG. 25(c) or 25(d).

FIG. 8 shows an example of a sensor structure having a first sensor S1 with an IMC structure IMC1 (in the example of FIG. 8 having a circular disk shape) and only three horizontal Hall elements HP1, HP2, HP3, and a second sensor S2 spaced from the first sensor along an X-axis, and having a similar IMC structure IMC2 and only three horizontal Hall elements HP5, HP6, HP7.

All horizontal Hall elements are located on the X-axis. The elements HP1 and HP2 are located on opposite sides of IMC1, the element HP3 is located in the middle between HP1 and HP2, in the centre of, and below the IMC1. Contrary to what most people believe, the Hall element HP3 is perfectly capable of measuring a magnetic field component Bz1 oriented perpendicular to the substrate, despite its location under the IMC. Likewise, the elements HP5 and HP6 are located on opposite sides of IMC2, the element HP7 is located in the middle between HP5 and HP6 in the centre of, and below the IMC2. Due to its orientation and its central position, the elements HP3 and HP7 do not pick-up a Bx or a By-field, but only measure a Bz-field, hence are magnetically decoupled from HP1, HP2 and HP5, HP6 respectively. Since the signal of HP3 is not used for determining Bx1, and the signals of HP1 and HP2 are not used for determining Bz1, the sensor elements HP1 and HP2 are also electrically decoupled from HP3.

Importantly, the Hall element HP3 experiences substantially the same mechanical stress as HP1 and HP2 because they are located under the same IMC disk, and because of its location halfway between HP1 and HP2, the temperature of HP3 is substantially equal to that of HP1 and HP2. Likewise, the Hall element HP7 experiences substantially the same mechanical stress as HP5 and HP6 and has substantially the same temperature.

From the above, the skilled reader having the benefit of the present disclosure, will understand that the sensor structure of FIG. 8 offers many or all of the same advantages as the sensor structure of FIG. 3 or FIG. 4 in terms of accuracy, in particular in terms of insensitivity to an external disturbance field, a reduced sensitivity to cross-talk (in particular Bx into Bz or vice versa), a reduced sensitivity to mechanical stress, and a reduced long-term drift.

FIG. 9(a) to FIG. 16(d) show examples of angular position sensor systems comprising a permanent magnet rotatable about a rotation axis, and a sensor device located in the vicinity of said magnet. Before describing the embodiments individually, first general comments are given.

In envisioned embodiments, the magnet is preferably an axially or diametrically magnetized two-pole ring magnet with an inner diameter ID of at least 5 mm (e.g. about 8 mm), and an outer diameter in the range from 10 mm to 50 mm, e.g. from 15 mm to 45 mm, e.g. equal to about 20 mm, or equal to about 25 mm, or equal to about 30 mm; and having a height H in the range from 2 to 10 mm, e.g. equal to about 2.5 mm or equal to about 5.0 mm. In alternative embodiments, the magnet is a disk magnet having an outer diameter OD range and height range as specified for the ring magnet.

The embodiments of FIG. 9(a) to FIG. 16(d) differ mainly in the relative position and orientation of the sensor device with respect to the magnet. The sensor devices shown in FIG. 9(a) to FIG. 16(d) may comprise the sensor structures as explicitly shown, but the present invention is not limited to the specific examples shown, and other sensor structures may also be used, for example any of the sensor structures shown in FIG. 3 or FIG. 4 or FIG. 8, but other suitable sensor structures may also be used, for example sensor structures with one or more magneto-resistive elements.

The sensor devices of these sensor systems comprise a semiconductor substrate having one or more sensors, each comprising a plurality of sensor elements configured for measuring a magnetic field component in at least two orthogonal directions (e.g. two of the three directions selected from the group consisting of: radial, circumferential or axial with respect to the rotation axis of the magnet). In the drawings, three orthogonal axis X, Y, Z are fixed to the sensor device. The X and Y axis are parallel to the substrate (e.g. semiconductor substrate of the sensor device), the Z-axis is perpendicular to the substrate, hence the Bx and By component are called "in plane magnetic field components", and the Bz component is called "out of plane magnetic field component".

In embodiments of the present invention, the sensor device is oriented relative to the magnet such that:

1) the X-axis is oriented in a circumferential direction, i.e. tangential to an imaginary circle located in a plane perpendicular to the rotation axis and having a centre on said rotation axis, and either 2a) the Y-axis intersects the rotation axis orthogonally (in this case the Z-axis is parallel to the rotation axis), or 2b) the Z-axis intersects the rotation axis orthogonally (in this case the Y-axis is parallel to the rotation axis).

In case (1)+(2a), Bx is oriented in a circumferential direction of the magnet, By is oriented in a radial direction of the magnet, and Bz is oriented in an axial direction of the magnet. Thus a By-field component "seen" by the sensor device corresponds to a radial field component "seen" by the magnet, and a Bz-field component seen by the sensor device corresponds to an axial field component "seen" by the magnet.

In case (1)+(2b), Bx is oriented in a circumferential direction of the magnet, Bz is oriented in a radial direction of the magnet, and By is oriented in an axial direction of the magnet. Thus a Bz-field component "seen" by the sensor device corresponds to a radial field component "seen" by the magnet, and a By-field component seen by the sensor device corresponds to an axial field component "seen" by the magnet.

In preferred embodiments of the present invention, the sensor device (or a magnetic central point thereof) is situated in one of the following three locations (relative to the magnet):

i) in a position referred to herein as "above or below the magnet":
in a plane β at a small distance of about 1.0 to 5.0 mm below the bottom surface or above the top surface of the cylindrical magnet, at a radial distance Rs between the inner radius Ri and outer radius Ro of the ring magnet, e.g. substantially halfway between Ri and Ro, as shown for example in FIGS. 12(a) to 12(e) and FIGS. 13(a) to 13(d) and FIGS. 25(a) to 25(g). The ideal value of Rs depends on the dimensions of the magnet (inner diameter ID, outer diameter OD, height H) and on the predefined distance (g) between the plane β in which the substrate of the sensor device is located and the bottom or top surface of the magnet, and its magnetization (e.g. two pole, four-pole, six-pole, diametrically magnetized, axially magnetized, magnet material) and can—for a given magnet—easily be determined by performing a simulation, as shown for example in FIG. 17(a) to FIG. 17(e), FIG. 21(a) to FIG. 21(e), FIG. 22(a) to FIG. 22(d), and FIG. 29;

ii) in a position referred to herein as "near the corner":
in a plane β at a small distance of about 1.0 to 5.0 mm below the bottom surface or above the top surface of the cylindrical magnet, at a radial distance Rs of about 90% to 110%, or 90% to 98%, or 102% to 110% of the outer radius Ro of the ring magnet or disk magnet, as shown for example in FIGS. 9(a) to 9(f), FIGS. 10(a) to 10(e) and FIGS. 11(a) to 11(f). The ideal value of Rs depends on the dimensions of the magnet (inner diameter ID, outer diameter OD, height H) and on the predefined distance (g) between the plane β in which the substrate of the sensor device is located and the bottom or top surface of the magnet, and its magnetization (e.g. two pole, four-pole, six-pole, diametrically magnetized, axially magnetized, magnet material), and can—for a given magnet—easily be determined by performing a simulation, as shown for example in FIG. 17(a) to FIG. 20(b). It was found that for certain magnets and for certain distances (g), the ideal radial position Rs is larger than the outer radius Ro, e.g. at least 102% of the outer radius Ro (Rs≥Ro*102%). For some magnets and distances (g), the ideal radial position is substantially equal to the outer radius (Rs≈Ro). For other magnets and distances (g), the ideal radial position Rs is smaller than the outer radius Ro, for example at most 98% of the outer radius (Rs≤Ro*98%).

iii) in a position referred to herein as "near the equator":
in a plane β perpendicular to the rotation axis of the magnet, at substantially half the height H of the magnet, at a radial distance Rs of about 102% to 120% of the outer radius Ro of the ring or disk magnet, as shown for example in FIG. 14(a) to FIG. 16(d). The ideal axial position is at half the height of the magnet, whereas the ideal radial position Rs is not critical, but is preferably relatively close to the magnet where the Bx signal is relatively large, hence providing a good SNR, for example Rs is a value in the range from 1.0 to 10 mm, or in the range from 2.0 to 7 mm, e.g. equal to about 2.5 mm, or equal to about 3.0 mm, or equal to about 3.5 mm, or equal to about 4 mm. FIG. 23(a) and FIG. 23(b) and FIG. 24(a) and FIG. 24(b) show how the magnitude of the field component in the axial direction of the magnet (Bz in FIGS. 14(a) to 14(d) and FIGS. 16(a) to 16(d), By in FIGS. 15(a) to 15(e)) varies as a function of the distance "g" between the plane β in which the substrate of the sensor device is located, and the symmetry plane at half the height of the magnet, for a value of Rs equal to 3.0 mm.

The following table contains a list of various combinations of magnet types (column 2), a drawing (column 1), indication of the magnetic field components which are measured (column 3), location of the sensor device (column 4), an indication whether the angle is calculated based on field components (single sensor) or field gradients (two sensors) (column 5).

TABLE 1 list of some combinations of magnets and sensor positions and orientations

| Figure | magnet | device measures | device located at position (. . .) where (. . .) | device calculates angle based on: |
|---|---|---|---|---|
| FIGS. 12(a) to 12(e) | Ring | Bx, By [*1] | (i) where \|Bz\| is small | gradients |
| variant of FIGS. 12(a) to 12(e) | Ring | Bx, Bz [*2] | (i) where \|By\| is small | gradients |
| FIGS. 13(a) to 13(d) | Ring | Bx, By [*1] | (i) where \|Bz\| is small | components |
| variant of FIGS. 13(a) to 13(d) | Ring | Bx, Bz [*2] | (i) where \|By\| is small | components |
| FIGS. 9(a) to 9(f) | Ring or Disk | Bx, Bz [*1] | (ii) where \|By\| is small | gradients |
| FIGS. 11(a) to 11(f) | Ring or Disk | Bx, Bz [*1] | (ii) where \|By\| is small | components |
| FIGS. 14(a) to 14(d) | Ring or Disk | Bx, By [*1] | (iii) where \|Bz\| is small | gradients |
| FIGS. 15(a) to 15(e) | Ring or Disk | Bx, Bz [*2] | (iii) where \|By\| is small | gradients |
| variant of FIGS. 15(a) to 15(e) | Ring or Disk | Bx, Bz [*2] | (iii) where \|By\| is small | components |
| FIGS. 16(a) to 16(d) | Ring or Disk | Bx, By [*1] | (iii) where \|Bz\| is small | components |
| FIG. 25(c, d) | 4 pole Ring | Bx, Bz [*1] | (i) where \|By\| is small | components |
| FIG. 25(e, f) | 4 pole Ring | Bx, Bz [*1] | (i) where \|By\| is small | gradients | wherein:
(i) refers to "above or below the magnet,
(ii) refers to "near the corner", (or "near an outer edge")
(iii) refers to "near the equator",
[*1] in this case, Bx, Bz, By for sensor device=Btang, Baxial, Bradial for magnet respectively
[*2] in this case, Bx, Bz, By for sensor device=Btang, Bradial, Baxial for magnet respectively
"|By| is small" means that |By|/|Bx|<20% or <15% or <10% or <5%, and/or |By|/|Bz|<20% or <15% or <10% or <5%, or ideally |By|=0
"|Bz| is small" means that |Bz|/|Bx|<20% or <15% or <10% or <5%, and/or |Bz|/|By|<20% or <15% or <10% or <5%, or ideally |Bz|=0

The embodiments of FIG. 9(a) to FIG. 16(d) will now be discussed in more detail.

Figure 9A:
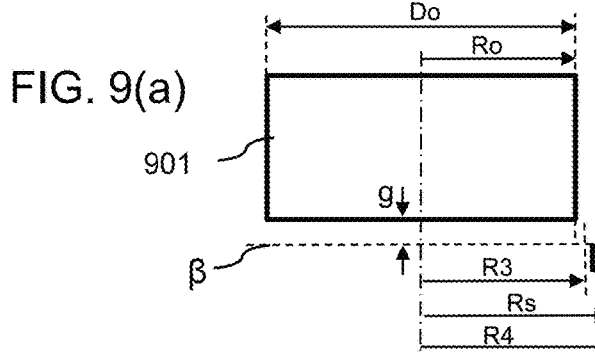
Figure 9B:
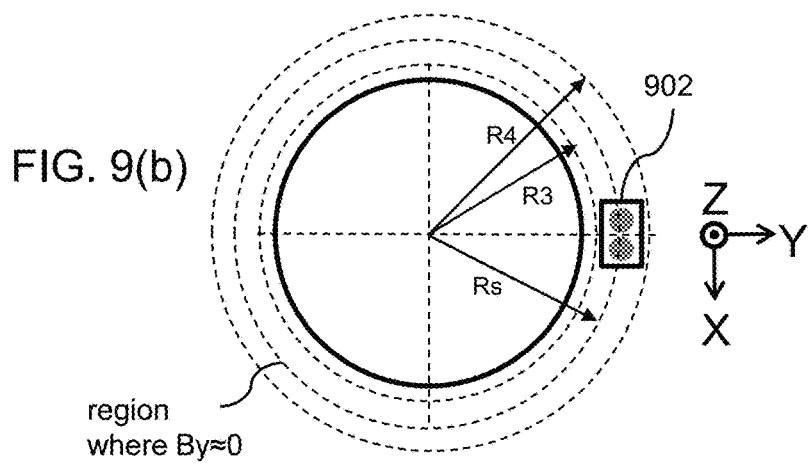
Figure 9C:
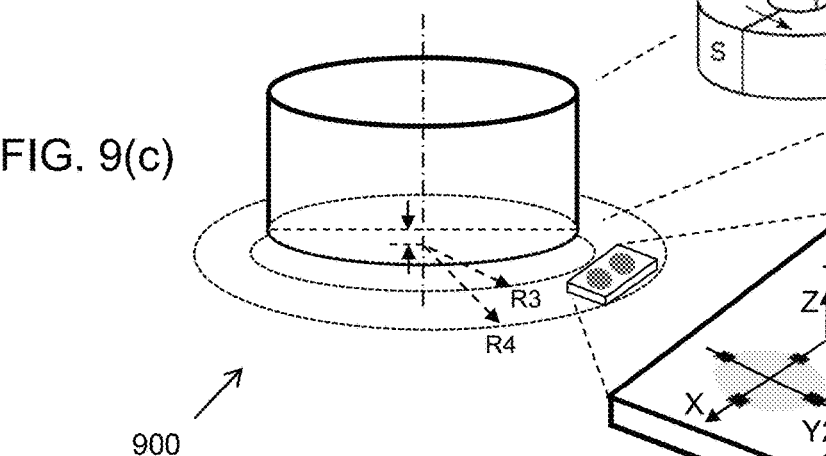

FIGS. 9(a) to 9(f) shows an angular position sensor system 900 in front view (FIG. 9(a)), in top view (FIG. 9(b)) and in perspective view (FIG. 9(c)). The magnet 901 may be a diametrically magnetized two-pole disk magnet or ring magnet (FIG. 9(d)). The sensor device 902 is located at a predefined position relative to the magnet, defined by a plane β and a radial distance Rs. The plane β is orthogonal to the rotation axis of the magnet and is located at a distance "g" from the bottom surface of the magnet or from the top surface of the magnet 901.

Figure 9D:
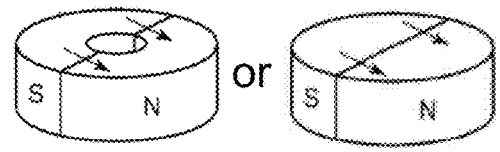
Figure 9E:
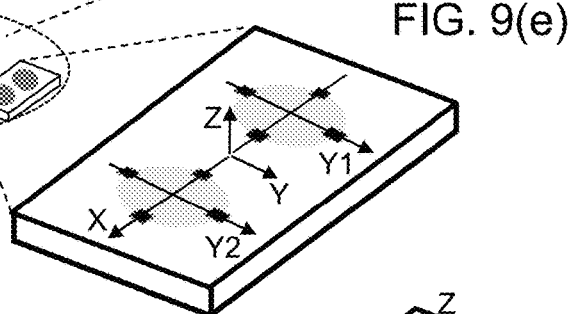

Or more precisely, the sensor device 902 of FIG. 9(e) has a substrate with a sensor structure as described in FIG. 3, and is oriented such that the substrate is substantially located in the plane β, and such that the X-axis of the sensor structure is oriented in a circumferential direction about the rotation axis of the magnet, or stated differently, such that the X-axis is tangential to an imaginary circle situated in the plane β and having a radius Rs, and such that the Y-axis intersects the rotation axis of the magnet. Thus, the Z-axis perpendicular to the substrate of the sensor device is parallel to the rotation axis of the magnet.

The sensor device 902 with the sensor structure of FIG. 9(e) is preferably configured for determining the angular position of the magnet based on the gradients dBx/dx and dBz/dx, for example using some or all of the formulas of FIG. 3 case (b).

In preferred embodiments of the present invention, the radial position Rs is specifically chosen to be a value between a value R3 and a value R4 at which the magnitude of the By-component of the magnetic field seen by the sensor, (i.e. the radial vector component of the magnetic field as seen by the magnet) is smaller than 20%, preferably smaller than 15%, more preferably smaller than 10%, or even smaller than 5% of the magnitude of the Bx component of the magnetic field seen by the sensor device, (i.e. the tangential or circumferential component of the magnetic field seen by the magnet) and most preferably is about equal to zero, and/or is smaller than 20%, preferably smaller than 15%, more preferably smaller than 10%, or even smaller than 5% of the magnitude of the Bz component of the magnetic field seen by the sensor device, (i.e. the axial component of the magnetic field seen by the magnet), and most preferably is about equal to zero, over a predefined angular range, e.g. over a full 360° rotation of the magnet around its axis.

FIG. 10(a) shows a diametrically magnetized ring magnet, preferably made of NdFeB (but other suitable materials can also be used, e.g. ferrite), having an outer diameter OD of 15 mm, an inner diameter ID of 5 mm, and a height H of 2.5 mm magnet, in perspective view.

Figure 17A:
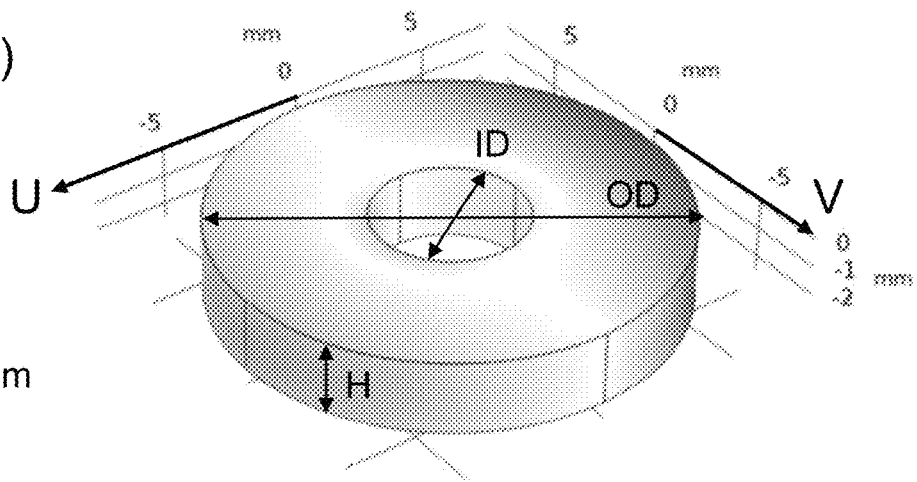
Figure 17B:
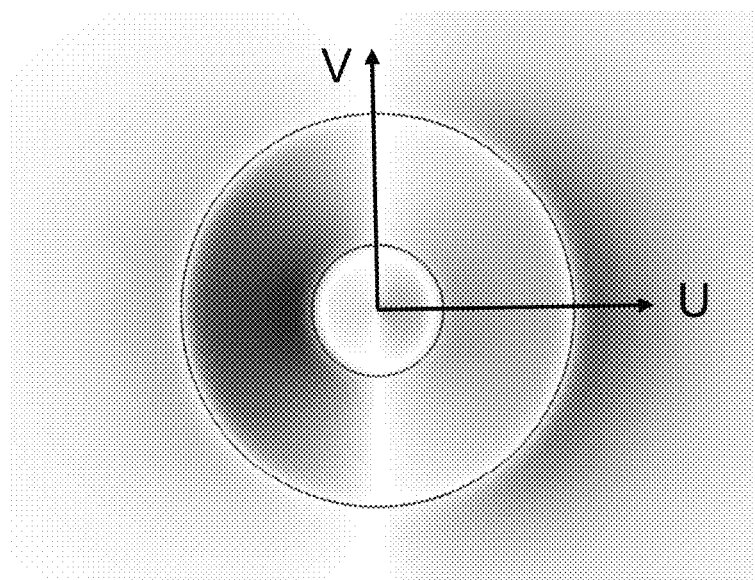

FIG. 17(b) shows a simulation of the magnitude (i.e. the absolute value of the amplitude) of the radial magnetic field component seen by the magnet, corresponding to the magnitude of the By-component seen by the sensor device, denoted as |By|, in a plane at a distance "g" of 2.0 mm below the magnet. These simulations were performed using "Comsol Multiphysics®", but other tools may also be used. The picture shows the magnitude in grayscale, where white corresponds to zero, and black corresponds to a relatively high magnitude, e.g. expressed in [mT], the exact value of which is not important. The radial dimensions of the magnet are superimposed in FIG. 17(b) but are omitted in FIG. 17(c) to clearly show the "annular zone" where |By| is smaller than 10% of |Bx|.

Figure 17C:
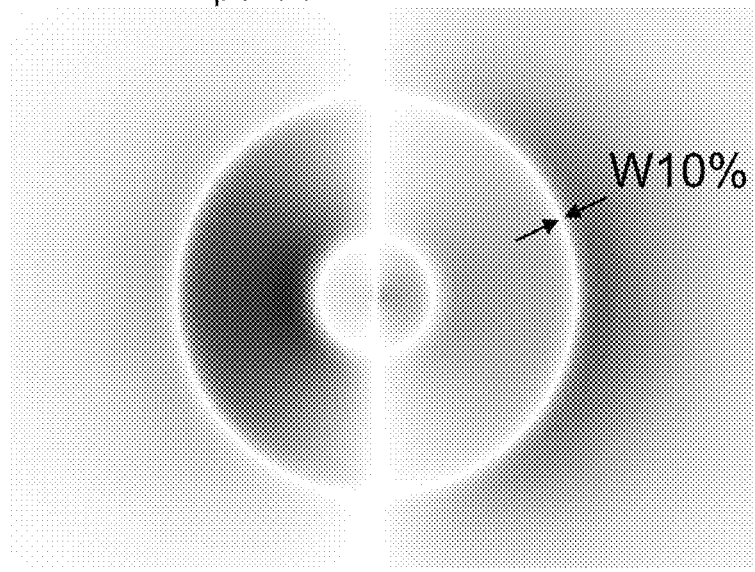
Figure 17D:
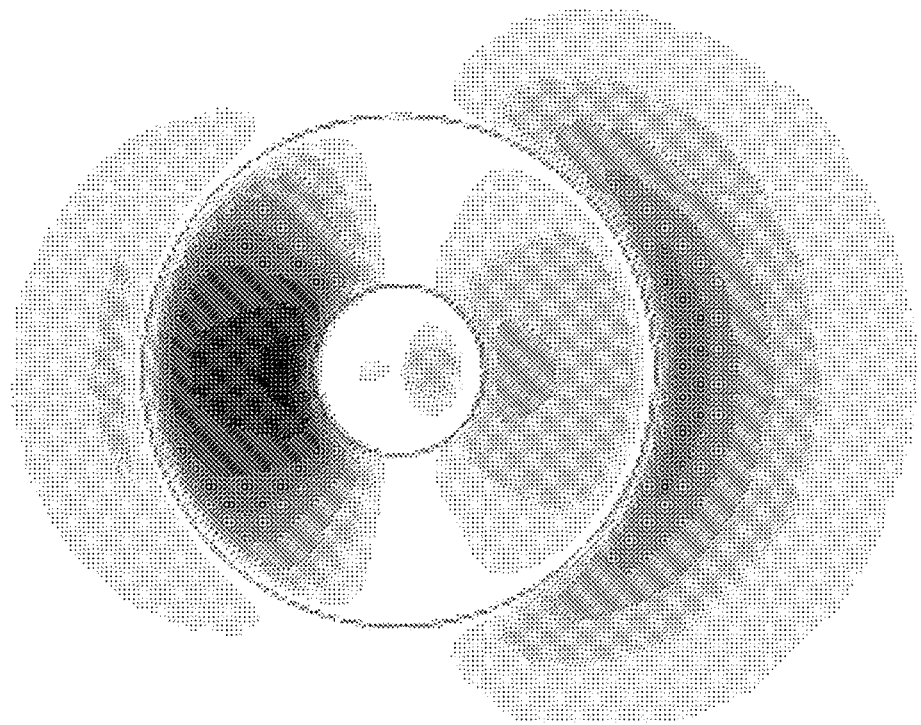
Figure 17E:
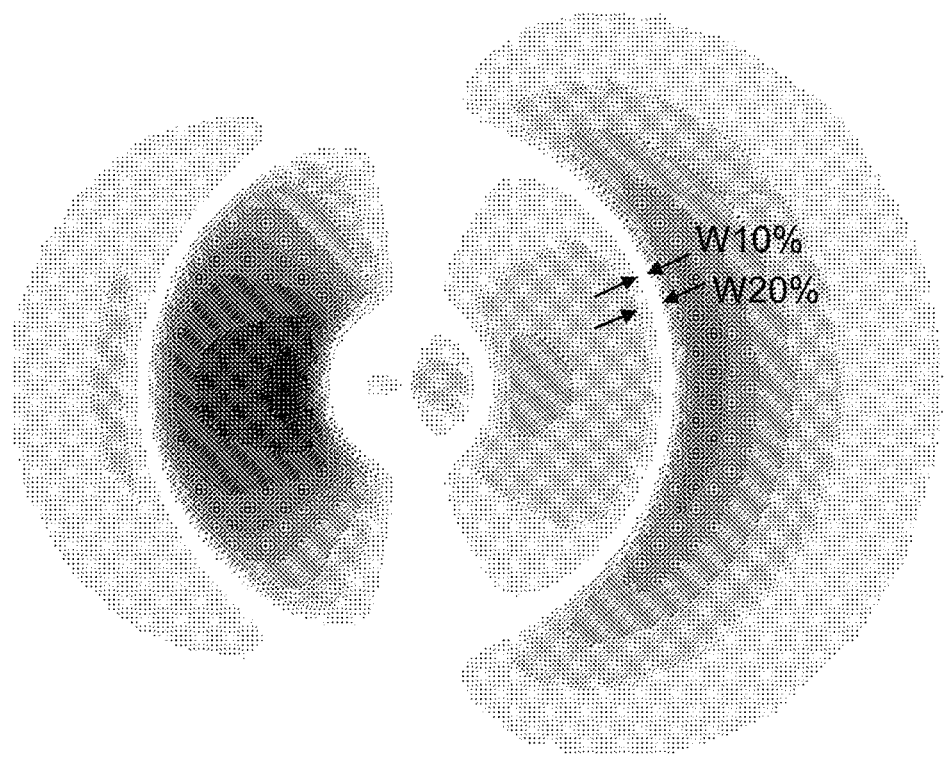

Since grayscale pictures are usually not reproduced by the patent offices with very high quality, FIG. 17(b) and FIG. 17(c) are also provided as dithered black and white pictures in FIG. 17(d) and FIG. 17(e), using ten dithering levels, thus showing steps of approximately 10% of the scale. The attentive reader will notice that the pictures of FIG. 17(d) and FIG. 17(e) are not fully symmetric, which is an artefact caused by the conversion of the colour pictures. Nevertheless, the effect to be shown (the existence and position of the annular white zone) is still very well visible.

It came as a surprise that there exists a zone where the value of |By| is very small, or more precisely stated, is smaller than 20% of |Bx|, or smaller than 15%, or smaller than 10%, or smaller than 5%, and/or is smaller than 20% of |Bz|, or smaller than 15%, or smaller than 10%, or smaller than 5%, or is approximately zero. But it was even more surprising that this zone is an annular zone extending over the full 360° range, especially when considering that the magnet is diametrically magnetized (not radially magnetised). The inventors decided to position the sensor device in this zone, (or more accurately stated to position the sensor device such that its magnetic sensitive elements are located in this zone), such that the value of |By| seen by the sensor device, will be close to zero, for any angle of the magnet, thereby drastically reducing potential cross-talk from the By field component into the value of Bx.

Before returning to FIGS. 9(a) to 9(f), a few other simulations are described next.

Figure 18C:
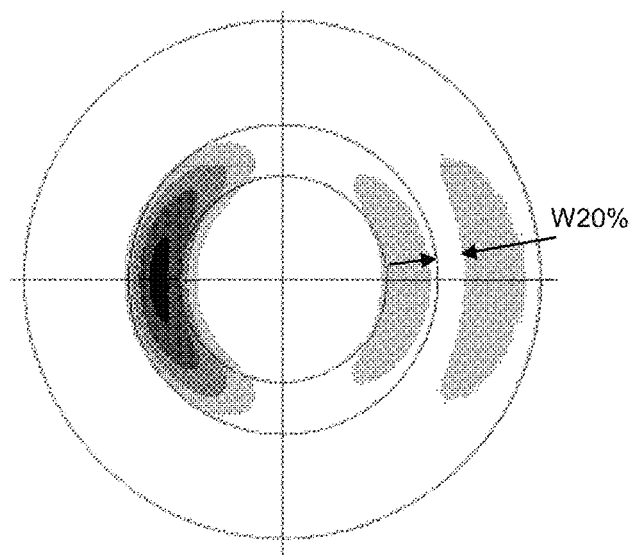
Figure 18D:
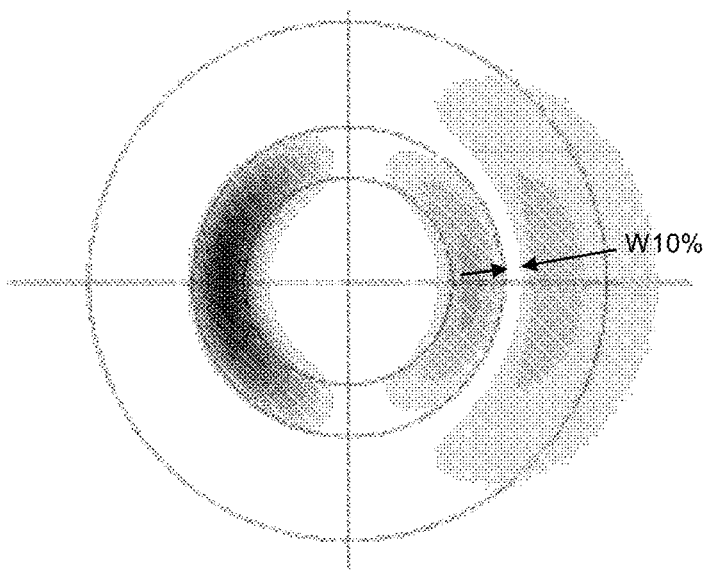
Figure 18E:
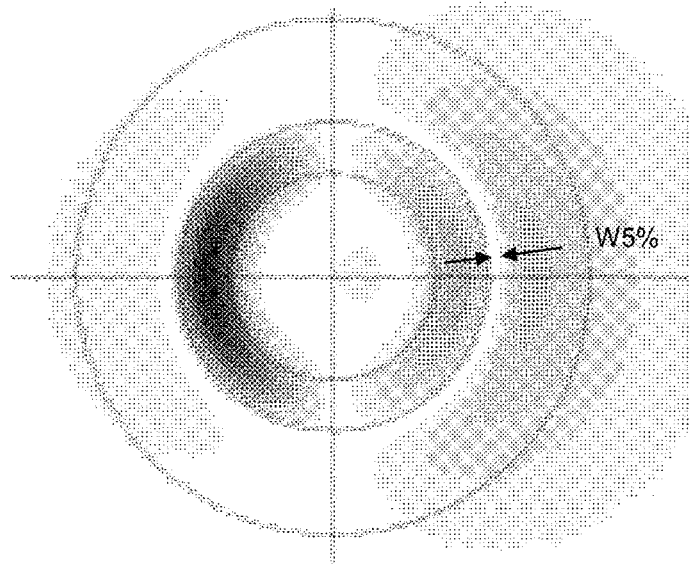

FIG. 18(a) to FIG. 18(e) shows simulation results for another magnet, having an outer diameter OD of 30 mm, an inner diameter ID of 20 mm, and a height H of 10 mm. FIG. 20(a) shows the magnet in perspective view. FIG. 20(b) shows the magnitude of the By-component (as seen by the sensor device), which corresponds to the radial magnetic field component of the magnet, for various positions in a plane β located at a distance of 2 mm below or above the magnet surface, in grayscale. The circle 1899 having a diameter of 50 mm is provided by the simulation tool, but is irrelevant for the present invention. FIG. 18(c) shows the simulation result with five dithering levels, each level corresponding to approximately 20% of the full scale. FIG. 18(d) shows the simulation result with ten dithering levels, each level corresponding to approximately 10% of the full scale. FIG. 18(e) shows the simulation result with seventeen dithering levels, each level corresponding to approximately 6% of the full scale. As mentioned above, the pictures are not symmetric because of an artefact of the colour conversion, but despite this anomaly, the pictures clearly show that an annular zone exists where the magnitude of the By component is very small, or more exactly is smaller than 20% of the magnitude of the Bx component, or is close to zero.

FIGS. 19(a) to 19(d) show another representation of the simulation results of the magnet shown in FIG. 17(a) to FIG. 17(e), having an outer diameter OD=15 mm, an inner diameter ID=5 mm, and a height H=2.5 mm. It is noted that these pictures are highly symmetric, and do not suffer from the artefacts mentioned above, because this picture is not derived from a color picture.

Figure 19A:
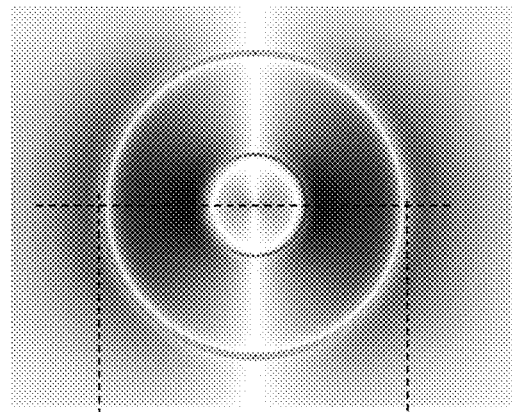
FIG. 19(a) to FIG. 19(d) show another presentation of the simulations of the magnitude of the radially inward or outward directed magnetic field component of the exemplary ring magnet of FIG. 17(a) to FIG. 17(e) (with OD=15 mm, ID=5 mm, H=2.5 mm), in a plane at 2 mm distance below the bottom surface of the magnet.
Figure 19B:
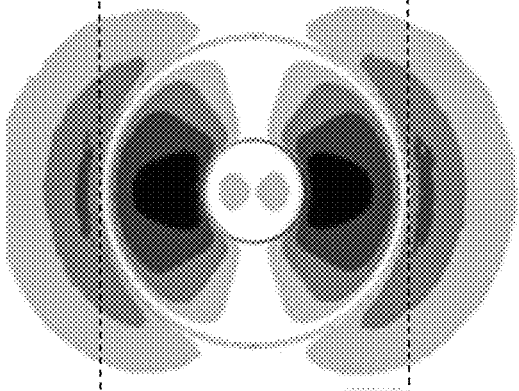
Figure 19C:
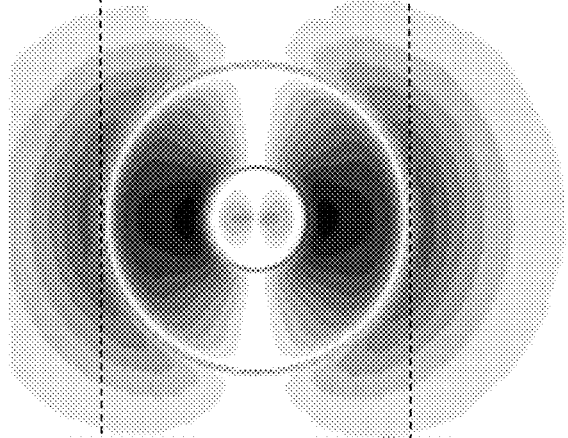
Figure 19D:
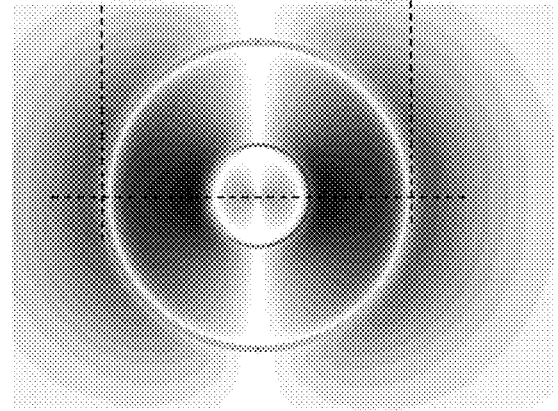

FIG. 19(a) shows the magnitude of the By-component (as seen by the sensor device), which corresponds to the radial magnetic field component of the magnet, for various positions in a plane located at a distance of 2 mm below or above the magnet surface, in grayscale. FIG. 19(b) shows the simulation result with five dithering levels, each level corresponding to approximately 20% of the full scale. FIG. 19(c) shows the simulation result with ten dithering levels, each level corresponding to approximately 10% of the full scale. FIG. 19(d) shows the simulation result with seventeen dithering levels, each level corresponding to approximately 6% of the full scale.

The main purpose of this simulation is to demonstrate that the annular zone where the By-component has said relatively low value, and ideally is substantially equal to zero, may be located at a radial position Rs smaller than the outer radius Ro of the ring magnet or disk magnet, but as can be seen, also in this case, the annular zone is located very close to the outer edge of the magnet, within the range from 90* to 99% of the outer radius Ro, or in the range from about 95% to 98% of the outer radius Ro.

Simulations with other magnets have shown that the envisioned annular zone where the By component has said relatively small value, may be located
  i) inside the outer radius, between R3=Ro*90% and R4=Ro*98%; or
  ii) substantially on the outer edge of the magnet, between R3=Ro*95% and R4=Ro*105%; or
  iii) outside the outer radius, between R3=Ro*102% and R4=Ro*110%.

The skilled person having the benefit of the present disclosure can easily find the exact range for a given magnet (given magnet material, given magnet dimensions, given magnetization), and a given distance "g", for example by doing a computer simulation. Indeed, it can be understood from the present disclosure that the annular zone exists, and where its narrowest width is located, e.g. on a line through the rotation axis of the magnet, and parallel to the magnetization direction (or stated otherwise: at the intersection of the plane β and a second plane containing the rotation axis and parallel to the magnetization direction, e.g. as indicated by the arrows in FIG. 11(d). Thus, it is not required to simulate the By value in all points of the 2D-plane, but only on a single line, but of course, the skilled person could also simulate the By value in a number of points on more than one line, for example on two or three lines, if so desired.

FIG. 20(a) shows how the magnitude of the Bx, By and Bz component vary along such a line, as a function of the radial distance Rs from the rotation axis. The "sweet spot" where the magnitude of the By component is small, is indicated by a rectangle in dashed line.

FIG. 20(b) shows this sweet spot in an enlarged view. In the example shown, the ratio of |By| over |Bx| is smaller than 20% if the sensor device is located at a distance Rs from about 7.1 to about 8.4 mm (thus inside an annular zone having a width of about 1.3 mm); and the ratio of |By| over |Bx| is smaller than 10% if the sensor device is located at a distance Rs from about 7.5 to about 8.1 mm (thus inside an annular zone having a width of about 0.6 mm), which is more than a typical diameter of IMC disks, which is a value in the order of about 200 to 400 micron.

Referring back to FIGS. 9(a) to 9(f), it can now be understood that, when locating the sensor device 902 inside the above described (white) annular zone, that the magnitude of the By-component is much smaller than the magnitude of the Bx component and/or the Bz component, and hence that any potential cross-talk from By into Bx, and/or By into Bz is reduced at least by a factor of 5 or 10 or even more. This is one of the underlying ideas of the present invention.

Figure 9F:
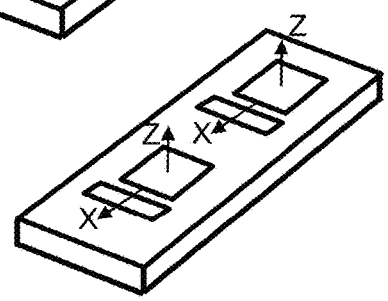

FIG. 9(f) shows a sensor device having two sensors, each having a horizontal Hall element and a vertical Hall element but without IMC. The horizontal Hall elements are capable of measuring Bz1 and Bz2. The vertical Hall elements are capable of measuring Bx1 and Bx2. When using such a sensor device in the system of FIGS. 9(a) to 9(f), many or all of the same advantages as described above are also achieved with this sensor structure, including having a measurement range of 360°, having a reduced sensitivity to cross-talk, being highly robust against an external disturbance field, etc.

In another variant (not shown), the sensor structure of FIG. 4 or FIG. 8 is used.

FIGS. 10(a) to 10(e) show another or further variant of the angular position systems described in FIGS. 9(a) to 9(f), where the sensor device 1002 is oriented such that its X-axis is tangential to the imaginary circle with radius Rs, but the Z-axis is intersecting the rotation axis of the magnet, and the Y-axis is parallel to said rotation axis (as can be obtained by rotating the sensor device 902 of FIGS. 9(a) to 9(f) by 90° around its X-axis). In this embodiment, the signals Bx and By (as seen by the sensor device) vary like a sine and cosine function of the angular position of the magnet, (possibly with a different amplitude), whereas the Bz-component (as seen by the sensor device) has a magnitude which is close to zero (or more precisely stated: |Bz|/|Bx|<20% or <15% or <10% or <5%; and/or |Bz|/|By|<20% or <15% or <10% or <5%; or ideally |Bz|≈0).

The sensor device 1002 can for example comprise the sensor structure of FIG. 3 (shown in FIG. 10(d)), or the sensor structure of FIG. 4, and can for example use the formulas of FIG. 3 case (d) to determine the angular position of the magnet, with the same advantages as described above, in particular with a reduced cross-talk and long-term drift, robust against mechanical stress and against an external disturbance field. But the present invention is not limited hereto, and other sensor structures can also be used, for example the sensor structure of FIG. 8, or FIG. 10(e), or sensor structures comprising magneto-resistive elements (not shown) configured for at least measuring Bx and By.

In variants of FIGS. 10(a) to 10(e). 10 (not shown), the sensor device 1002 contains only a single sensor, and the formulas of FIG. 3 case (c) may be used to determine the angular position. A disadvantage of such embodiment is that the measurement is not robust against an external disturbance field, but the advantage of reduced cross-talk, and having an angular range of 360°, is still present.

FIGS. 11(a) to 11(f) shows an angular position sensor system 1100 which is a variant of the angular sensor system 900 of FIGS. 9(a) to 9(f). The main difference between the sensor system 1100 of FIGS. 11(a) to 11(f) and the sensor system 900 of FIGS. 9(a) to 9(f) being that the sensor device 1102 contains a sensor structure configured for measuring a single in-plane magnetic field component Bx and a single out-of-plane magnetic field component Bz, and is configured for calculating the angular position of the magnet based on these components Bx, Bz, preferably as a function of the ratio of these values, e.g. using a goniometric function as described in FIG. 3 case (a), or using a look-up-table for converting the ratio into an angular position. Since the system 1100 does not use gradient signals, it is not robust against an external disturbance field, but all other advantages mentioned above for FIGS. 9(a) to 9(f), in particular e.g. having a reduced cross-talk, are also applicable here.

Various sensor devices capable of measuring an in-plane magnetic field component Bx and an out-of-plane magnetic field component Bz can be used, for example a sensor device having a sensor structure as shown in FIG. 11(e) with an IMC and four Hall elements, or a sensor structure as shown in FIG. 11(f) having one vertical Hall element and one horizontal Hall element oriented in suitable directions.

In a variant of the system of FIGS. 11(a) to 11(f), a sensor device having a single sensor as described in FIG. 4 (with four separate IMC elements) or FIG. 8 (with an IMC and only three horizontal Hall elements) is used.

In another or further variant (not shown), the sensor devices 1102 described in FIGS. 11(a) to 11(f) are oriented with their X-axis in the tangential direction, but with their Y-axis parallel to the rotation axis, in which case the Bx component (in a circumferential direction) and the By component (in axial direction of the magnet) would be measured during actual use, and the formulas of FIG. 3 case (c) are applicable. In this case, the Bz component (in radial direction of the magnet) would be very small (ideally close to zero).

In yet other embodiments, magneto-resistive elements are used as magnetic sensitive elements.

Figure 12A:
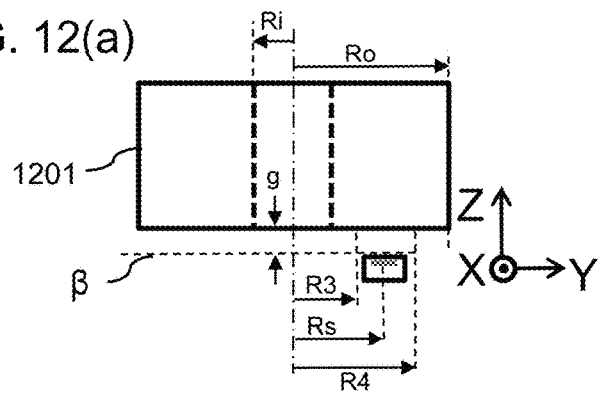
In FIGS. 12(a) to 12(e) the sensor device is located near the top or bottom surface of a ring magnet, substantially halfway between the inner and outer diameter, and is oriented and configured for measuring dBx/dx and dBy/dx, and is located where |Bz|/|Bx| seen by the sensor <20%.
Figure 13A:
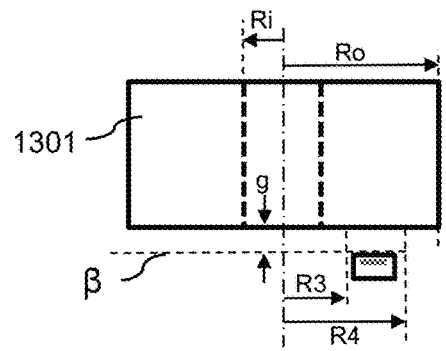
In FIGS. 13(a) to 13(d) the sensor device is located near the top or bottom surface of a ring magnet, substantially halfway between the inner and outer diameter, and is oriented and configured for measuring Bx and By, and is located where |Bz|/|Bx| seen by the sensor <20%.
Figure 12B:
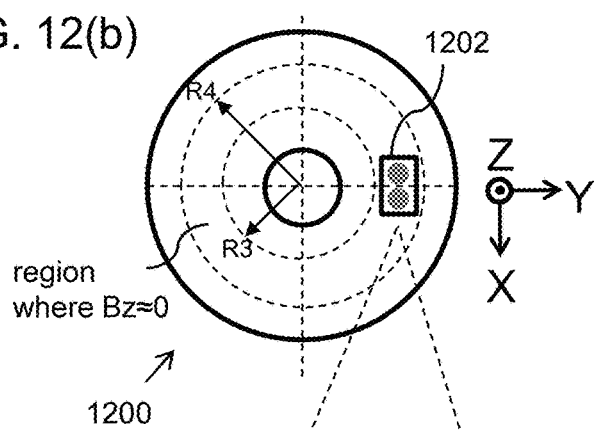
Figure 13B:
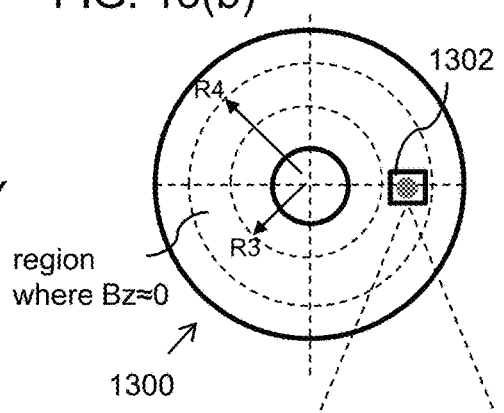

FIGS. 12(a) to 12(e) show an angular position sensor system 1200 in front view (FIG. 12(a)), and in top view (FIG. 12(b)). The magnet 1201 may be a diametrically magnetized two-pole ring magnet. The sensor device 1202 is located at a position defined by a plane β and a radial distance Rs. The plane β is orthogonal to the rotation axis of the magnet, and is located at a distance "g" from the bottom surface of the magnet 1201 or top surface of the magnet (similar to what was shown in FIG. 5).

Figure 12C:
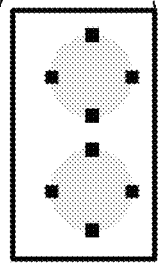
Figure 13C:
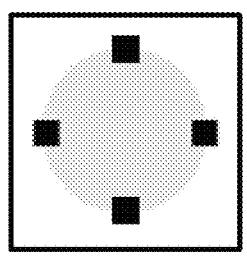

The sensor device 1202 can have a sensor structure as described in FIG. 3 (see FIG. 12(c)), and is oriented such that the X-axis of the sensor structure is tangential to an imaginary circle in the plane β and having a radius Rs, and such that the Y-axis of the sensor structure intersects the rotation axis of the magnet perpendicularly, and such that the Z-axis of the sensor device is parallel to the rotation axis of the magnet.

The sensor device 1202 is preferably configured for determining the angular position of the magnet based on the gradients dBx/dx and dBy/dx, for example in accordance with some or all of the formulas of FIG. 3 case (d).

In preferred embodiments of the present invention, the radial position Rs is specifically chosen to be a value between a value R3 and a value R4 at which the magnitude of the Bz-component of the magnetic field seen by the sensor, (corresponding to the axial vector component of the magnetic field seen by the magnet) is smaller than 20%, preferably smaller than 15%, more preferably smaller than 10%, or even smaller than 5% of the magnitude of the Bx component of the magnetic field seen by the sensor device, (corresponding to the tangential or circumferential component of the magnetic field seen by the magnet), and/or is smaller than 20%, preferably smaller than 15%, more preferably smaller than 10%, or even smaller than 5% of the magnitude of the By component of the magnetic field seen by the sensor device, (i.e. the radial component of the magnetic field seen by the magnet), preferably over the full 360° rotation of the magnet around its axis, and ideally at a location where |Bz|≈0 (is approximately zero).

In order to fully appreciate the benefits of this embodiment of the present invention, reference is made to simulations, which are discussed next.

FIG. 21(a) shows a diametrically magnetized ring magnet made of NdFeB, having an outer diameter OD of 30 mm, an inner diameter ID of 20 mm, and a height H of 10 mm, in perspective view.

Figure 21C:
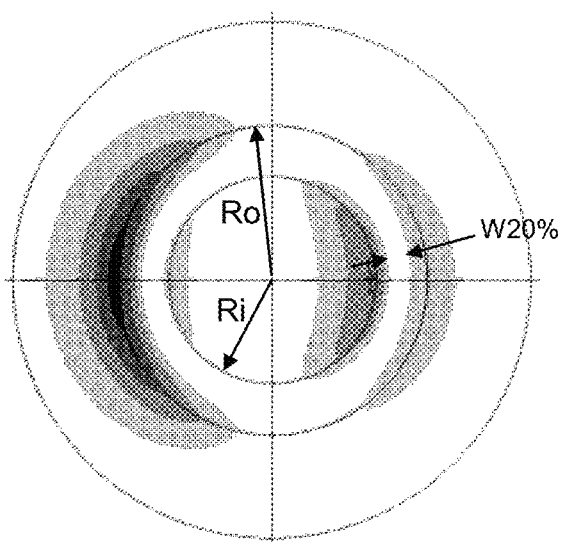

FIG. 21(b) shows a simulation of the axial magnetic field component seen by the magnet, which corresponds to the "Bz-component seen by the sensor device of FIGS. 12(a) to 12(e)", in a plane at a distance "g" of 2.0 mm below or above the magnet. The picture shows the magnitude in grayscale, (where white means a low magnitude, and black means a high magnitude). The inner and outer diameter of the magnet are superimposed in FIG. 21(b) to better show where the annular zone is located. The circle 2199 having a diameter of 50 mm is provided by the simulation, but is irrelevant for the present invention, and can be ignored. The main purpose of FIG. 21(a) to FIG. 21(e) is to demonstrate that there exists a zone, more in particular an annular zone, where the Bz-component seen by the sensor device is close to zero.

Figure 21D:
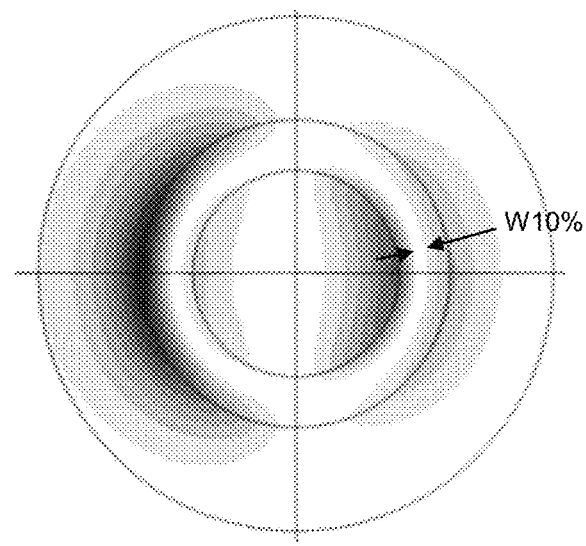
Figure 21E:
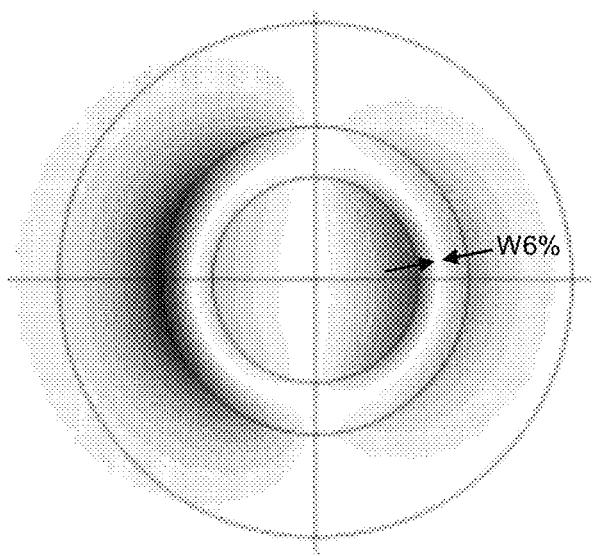

Since grayscale pictures are usually not reproduced by the patent offices with sufficient quality, FIG. 21(b) is also provided as dithered black and white pictures in FIG. 21(c) to FIG. 21(e), using five, ten and seventeen dithering levels respectively, corresponding to steps of about 20%, 10% and 6% of the full scale. It is noted that the pictures of FIG. 21(a) to FIG. 21(e) are not fully symmetric, which is an artefact caused by the conversion of the colour picture, but the location and the width of the annular zone is still very well visible, where W20% is the width where |Bz|/|Bx|<20%, W10% is the width where |Bz|/|Bx|<10%, and W6% indicates the width where |Bz|/|Bx|<6%. The width W6%<W10%, and W10%<W20%.

Again, it came as a surprise that there exists a zone where the magnitude of the Bz component is very small, or more precisely stated, where |Bz|/|Bx| and/or |By|/|Bz| is smaller than 20%, or smaller than 10%, or smaller than 5%, or |Bz|≈0 and that this condition is satisfied in an annular zone extending over the full 360° range, especially when taking into account that the magnet is diametrically magnetized (not radially magnetised).

FIG. 22(a) to FIG. 22(d) shows simulation results for another magnet, having an outer diameter OD of 15 mm, an inner diameter ID of 5 mm, and a height H of 2.5 mm. FIG. 22(a) shows the magnitude of the Bz-component (as seen by the sensor device), which corresponds to the axial component of the magnet, for various positions in a plane located at a distance of 2 mm below or above the magnet surface.

FIG. 22(a) shows the simulation result in grayscale. FIG. 22(b) shows the simulation result with five dithering levels, each level corresponding to approximately 20% of the full scale. FIG. 22(c) shows the simulation result with ten dithering levels, each level corresponding to approximately 10% of the full scale. FIG. 22(d) shows the simulation result with seventeen dithering levels, each level corresponding to approximately 6% of the full scale. As mentioned above, the pictures are not symmetric because of an artefact of the colour conversion, but despite this anomaly, the pictures clearly show that such a zone exists, and that its width of the annular zone gets narrower as the allowed magnitude of the Bz component decreases.

Referring back to FIGS. 12(a) to 12(e), it can now be understood that, when locating the sensor device 1202 inside the annular zone, that the magnitude of the Bz-component is much smaller than the magnitude of the Bx component and/or the Bz component, and hence that any potential cross-talk from Bz into Bx and/or By into Bz is reduced at least by a factor of 5 or 10 or even more, thus improving accuracy.

FIG. 12(c) shows a sensor device having a sensor structure as described in FIG. 3. Such a sensor system has many or all of the same advantages as described for FIGS. 9(a) to 9(f), including having a measurement range of 360°, having a reduced sensitivity to cross-talk, being highly robust against an external disturbance field, etc.

Figures 12D, 12E:
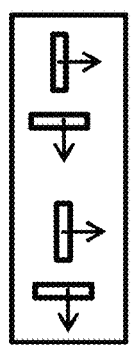

The sensor system 1200 can also be used with other sensor structures, for example the sensor structure shown in FIG. 12(d) or FIG. 12(e) having two sensors spaced apart along an X-axis, each sensor comprising two vertical Hall elements, one configured for measuring the Bx-component, the other configured for measuring a By-component in a direction perpendicular to X.

In another variant (not shown), the sensor structure of FIG. 4 (with four horizontal Hall elements and four discrete IMC elements) is used.

In yet other embodiments, magneto-resistive elements are used as magnetic sensitive elements.

In another or further variant (not shown), the sensor device 1202 with the sensor structure of FIG. 3 or FIG. 4 is oriented such that its X-axis is tangential to the imaginary circle with radius Rs, but the Z-axis is intersecting the rotation axis of the magnet, and the Y-axis is parallel to said rotation axis (as would be obtained when starting from the system of FIG. 12(a), after rotating the sensor device 1202 by 90° around its X-axis). In this embodiment, the signals Bx and Bz (as seen by the sensor device) vary like a sine and cosine function of the angular position of the magnet (possibly with different amplitudes), whereas the By-component (as seen by the sensor device) corresponding to the axial magnetic field component (as seen by the magnet) has a magnitude which is much smaller than that of Bx. In this embodiment, the sensor device may use the formulas of FIG. 3 case (b) to determine the angular position of the magnet, with the same advantages as described above, in particular with a reduced cross-talk.

A sensor structure as shown in FIG. 9(f) with two sensors, each comprising a single horizontal Hall element and a single vertical Hall element without IMC, can also be used.

FIGS. 13(a) to 13(d) shows an angular position sensor system 1300 which is a variant of the angular sensor system 1200 of FIGS. 12(a) to 12(e). The main difference between the sensor system 1300 of FIGS. 13(a) to 13(d) and the sensor system 1200 of FIGS. 12(a) to 12(e) being that the sensor device 1302 contains a sensor structure configured for measuring a single in-plane magnetic field component Bx and a single in-plane magnetic field component By, and is configured for calculating the angular position of the magnet based on these components Bx, By, preferably as a function of the ratio of these values, e.g. using a goniometric function as described in FIG. 3 case (c), or using a look-up-table for converting the ratio into an angular position. Since the system 1300 does not use gradient signals, it is not robust against an external disturbance field, but all other advantages mentioned above for FIGS. 12(a) to 12(e), in particular having a reduced cross-talk, are also applicable here.

All variants mentioned for FIGS. 12(a) to 12(e) but having only one sensor instead of two sensors, are also contemplated, including all variants where the substrate of the sensor device is perpendicular to the rotation axis, and all variants where the substrate of the sensor device is parallel to the rotation axis.

FIGS. 14(a) to 14(d) show an angular position sensor system 1400 in front view (FIG. 14(a)), and in top view (FIG. 14(b)). The magnet 1401 may be a diametrically magnetized two-pole disk magnet or ring magnet (e.g. as depicted in FIG. 9(d)). The sensor device 1402 is located at a position defined by a plane β and a radial distance Rs. The plane β is orthogonal to the rotation axis of the magnet and is located at a distance "h" from the bottom surface, approximately halfway between the top surface and the bottom surface of the cylindrical magnet. This position is referred to herein as "near the equator".

The sensor device 1402 can have a sensor structure as described in FIG. 3 (see FIG. 14(c)), and is oriented such that the X-axis of the sensor structure is tangential to an imaginary circle in the plane β and having a radius Rs, and such that the Y-axis of the sensor structure intersects the rotation axis of the magnet perpendicularly, and such that the Z-axis of the sensor device is parallel to the rotation axis of the magnet.

The sensor device 1402 is preferably configured for determining the angular position of the magnet based on the gradients dBx/dx and dBy/dx, for example in accordance with some or all of the formulas of FIG. 3 case (d).

In preferred embodiments of the present invention, the height position h (in the axial direction of the magnet) is specifically chosen such that the magnitude of the Bz-component of the magnetic field seen by the sensor, (i.e. the axial vector component of the magnetic field seen by the magnet) is smaller than 20%, preferably smaller than 15%, more preferably smaller than 10%, or even smaller than 5% of the magnitude of the Bx component of the magnetic field seen by the sensor device, (i.e. the tangential or circumferential component of the magnetic field seen by the magnet), and/or is smaller than 20%, preferably smaller than 15%, more preferably smaller than 10%, or even smaller than 5% of the magnitude of the By component of the magnetic field seen by the sensor device, (i.e. the radial component of the magnetic field seen by the magnet), preferably over the full 360° rotation of the magnet around its rotation axis. The radial distance Rs is not critical in this embodiment, and is preferably smaller than Ro*200%, or smaller than Ro*150%, e.g. a value in the range from Ro*102% to Ro*120%. In preferred embodiments, the value of Rs may be a value in the range from Ro+1 mm to Ro+10 mm, or a value in the range from Ro+2 mm to Ro+7 mm.

In order to fully appreciate the benefits of this embodiment of the present invention, reference is made to simulations, which are discussed next.

Figure 23A:
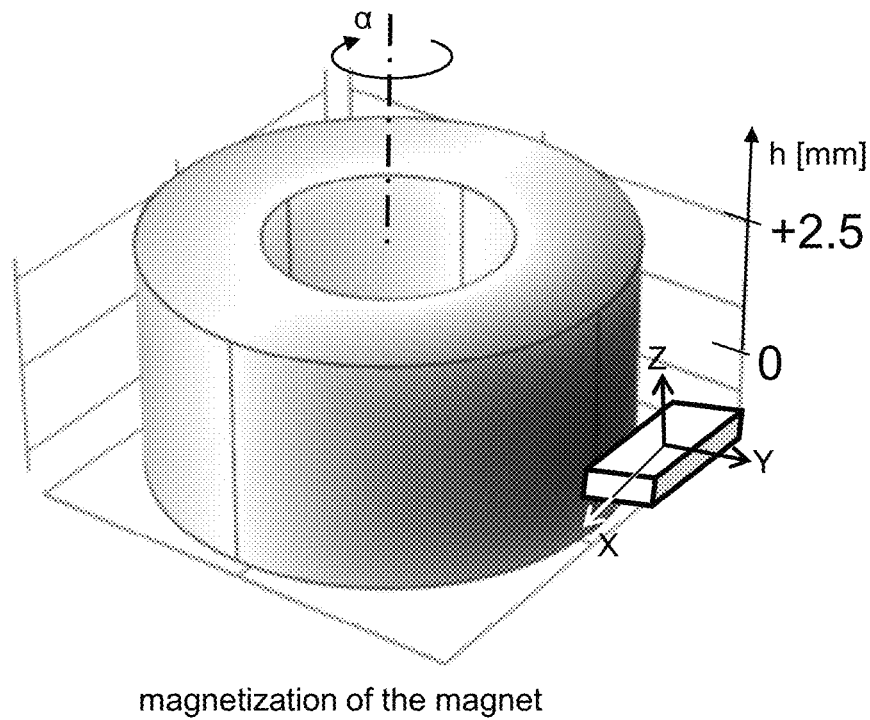
FIG. 23(a) and FIG. 23(b) show the magnetization of an exemplary diametrically magnetized ring magnet (with OD=10 mm, ID=5 mm and H=5 mm), as can be used in the angular sensor systems of FIGS. 14(a) to 14(d) or FIGS. 15(a) to 15(e) or FIGS. 16(a) to 16(d).

FIG. 23(a) shows a diametrically magnetized ring magnet made of NdFeB, having an outer diameter of 10 mm, an inner diameter of 5 mm, and a height of 5 mm, in perspective view.

Figure 23B:
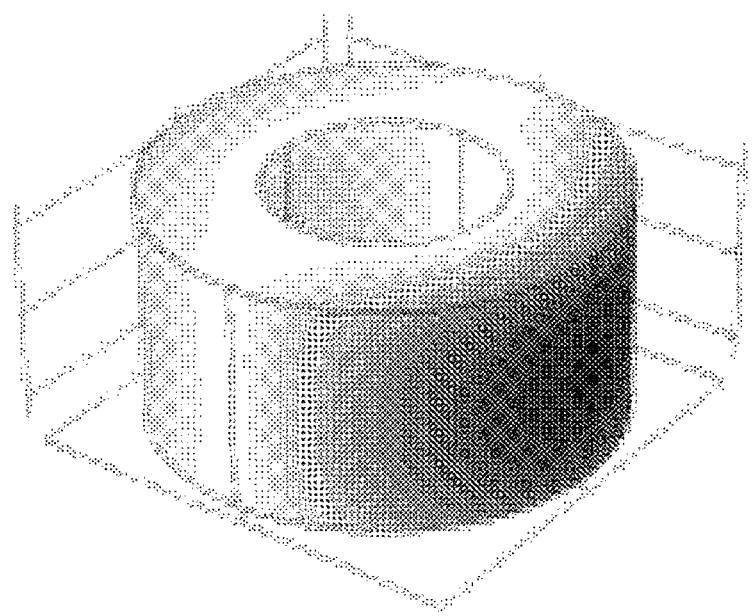

FIG. 23(b) shows a simulation of the magnetization on the surface of the magnet, as a dithered image.

Figure 24A:
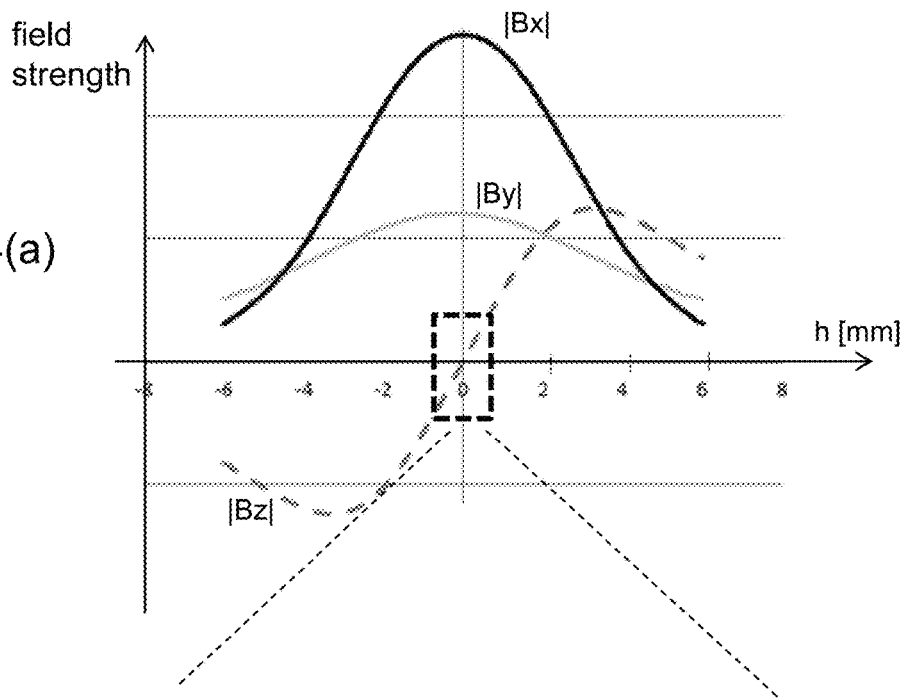
FIG. 24(a) shows a plot of the magnitude of the magnetic field components Bx, By, Bz of the magnetic field of FIG. 23(a) and FIG. 23(b), on a circle with radius Rs, in a plane perpendicular to the rotation axis at half height of the magnet, as a function of the radius Rs.

FIG. 24(a) shows how the magnitudes of the Bx, By and Bz component vary as a function of the height position, for an Rs value of 3 mm. The "sweet spot" where the magnitude of the Bz component is "small" (for a more precise statement, see above), is indicated by a rectangle in dashed line.

Figure 24B:
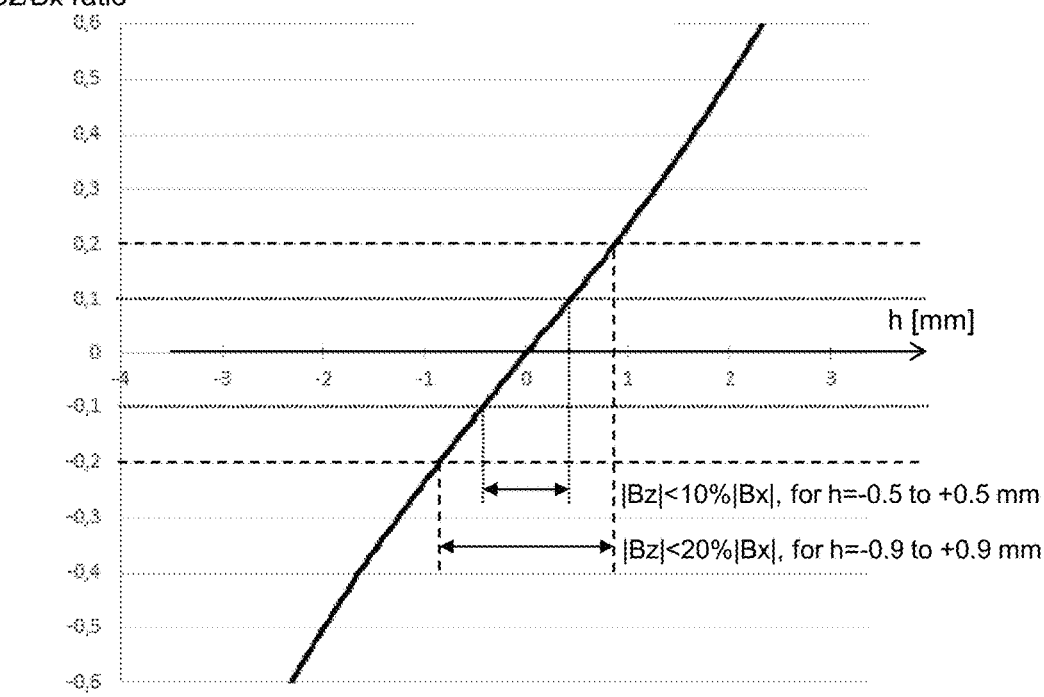

FIG. 24(b) shows this "sweet spot" in an enlarged view. In the example shown, the ratio of |Bz| over |Bx| is smaller than 20% if the sensor device is located in a plane at a height of H/2±0.9 mm; and the ratio of |Bz| over |Bx| is smaller than 10% if the sensor device is located in a plane at a height of H/2±0.5 mm.

Referring back to FIGS. 14(a) to 14(d), it can now be understood that, when locating the sensor device 1402 in this sweet spot (or sweet zone), that the magnitude of the Bz-component is much smaller than the magnitude of the Bx component and/or the By component, and hence that any potential cross-talk from Bz into Bx and/or into By is reduced at least by a factor of 5 or 10 or even more.

FIG. 14(c) shows a sensor device having a sensor structure as described in FIG. 3. Such a sensor system has many or all of the same advantages as described for FIGS. 9(a) to 9(f), including having a measurement range of 360°, having a reduced sensitivity to cross-talk, being highly robust against an external disturbance field, etc.

The sensor system 1400 can also be used with other sensor structures, for example the sensor structure shown in FIG. 14(d) having two sensors spaced apart along an X-axis, each sensor comprising two vertical Hall elements, one configured for measuring the Bx-component, the other configured for measuring a By-component in a direction Y perpendicular to X.

In another variant (not shown), the sensor structure of FIG. 4 (with four horizontal Hall elements and four discrete IMC elements) is used.

In yet other embodiments, magneto-resistive elements are used as magnetic sensitive elements.

FIGS. 15(a) to 15(e) show another or further variant of the angular position systems described in FIGS. 14(a) to 14(d), where the sensor device 1502 is oriented such that its X-axis is tangential to the imaginary circle with radius Rs, but the Z-axis is intersecting the rotation axis of the magnet, and the Y-axis is parallel to said rotation axis (as can be obtained by rotating the sensor device 1402 of FIGS. 14(a) to 14(d) by 90° around the X-axis). FIG. 15(a) shows the system in front view, FIG. 15(b) in top view, and FIG. 15(c) in side view, seen in the viewing direction A-A.

In this embodiment, the signals Bx and Bz (as seen by the sensor device) vary like a sine and cosine function of the angular position of the magnet (possibly with different amplitudes), whereas the By-component (as seen by the sensor device) corresponding to the axial magnetic field component (as seen by the magnet) has a magnitude which is very small, or more precisely, |By|/|Bx|<20% or <10% or <5%, or ideally close to zero.

The sensor device 1502 can for example comprise the sensor structure of FIG. 3 (shown in FIG. 15(d)), or FIG. 4, and can for example use the formulas of FIG. 3 case (b) to determine the angular position of the magnet, with the same advantages as described above, in particular with a reduced cross-talk and long-term drift, robust against mechanical stress and against an external disturbance field. But other sensor structures can also be used, for example the sensor structure of FIG. 8, or FIG. 15(e), or sensor structures comprising magneto-resistive elements.

In variants of FIGS. 15(a) to 15(e), the sensor device 1502 contains only a single sensor, and the formulas of FIG. 3 case (a) may be used to determine the angular position. A disadvantage of such embodiment is that the measurement is not robust against an external disturbance field, but (inter alia) the advantage of reduced cross-talk is still present.

FIGS. 16(a) to 16(d) shows a position sensor system, which is a variant of the system of FIGS. 14(a) to 14(d), where the sensor device 1602 contains only a single sensor instead of two sensors. Only two examples of sensor structures are shown in FIG. 16(c) and FIG. 16(d), but the present invention is not limited to these sensor structures, and all variants mentioned for FIGS. 14(a) to 14(d) but having only one sensor instead of two sensors, are also contemplated, in particular for example the sensor shown in FIG. 4, or a sensor using magneto-resistive sensitive elements arranged for measuring two in-plane magnetic field components Bx, By.

FIG. 17(a) to FIG. 20(b) are already discussed above, and show simulation results which demonstrate that there exists an annular region in a plane at about 2 mm distance from the bottom or top surface of exemplary ring magnets or disk magnets, where one of the three magnetic field components Bx, By, Bz of a sensor device situated in this region, has a magnitude close to zero, over the entire 360° range. This observation is exploited in the angular sensor systems described in FIGS. 9(a) to 9(f), FIGS. 10(a) to 10(e) and FIGS. 11(a) to 11(f).

For completeness, it is mentioned that an annular region will also exist for other distances in the range from 1 to 5 mm from the bottom or top surface, but the radial position thereof may be slightly different. The skilled person having the benefit of the present disclosure can easily find that position by performing simulations.

FIG. 21(a) to FIG. 21(e) and FIG. 22(a) to FIG. 22(d) are already discussed above, and show simulation results which demonstrate that there exists an annular region in a plane at about 2 mm distance from the bottom or top surface of exemplary ring magnets or disk magnets, where one of the three magnetic field components Bx, By, Bz of a sensor device situated in this region, has a magnitude close to zero, over the entire 360° range. This observation is exploited in angular sensor systems described in FIGS. 12(a) to 12(e) and FIGS. 13(a) to 13(d). An annular region also exists for other distances from the bottom or top surface.

FIG. 23(a) and FIG. 23(b) and FIG. 24(a) and FIG. 24(b) are already discussed above, and show simulation results that demonstrate that there exists a small zone (in the height direction of exemplary ring magnets or disk magnets, where one of the three magnetic field components Bx, By, Bz of a sensor device situated in this region, has a magnitude close to zero, over the entire 360° range. This observation is exploited in the angular sensor systems described in FIG. 14(a) to FIG. 16(d).

The embodiments described above, are illustrated mainly using a diametrically magnetized two pole ring or disk magnet, but the present invention is not limited thereto, and also works for other magnets, e.g. an axially magnetized two-pole ring or disk magnet, or an axially magnetized multi-pole ring or disk magnet having at least four poles, as will be described in more detail next.

FIG. 25(a) to (g) show a variant of the angular position sensor system of FIGS. 12(a) to 12(e) or FIGS. 13(a) to 13(d) using an axially magnetized four-pole magnet, also referred to as a "quadrupole". The inventors surprisingly found that an annular zone where one of three orthogonal magnetic field components selected from the group consisting of a circumferential, an axial and a radial component, is much smaller (e.g. smaller than 20%, or smaller than 15%, or smaller than 10% or smaller than 5%) than one or both of the other two components, and that the other two components behave like a sine and cosine signal, possibly with a different amplitude. Using a symmetrical quadrupole magnet, the measurement range is only 180°, but this may be sufficient for certain applications.

FIG. 25(a) shows the sensor system 2500 in front view, FIG. 25(b) shows the sensor system in top view.

FIG. 25(c) and FIG. 25(d) show sensor structures configured for determining Bx and Bz at only one location, and show formulas similar to those of FIG. 3 case (a). Using these sensor structures, the measurement is not robust against a disturbance field, but many of the other advantages mentioned above are still applicable, e.g. highly insensitive to cross-talk, long term drift due to ageing, etc.

Figure 25E:
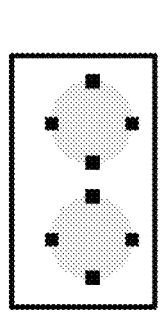
Figure 25F:
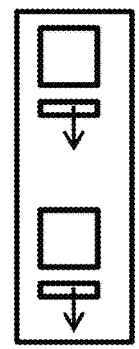

FIG. 25(e) and FIG. 25(f) show sensor structures configured for determining Bx| and Bz| at a first location, and Bx2 and Bz2 at a second location, spaced apart from the first location in the X-direction. Similar to what is described above, these two sets of values can be used for redundancy purposes and/or can be used for determining the angular position based on magnetic field gradients dBx/dx and dBz/dx. Formulas similar to those of FIG. 3 case (b) are given. Using these sensor structures, many of the advantages mentioned above are also applicable here, e.g. highly insensitive to cross-talk, long term drift due to ageing, etc, including a high sensitivity to an external disturbance field.

FIG. 25(g) shows an example of such a magnet, in perspective view.

In a variant of the system of FIGS. 25(a) to 25(g), the magnet is not a full ring spanning an angular range of 360°, but is only a partial ring spanning an angular range smaller than 360°. In an example where the ring magnet is a "half circle", the multi-pole ring magnet defines an angular opening angle of only 180°, but of course, other angular ranges can also be used, such as for example about 120°, or about 150°, or about 210°, or about 240°. The same principles of operation, and the same advantages are also applicable.

In another variant of the system of FIGS. 25(a) to 25(g) (not explicitly shown), the sensor device 2502 is rotated over 90° with respect to the X-axis, yielding an orientation similar to that of FIGS. 10(a) to 10(e). In this case the sensor device measures Bx (circumferential) and By (axial), while Bz (radial) is very small. Formulas similar to those shown in FIGS. 25(c) to 25(f) are applicable, if Bz is replaced by By.

FIG. 26(a) to FIG. 29 show simulation results for an exemplary axially magnetized four-pole magnet, having an outer diameter OD=12 mm, an inner diameter ID=8 mm, a height H=4 mm, in a plane at 3 mm distance below the bottom surface of the magnet, as can be used in the angular position sensor system of FIGS. 25(a) to 25(g), in grayscale.

Figure 26A:
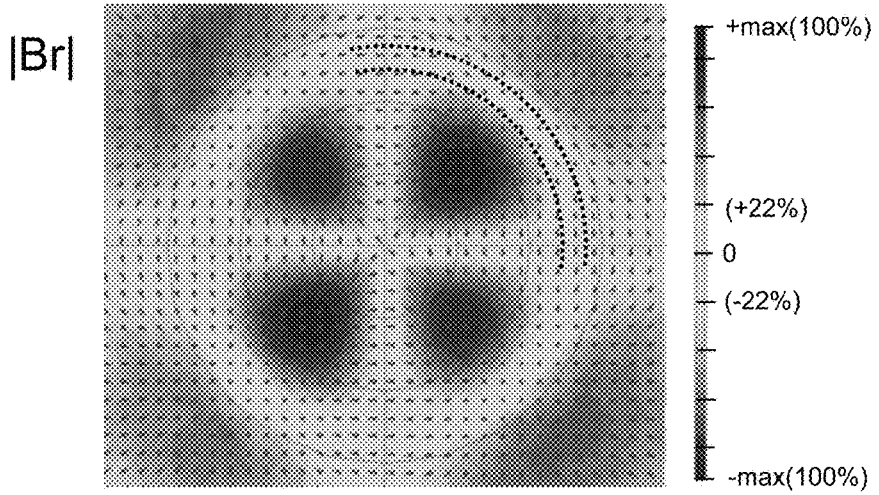
FIGS. 26(a) to 26(c) show simulations of the magnitude of the radially oriented, circumferential and axially oriented magnetic field components of an exemplary four-pole magnet (with OD=12 mm, ID=8 mm, H=4 mm) in a plane at 3 mm distance below the bottom surface of the magnet, as can be used in the angular position sensor system of FIGS. 25(a) to 25(g), in grayscale.

FIG. 26(a) shows a magnitude of the radial component Br (relative to the magnet), corresponding to the By component seen by the sensor device.

Figure 26B:
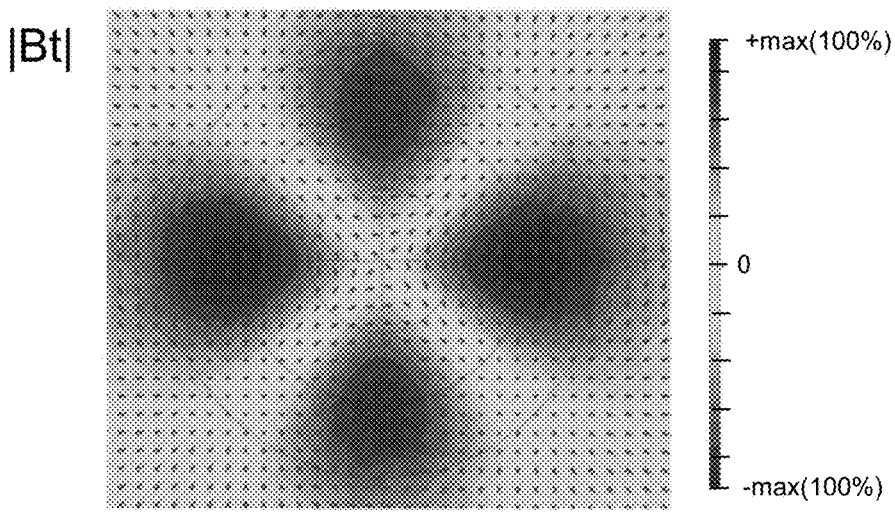

FIG. 26(b) shows a magnitude of the tangential component Bt (relative to the magnet), corresponding to the Bx component of the sensor device.

Figure 26C:
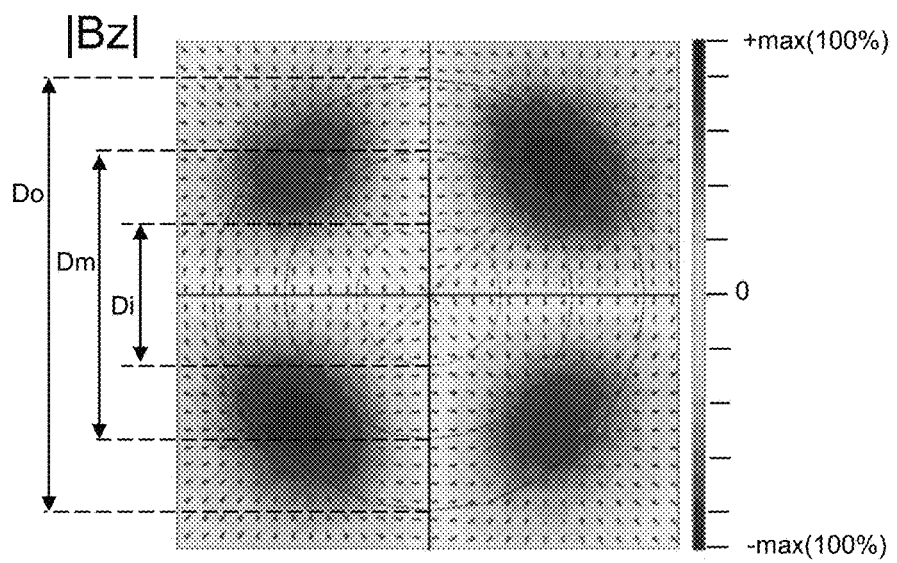

FIG. 26(c) shows a magnitude of the axial component Bz (relative to the magnet), corresponding to the Bz component of the sensor device.

The inner and outer radius of the ring magnet are also indicated. As can be appreciated from FIG. 26(a), an annular region where |By|/|Bx| and/or |By|/|Bz|<20%, or <15%, or <10% also exists in this case. It is noted that the pictures of FIG. 26(a) to FIG. 29 are derived from colour simulation pictures, and that some artefacts may be introduced due to the conversion of the colour pictures into grayscale pictures, but the main purpose of these pictures, namely to show the existence and position of the annular zone, is very well visible.

FIG. 27(a) to FIG. 27(c) show the same plots as FIG. 26(a) to FIG. 26(c) with 10 dithering-levels. Two arc segments (corresponding to radius R3 and R4 of FIG. 25(b)) are added to give an impression of the size and location of the annular zone.

Figure 28:
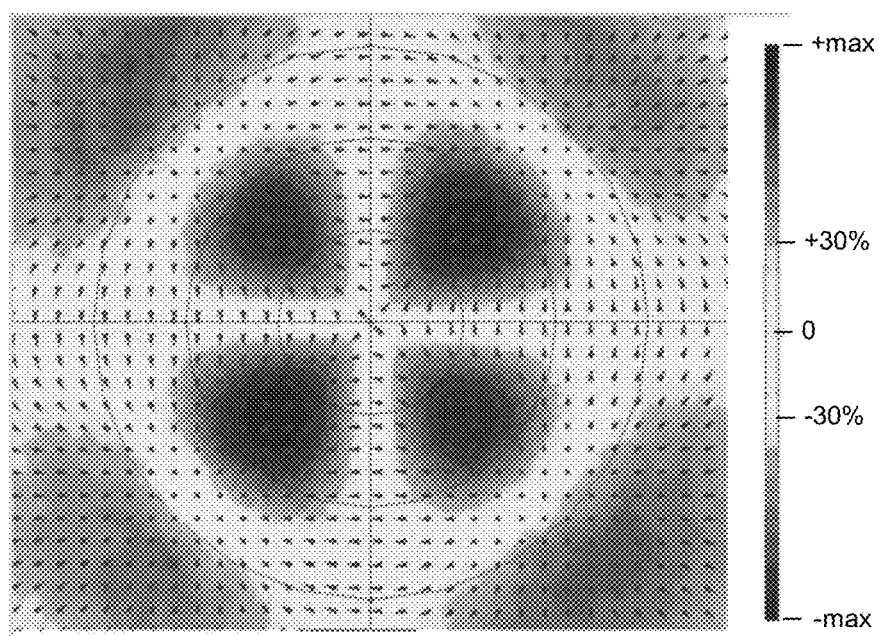
FIG. 28 shows the same data as FIG. 26(a), but rendered in a sharp image, showing the annular zone where the magnitude of the radial component is less than 30% of the maximum magnetic field component measurable at a different location in the same plane.

FIG. 28 shows the same data as FIG. 26(a), but rendered in a sharp image, showing the annular zone where the magnitude of the radial component is less than 30% of the maximum magnetic field component measurable at a different location in the same plane.

Figure 29:
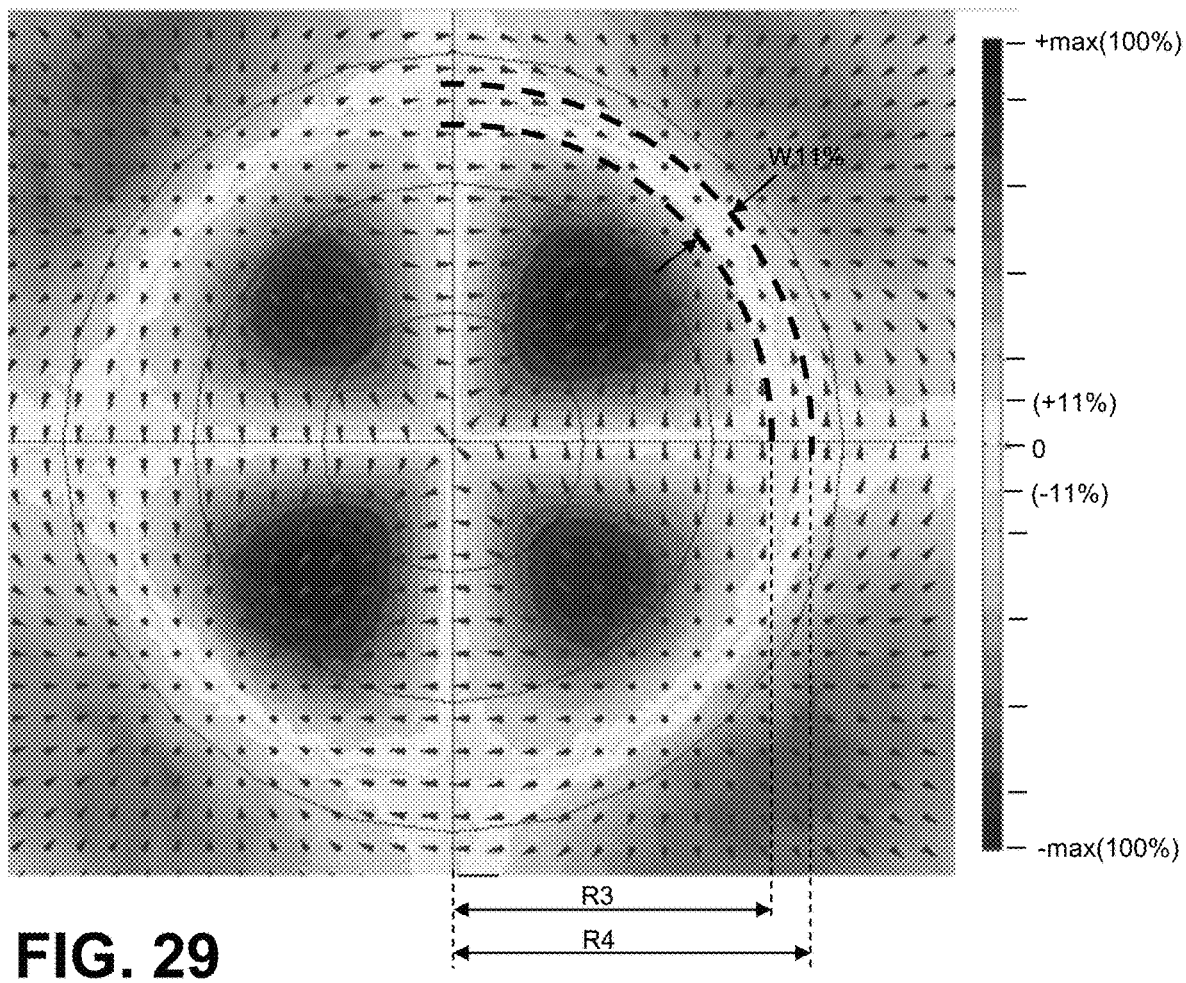
FIG. 29 shows the same data as FIG. 26(a) and FIG. 28, but rendered with a different grayscale, showing the annular zone where the magnitude of the radial component is less than about 11% of the maximum magnetic field component measurable at a different location in the same plane.

FIG. 29 shows the same data as FIG. 26(a) and FIG. 28, but rendered with a different grayscale, showing the annular zone where the magnitude of the radial component is less than about 11% of the maximum magnetic field component measurable at a different location in the same plane.

It was found that (approximately):
R3=9.8 mm and R4=11.6 mm for |By|/|Bx|<30%, (thus W30%=1.8 mm)
R3=9.9 mm and R4=11.3 mm for |By|/|Bx|<22%, (thus W22%=1.4 mm)
R3=10.0 mm and R4=11.0 mm for |By|/|Bx|<11%, (thus W11%=1.0 mm)
which (as described above) is sufficient to mount e.g. a sensor device with horizontal Hall elements and an IMC disk, since the diameter of a typical IMC disk is typically in the order of about 200 to 400 micron.

Similar results can be obtained for four-pole magnets having other dimensions.

While the magnets used in the simulations are typically made of FeNdB, the present invention is not limited hereto, and other materials can be used as well, for example ferrite or SmCo.

The invention claimed is:

1. An angular position sensor system comprising:
    a permanent magnet for generating a magnetic field, the magnet comprising a ring magnet or a disk magnet, the magnet being rotatable about a rotation axis over an angular position to be determined; and
    an angular position sensor device having a substrate comprising a plurality of magnetic sensitive elements;
    wherein the magnetic sensitive elements are configured for measuring at least a first magnetic field component oriented in a first direction and for measuring a second magnetic field component oriented in a second direction perpendicular to the first direction; and
    the sensor device further comprising a processing circuit configured for calculating an angular position ($\alpha$) of the magnet relative to the sensor device based at least on the measured first magnetic field component and the measured second magnetic field component;
    wherein the sensor device is positioned such that the first direction is oriented in a direction tangential to an imaginary circle having a center located on the rotation axis, and such that the second direction is either parallel to the rotation axis or is orthogonal to the rotation axis; and
    the sensor device is located at a predefined position relative to the magnet such that the magnetic sensitive elements are located in an annular zone around the rotation axis where a magnitude of a third magnetic field component of the magnetic field generated by the magnet, and orthogonal to the first magnetic field component and the second magnetic field component, has a magnitude smaller than 20% of a magnitude of the first magnetic field component and/or of a magnitude of the second magnetic field component over a predefined angular range.

2. The angular position sensor system according to claim 1,
    wherein the sensor device is located at a predefined position relative to the magnet where the magnitude of said third magnetic field component which is not used in the calculation of the angular position, has a magnitude smaller than 15%, or smaller than 10%, or smaller than 5% of the magnitude of the first and/or the second magnetic field component over a 360° angular range; or wherein the sensor device is located at a predefined position relative to the magnet where the magnitude of said third magnetic field component which is not used in the calculation of the angular position, has a magnitude smaller than 5 mTesla, or smaller than 4 mTesla, or smaller than 3 mTesla, or smaller than 2 mTesla, or smaller than 1 mTesla.

3. The angular position sensor system according to claim 1, wherein the magnet has an outer radius; and wherein the predefined position is defined by a distance below a bottom surface or above a top surface of the magnet in the range from 1.0 to 5.0 mm, and by a radial distance in the range from Ro−7 mm to Ro+7 mm, or in the range from Ro−7 mm to Ro−1 mm, or in the range from Ro+1 mm to Ro+7 mm.

4. The angular position sensor system according to claim 1, wherein the magnet is a ring magnet having an inner radius and an outer radius; and wherein the predefined position is defined by a distance below a bottom surface or above a top surface of the magnet in the range from 1.0 to 5.0 mm, and by a radial distance in the range from Ri+(Ro−Ri)*35% to Ri+(Ro−Ri)*65%.

5. The angular position sensor system according to claim 1, wherein the magnet has an outer radius and an axial height; and wherein the predefined position is located in a plane substantially halfway between a bottom surface and a top surface of the magnet, and by a radial distance in the range from Ro+1.0 mm to Ro+10 mm.

6. The angular position sensor system according to claim 1, wherein the sensor device is oriented such that the second axis is orthogonal to the rotation axis.

7. The angular position sensor system according to claim 1, wherein the sensor device is oriented such that the second axis is parallel to the rotation axis of the magnet.

8. The angular position sensor system according to claim 1, wherein the sensor device comprises at least one sensor comprising an integrated magnetic concentrator structure (IMC) and only four horizontal Hall elements arranged at a circumference of said IMC, and angularly spaced apart by 90°.

9. The angular position sensor system according to claim 8, wherein the sensor device is configured for determining, at a first sensor location, a first magnetic field component oriented parallel to the substrate, based on a first difference of signals obtained from a first pair of two of said only four horizontal Hall elements; and wherein the sensor device is configured for determining, at the first sensor location, a second magnetic field component oriented parallel to the substrate, based on a second difference of signals obtained from a second pair of two other of said only four horizontal Hall elements.

10. The angular position sensor system according to claim 9, wherein the horizontal Hall elements of the first pair are individually trimmed for determining said first magnetic field component; and wherein the horizontal Hall elements of the second pair are individually trimmed for determining said second magnetic field component.

11. The angular position sensor system according to claim 8, wherein the sensor device is configured for determining, at a first sensor location, a first magnetic field component oriented parallel to the substrate, based on a first difference of signals obtained from a first pair of two of said only four horizontal Hall elements; and wherein the sensor device is configured for determining, at the first sensor location, a second magnetic field component oriented orthogonal to the substrate, based on a sum of signals obtained from a second pair of two other of said only four horizontal Hall elements.

12. The angular position sensor system according to claim 11, wherein the horizontal Hall elements of the first pair are individually trimmed for determining said first magnetic field component; and wherein the horizontal Hall elements of the second pair are individually trimmed for determining said second magnetic field component.

13. The angular position sensor system according to claim 1, wherein the sensor device comprises at least one sensor comprising an integrated magnetic concentrator structure (IMC) and a first and a second horizontal Hall element located on opposite sides of the IMC, and a third horizontal Hall element located under the IMC between the first and second horizontal Hall element; or wherein the sensor device comprises at least one sensor comprising a first vertical Hall element oriented for measuring a first magnetic field component in said first direction, and a second vertical Hall element oriented for measuring a second magnetic field component in said second direction.

14. The angular position sensor system according to claim 1, wherein the magnetic sensor device comprises a first sensor comprising said plurality of magnetic sensitive elements configured for measuring said first magnetic field component oriented in said first direction, and said second magnetic field component oriented in said second direction perpendicular to the first direction at a first sensor location; and wherein the magnetic sensor device further comprises a second sensor comprising a plurality of magnetic sensitive elements configured for measuring a third magnetic field component oriented in said first direction, and a fourth magnetic field component oriented in said second direction at a second sensor location spaced from the first sensor location; and wherein the processing circuit is further configured for determining a first magnetic field gradient based on the first and third magnetic field component, and for determining a second magnetic field gradient based on the second and fourth magnetic field component;

wherein the processing circuit is configured for calculating the angular position of the magnet based on this first and second magnetic field gradient.

15. The angular position sensor system according to claim 1,
  wherein the magnet has an outer diameter in the range from 10 to 50 mm, and wherein the magnet has a height in the range from 2 to 10 mm; or
  wherein the magnet has an outer diameter in the range from 15 to 30 mm, and wherein the magnet has a height in the range from 2 to 5 mm; or
  wherein the magnet has an outer diameter in the range from 15 to 30 mm, and wherein the magnet has a height in the range from 5 to 10 mm.

16. The angular position sensor system according to claim 1, wherein the sensor device is located at a radial distance from the rotation axis of at least 5 mm.

17. The angular position sensor system according to claim 1,
  wherein the magnet is a two-pole magnet; or
  wherein the magnet is a four-pole magnet; or
  wherein the magnet is a multi-pole magnet having at least six poles.

\* \* \* \* \*